CODED TRACK CIRCUIT SIGNALING SYSTEM
Original Filed April 18, 1942 16 Sheets-Sheet 1
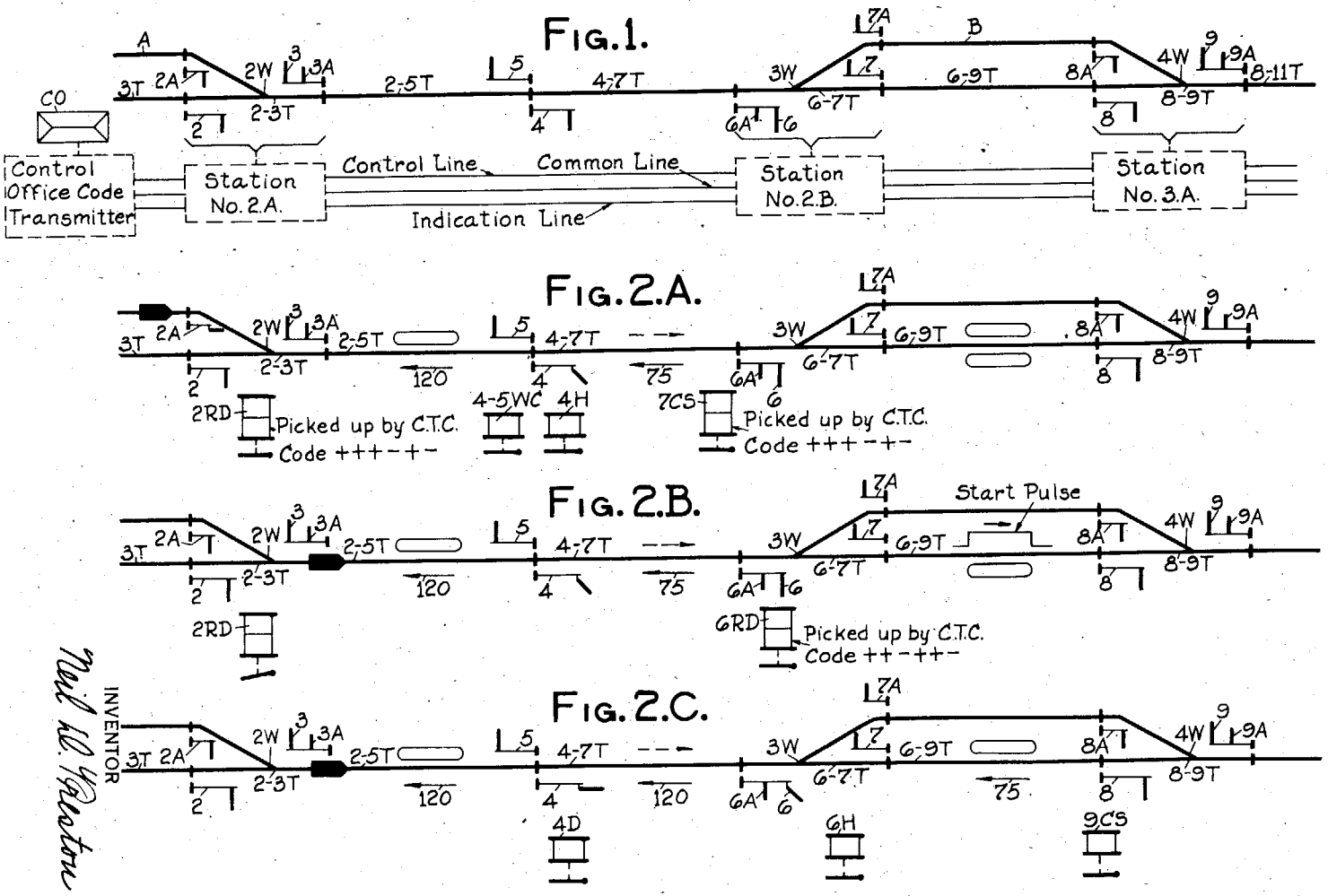

CODED TRACK CIRCUIT SIGNALING SYSTEM
Original Filed April 18, 1942 16 Sheets-Sheet 2
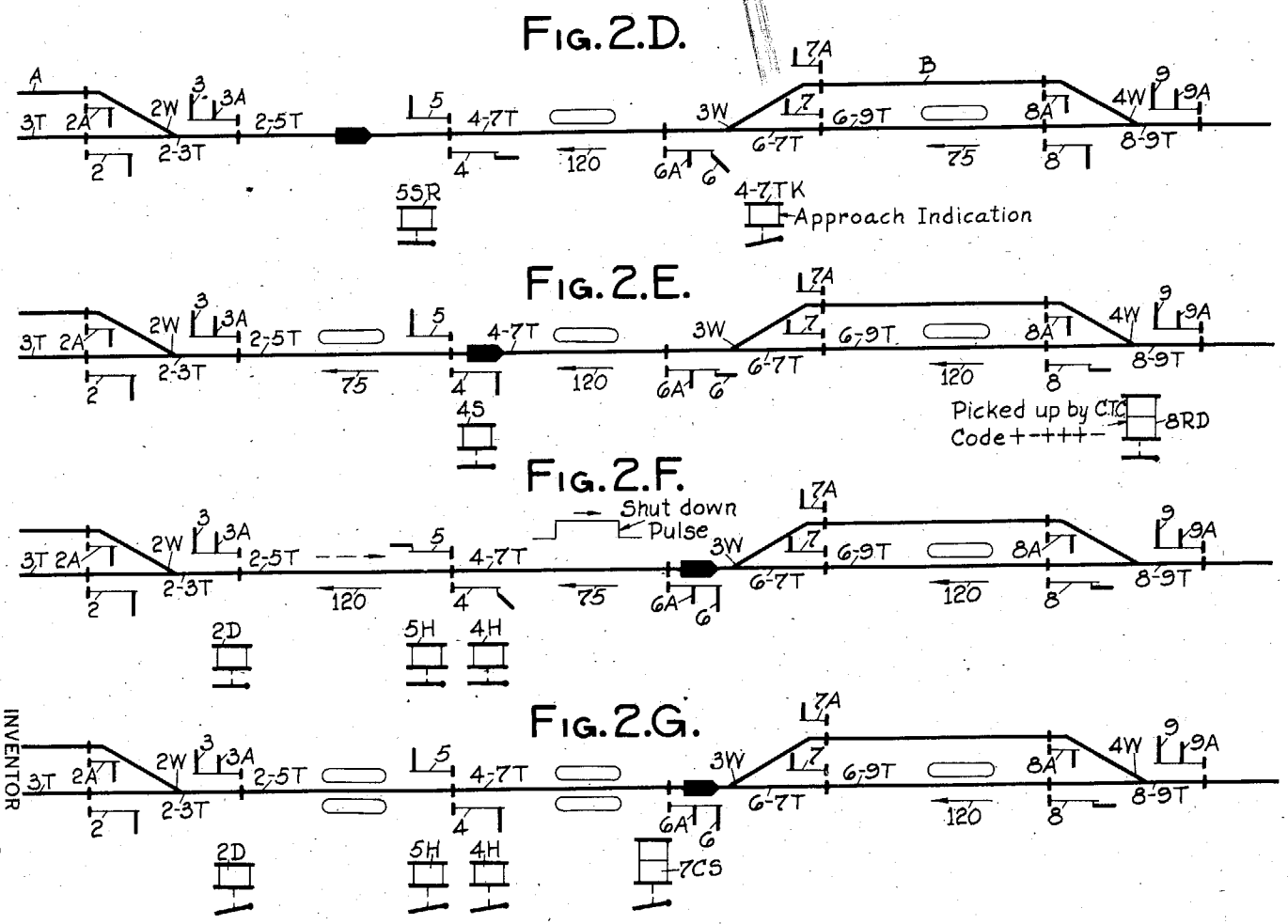
FIG. 2.D. FIG. 2.E. FIG. 2.F. FIG. 2.G.
INVENTOR
Neil D. Preston CODED TRACK CIRCUIT SIGNALING SYSTEM
Original Filed April 18, 1942 16 Sheets-Sheet 3
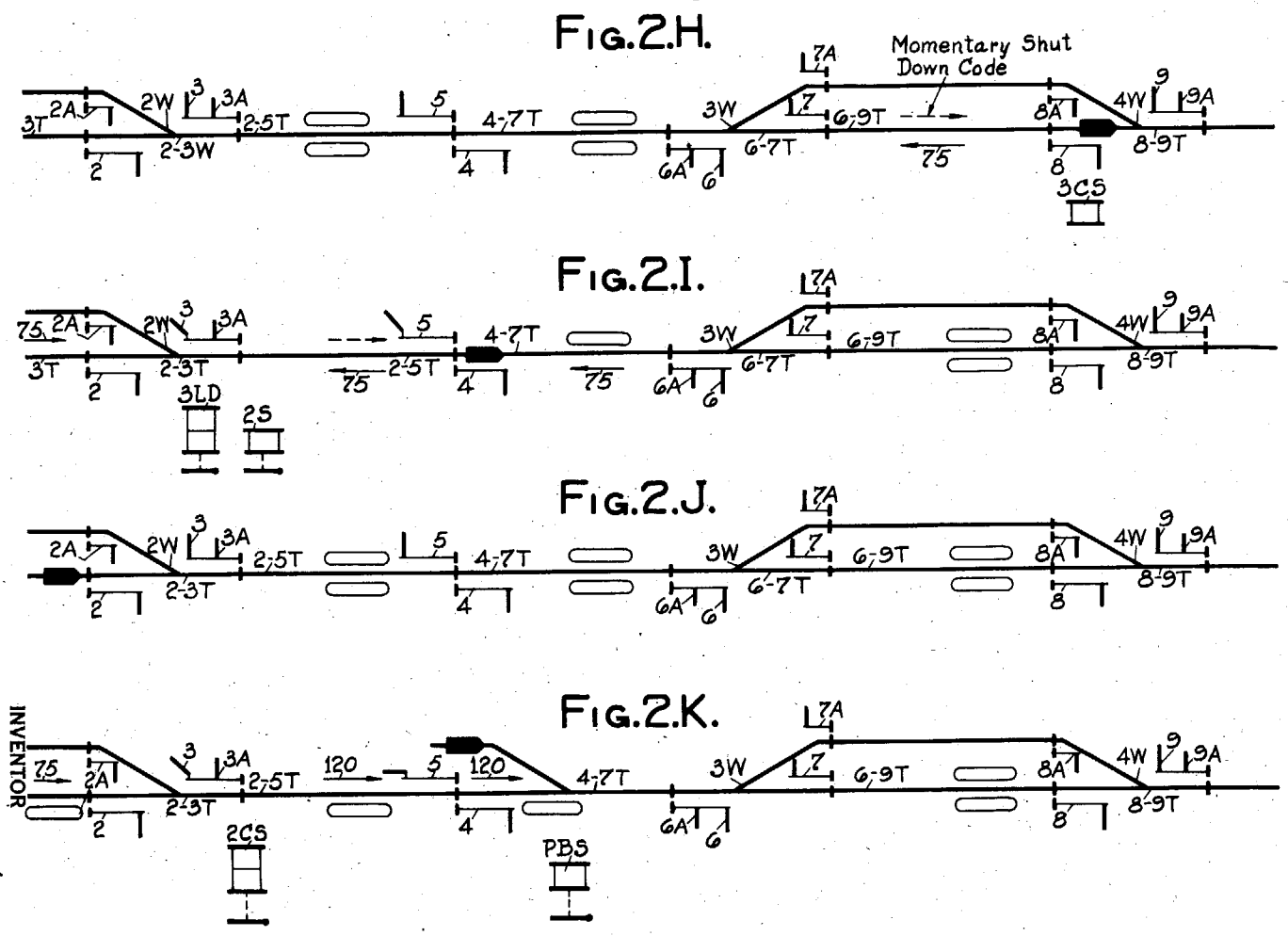
FIG. 2.H.
FIG. 2.I.
FIG. 2.J.
FIG. 2.K.

CODED TRACK CIRCUIT SIGNALING SYSTEM
Original Filed April 18, 1942 16 Sheets-Sheet 4
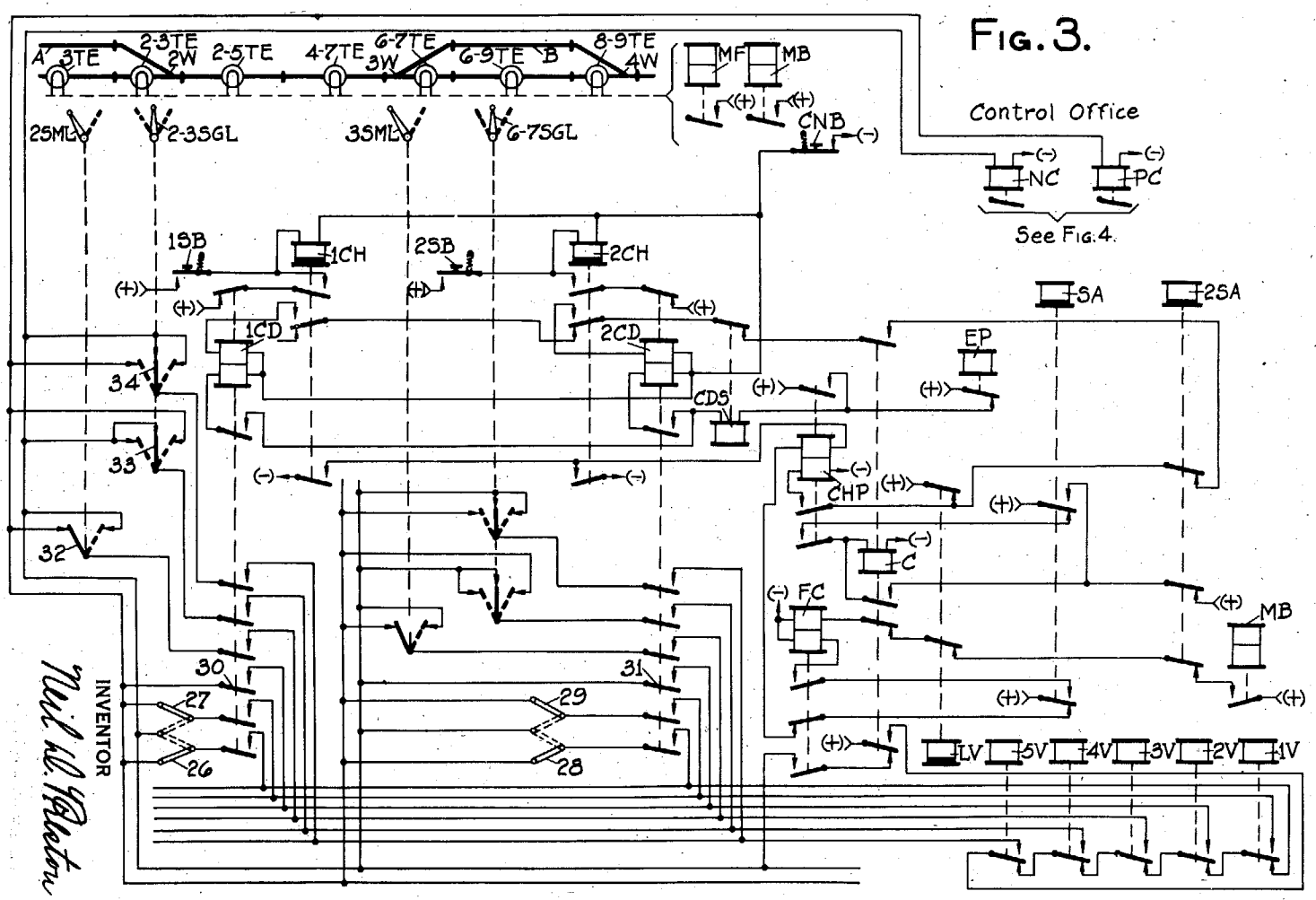

CODED TRACK CIRCUIT SIGNALING SYSTEM

Original Filed April 18, 1942 16 Sheets-Sheet 5

INVENTOR
Neil D. Preston

CODED TRACK CIRCUIT SIGNALING SYSTEM

Original Filed April 18, 1942 16 Sheets-Sheet 6

INVENTOR
Neil W. Preston

CODED TRACK CIRCUIT SIGNALING SYSTEM

Original Filed April 18, 1942 16 Sheets-Sheet 7

CODED TRACK CIRCUIT SIGNALING SYSTEM
Original Filed April 18, 1942 16 Sheets-Sheet 8
FIG. 7.A.
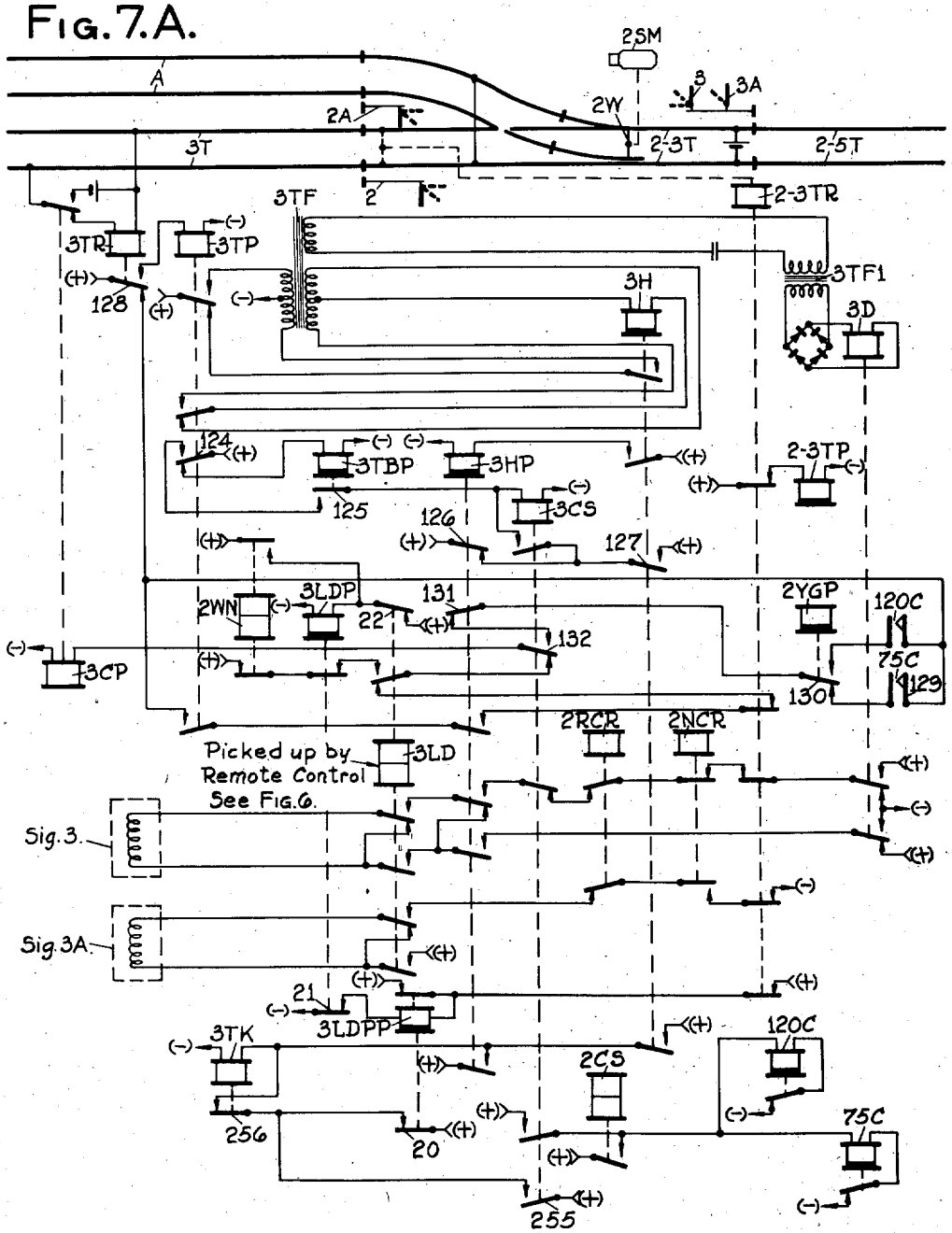
INVENTOR
Neil D. Preston Nov. 25, 1947. N. D. PRESTON Re. 22,940
CODED TRACK CIRCUIT SIGNALING SYSTEM
Original Filed April 18, 1942 16 Sheets-Sheet 9
FIG. 7.B.
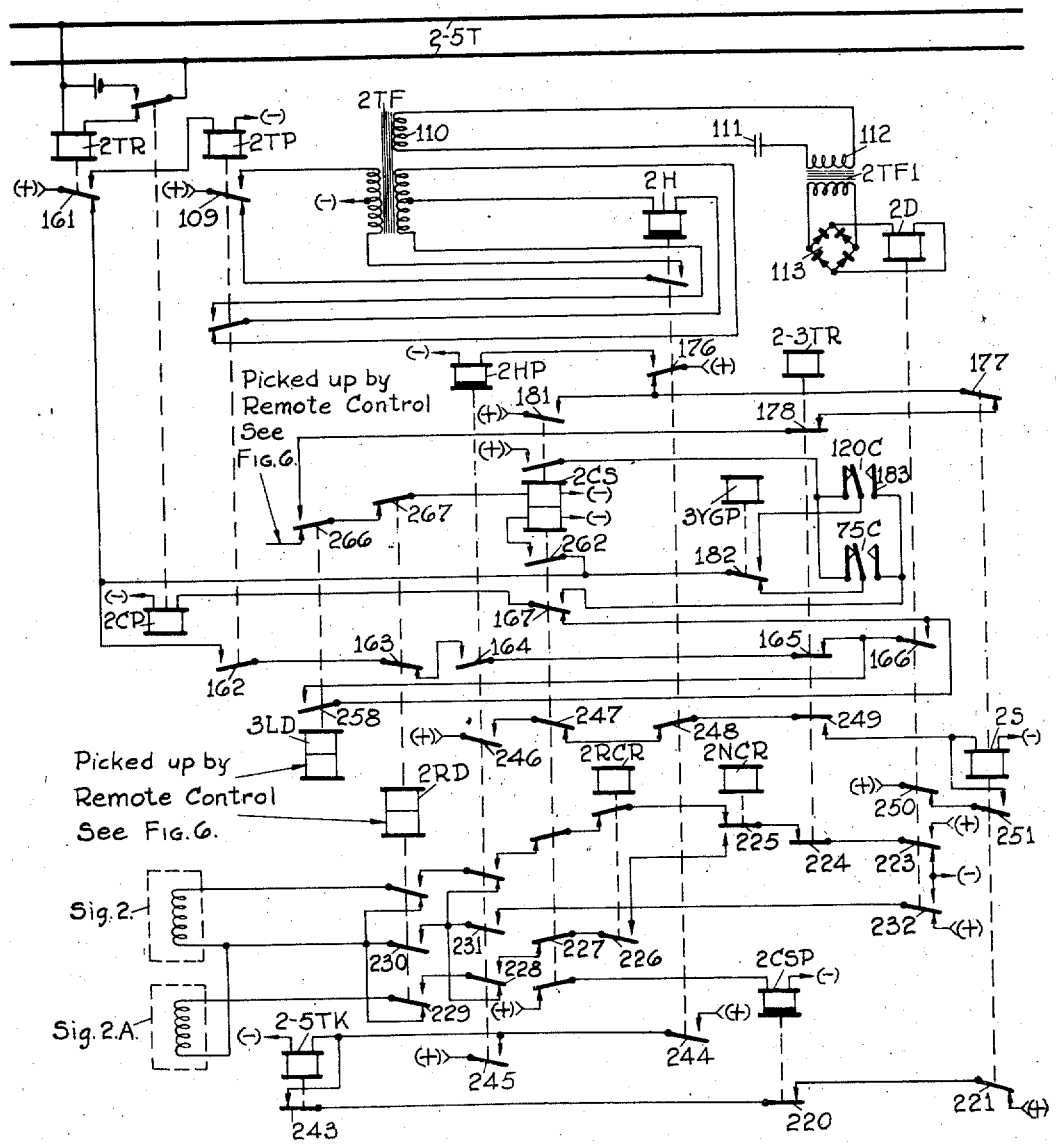
INVENTOR
Neil D. Preston CODED TRACK CIRCUIT SIGNALING SYSTEM
Original Filed April 18, 1942 16 Sheets-Sheet 10
FIG. 7.C.
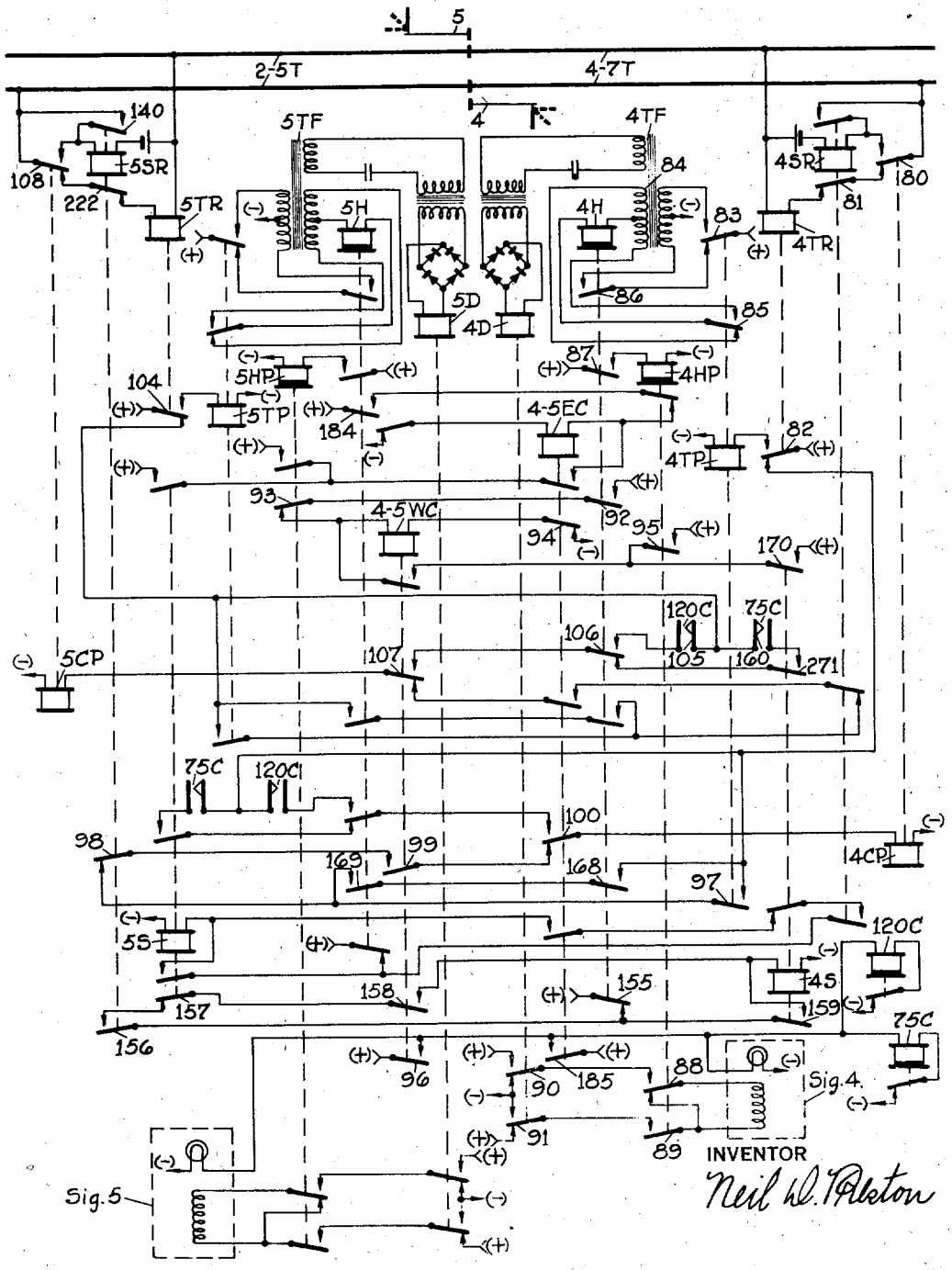
Neil D. Preston CODED TRACK CIRCUIT SIGNALING SYSTEM
Original Filed April 18, 1942 16 Sheets-Sheet 11
FIG. 7.D.
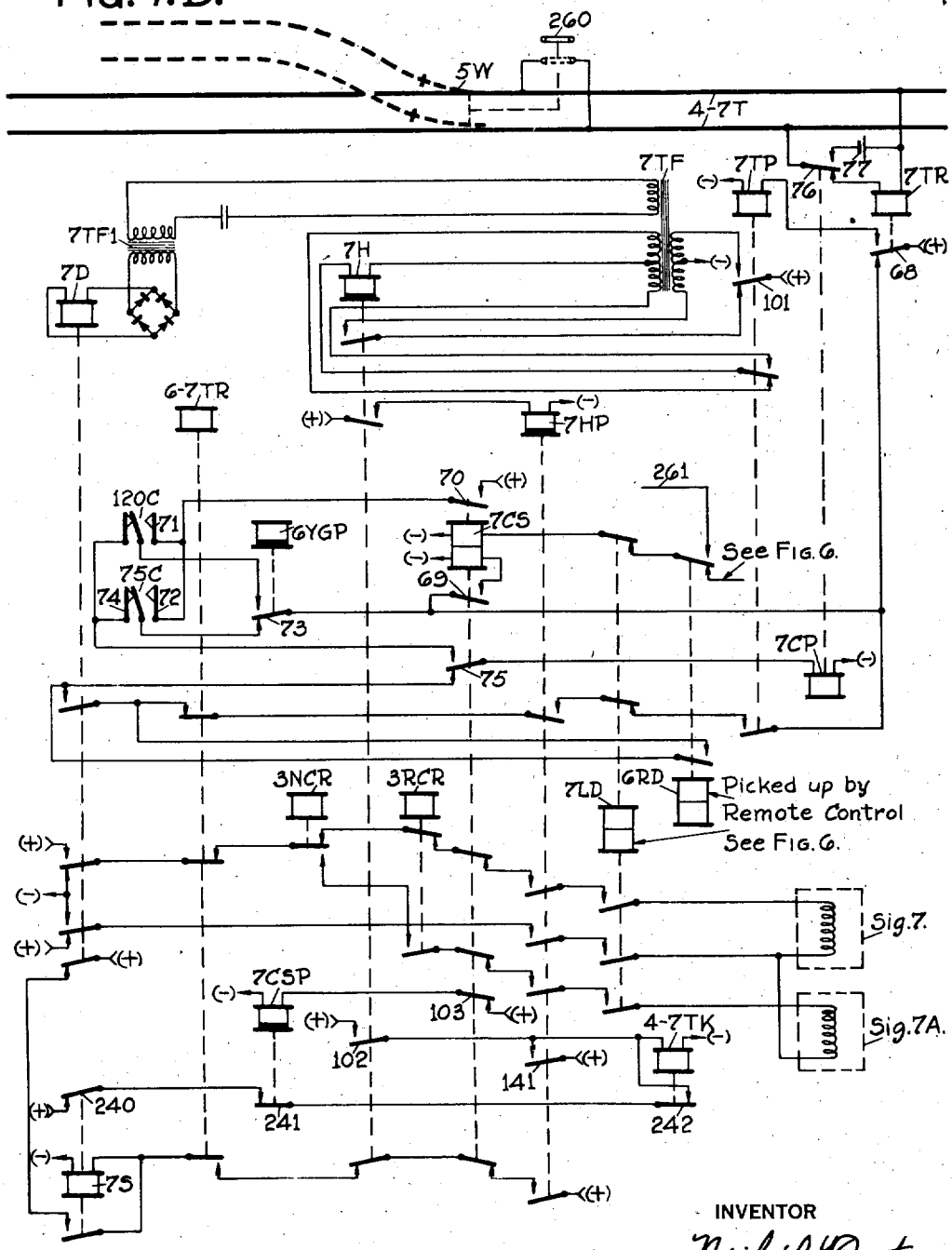
INVENTOR
Neil D. Preston CODED TRACK CIRCUIT SIGNALING SYSTEM
Original Filed April 18, 1942 16 Sheets-Sheet 12
FIG. 7.E.
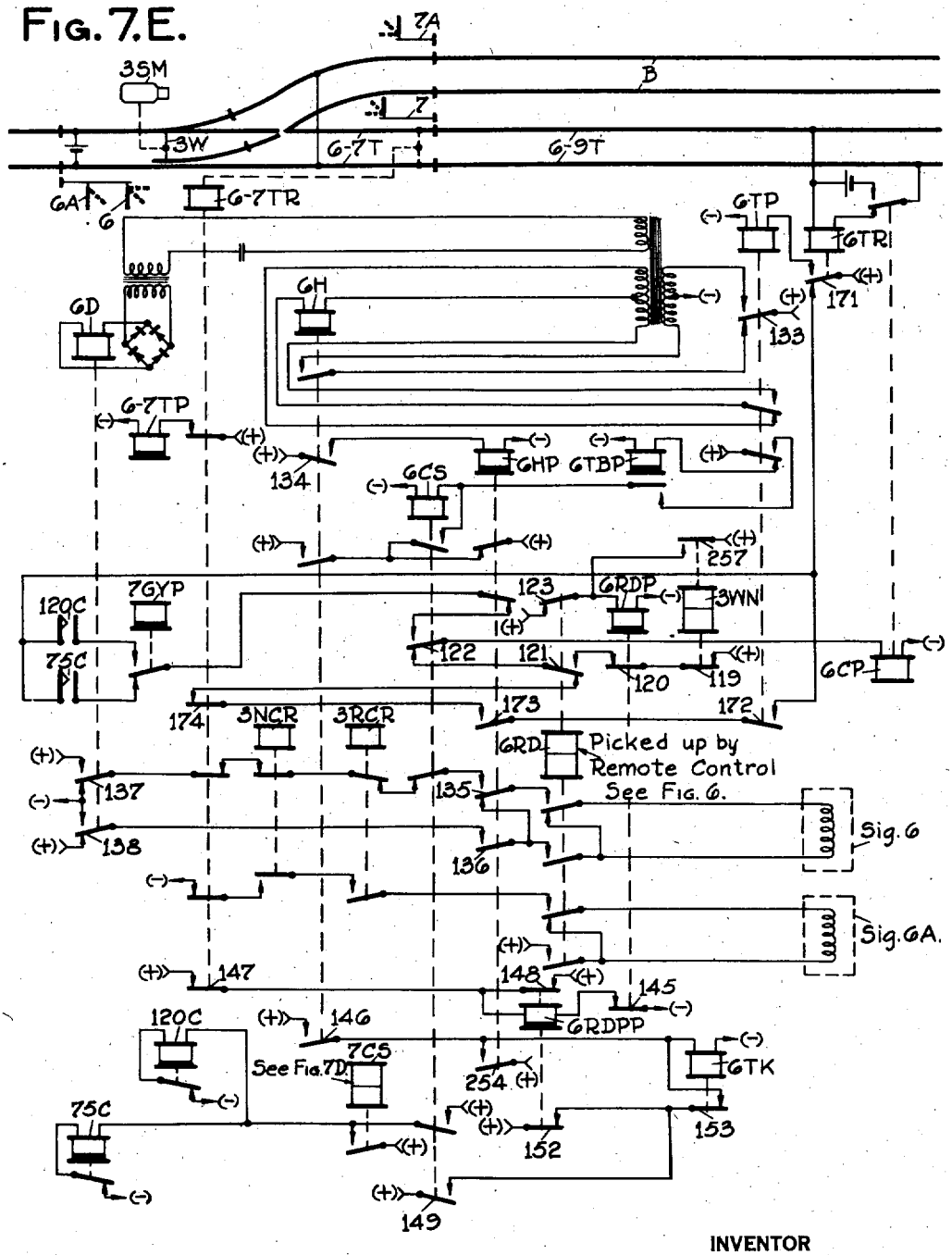
INVENTOR
Neil D. Preston

CODED TRACK CIRCUIT SIGNALING SYSTEM

Original Filed April 18, 1942 16 Sheets-Sheet 13

INVENTOR
Neil D. Preston

CODED TRACK CIRCUIT SIGNALING SYSTEM

Original Filed April 18, 1942 16 Sheets-Sheet 14

INVENTOR

Neil D. Preston

CODED TRACK CIRCUIT SIGNALING SYSTEM

Original Filed April 18. 1942 16 Sheets-Sheet 15

INVENTOR
Neil D. Preston

CODED TRACK CIRCUIT SIGNALING SYSTEM

Original Filed April 18, 1942 16 Sheets-Sheet 16

Inventor
Neil D. Preston

Reissued Nov. 25, 1947 Re. 22,940

UNITED STATES PATENT OFFICE 22,940

CODED TRACK CIRCUIT SIGNALING SYSTEM

Neil D. Preston, Rochester, N. Y., assignor to General Railway Signal Company, Rochester, N. Y.

Original No. 2,357,546, dated September 5, 1944, Serial No. 439,520, April 18, 1942. Application for reissue April 2, 1947, Serial No. 738,768

79 Claims. (Cl. 246—3)

This invention relates to signal control systems for railroads, and it more particularly pertains to centralized traffic control systems for single track railroads in which coded track circuits are used for communication of signal controls through the track rails.

In most centralized traffic control systems for stretches of single track remote from a control office having passing sidings associated therewith, signals are located at the ends of the sidings for governing traffic in both directions. Both the track switches and signals at the ends of the sidings are most generally controlled by an operator at the control office, and the switch and signals at each end of each siding constitute a field station. The power operation of the track switches and the clearing of the signals is, however, also dependent upon automatic safety circuits located in the field and selected in accordance with traffic conditions.

An object of the present invention is to employ coded track circuits, without the use of line wires, for effecting all desired automatic controls between locations in accordance with traffic conditions, and to communicate manual controls to the switches and signals at the respective field stations by a line circuit control means such, for example, as by a line circuit code communication system as disclosed in the Judge et al. Patent No. 2,082,544, dated June 1, 1937, or by the code communication system disclosed in the Hailes et al. Patent No. 2,259,561, dated October 21, 1941.

Another object of the present invention is to control the coded track circuits in such a manner as to render them active for the transmission of controls between signal locations only when required for the clearing of signals in accordance with the manual control exercised over the communication system from the control office. By rendering the track circuit code transmission and reception apparatus normally inactive, there is a substantial saving in energy, and the life of contacts and other moving parts associated with the coded track circuits is substantially prolonged. The saving in energy is of utility particularly where primary batteries are employed.

Another object of the present invention is to govern the initiation and direction of track circuit code transmission in accordance with the direction called for by signal controls communicated from the control office. The controls are communicated from the control office in the usual manner for clearing the respective signals, and the communication of such controls is also effective to initiate the coded track circuit apparatus into operation for the transmission of a driven code through the track rails of the section in advance of the signal to be cleared and in a direction toward such signal from the exit end of the section. This "driven code" has its rate determined by an oscillator or other impulse forming device which controls the code transmitter for applying such driven code to the track rails at the exit end of the track section. Although the direction of driven code transmission and its initiation are governed by line circuit control from the control office, there are no additional controls required to be communicated from the control office to the field stations over what would be required in the centralized traffic control systems most commonly employed in practice. This is possible because a double use is made of the signal clearing controls communicated from the control office to the field stations.

More specifically, the code communication system is so organized that the transmission of a signal clearing code to a selected field station for the head-block signal at one end of a stretch of single track also acts to select the field station at the opposite end of that stretch and effect the energization of a code sending relay at that station. In brief, the two field stations at the opposite ends of each stretch of single track constitute a pair and the transmission of a signal clearing code to either station effects the energization of a code sending relay at the other. But it should be understood that the usual switch and signal controls can be transmitted to only one station at a time. This is accomplished by employing the usual station selecting apparatus for selecting the stations in pairs and then on a following step of the operating cycle before the controls are transmitted a distinctive impulse (or control) is transmitted to determine which station of the pair is to receive the usual controls and which is to receive the coded track circuit initiation control.

A different mode of operation is employed for each siding track section, that is, the section of main track between the opposite ends of any given siding as distinguished from the siding itself which is usually not track circuited. In this case, the usual signal clearing code is transmitted over the code type communication system to the end of the siding at which an entering signal is to be cleared. The reception of this signal clearing code energizes a signal control relay which not only governs the clearing of the desired signal but also causes a "start impulse" to be applied across the rails of the siding track section to effect the initiation of the coded track circuit apparatus at the opposite end of such section.

This organization permits the use of the usual station selecting apparatus, as shown for example in the above mentioned patents, without requiring apparatus for decoding every station code at every station, and without requiring additional steps in the cycle of operation of such a system above those usually employed.

Another object of the present invention is to automatically cause the restoration of the coded track circuit apparatus to normal inactive conditions in the rear of a train only if it is not required to be active for the control of signals governing the passage of a following train in the same stretch of track.

Another object of the present invention is to provide coded track circuit signal control means whereby the signals in a stretch of single track between sidings can provide proper indications for the reversal in direction of train operation in such stretch, even if the control of intermediate signals is involved.

Another object of the present invention is to provide means for handling train movements at an outlying switch associated with a stretch of single track extending between passing sidings. It is provided that, after trainmen have been properly instructed by a dispatcher, they can move a train out of an outlying switch under proper signal protection in either direction as manually set up by an operator at the control office.

Another object of the present invention, even though the coded track circuit means is normally inactive, is to provide approach and track occupancy indications at the control office to correspond with those indications ordinarily provided in the centralized traffic control systems most commonly employed in practice, without the use of line wires except those usually provided for the communication of the indications from the respective field stations to the control office.

Another object of the invention is to employ inverse codes under certain conditions for approach control and in connection with the restoration of the track circuit code communication means in the rear of a train, an "inverse code" being a code having its impulses transmitted during the "off" periods of a driven code at the opposite end of the track section from the driven code transmitter. Means is provided for checking the inverse code against false operation of the code receiving apparatus by stray currents on the track rails.

Another object of the present invention is to provide adequately for highway crossing signal protection, even though the track circuit code communication means is normally inactive.

Other objects, purposes and characteristic features of the present invention will be in part obvious from the accompanying drawings and in part pointed out as the description of the invention progresses.

In describing the invention in detail, reference will be made to the accompanying drawings, in which corresponding reference characters are used to designate corresponding parts throughout the various figures, in which like letter reference characters are used to designate devices having similar features and functions, such letter reference characters being generally made distinctive by reason of preceding numerals, indicative of the particular locations or functions with which their devices are associated, and in which:

Fig. 1 shows diagrammatically the general organization of one embodiment of the present invention, and illustrates the normal conditions of the signals;

Figs. 2A to 2K inclusive show diagrammatically the indications of the signals and the operating conditions of the coded track circuit apparatus under various conditions of traffic;

Fig. 3 illustrates the circuits employed in this embodiment of the present invention as the control office for the selection of various switch and signal codes for communication over a line circuit extending to the field stations;

Figure 8:
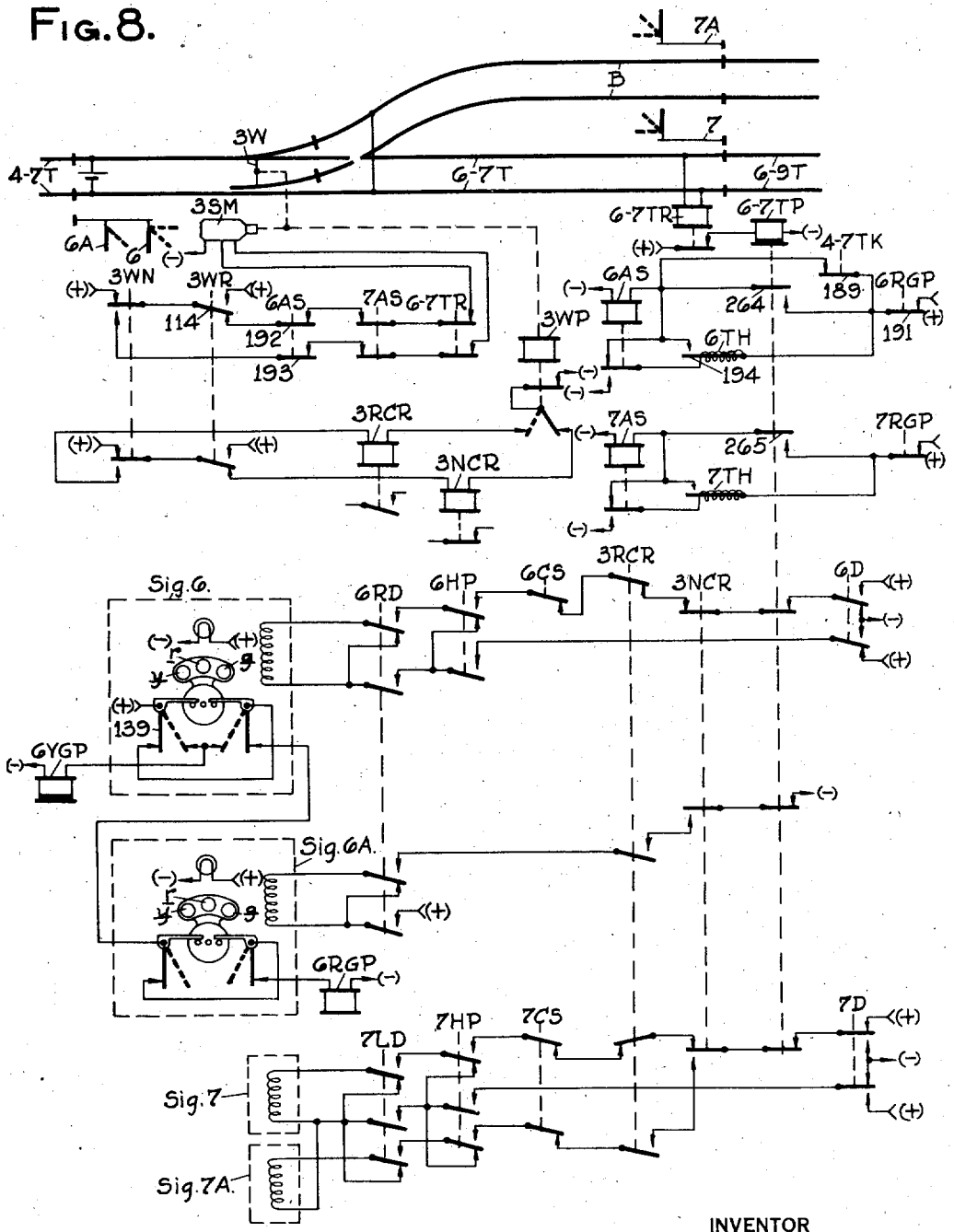
Figure 9:
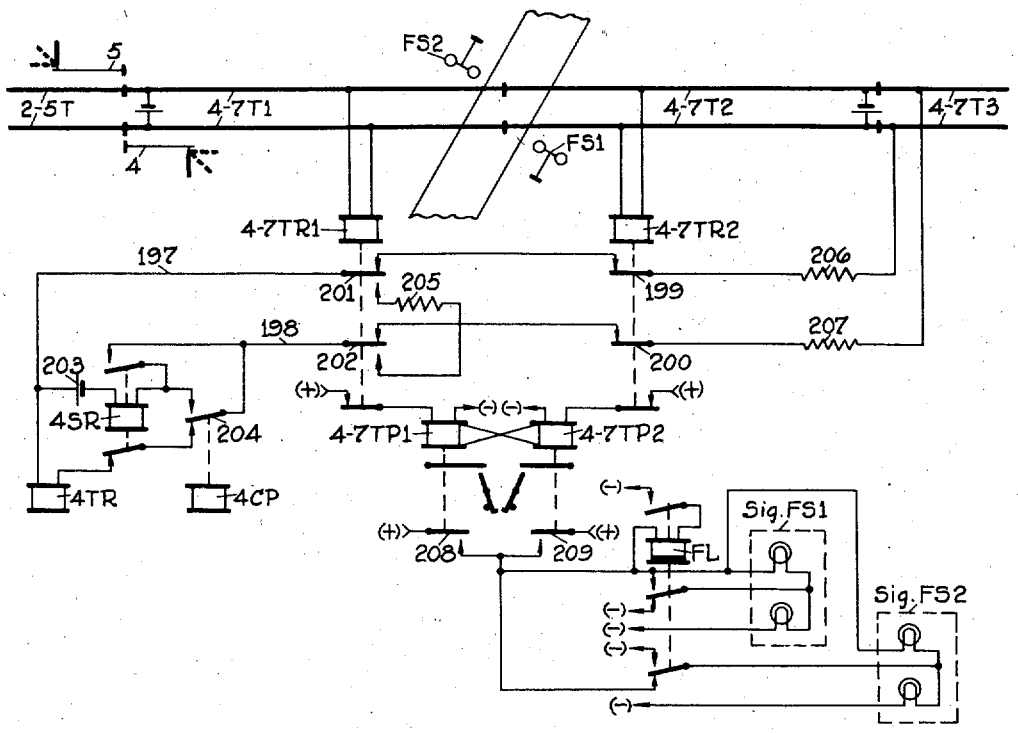
Figure 10:
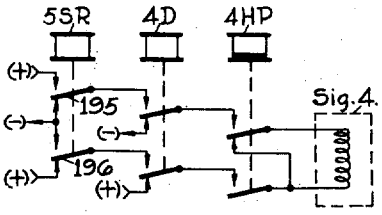
Figure 11:
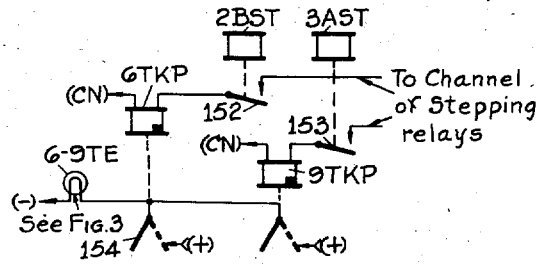
Figure 12:
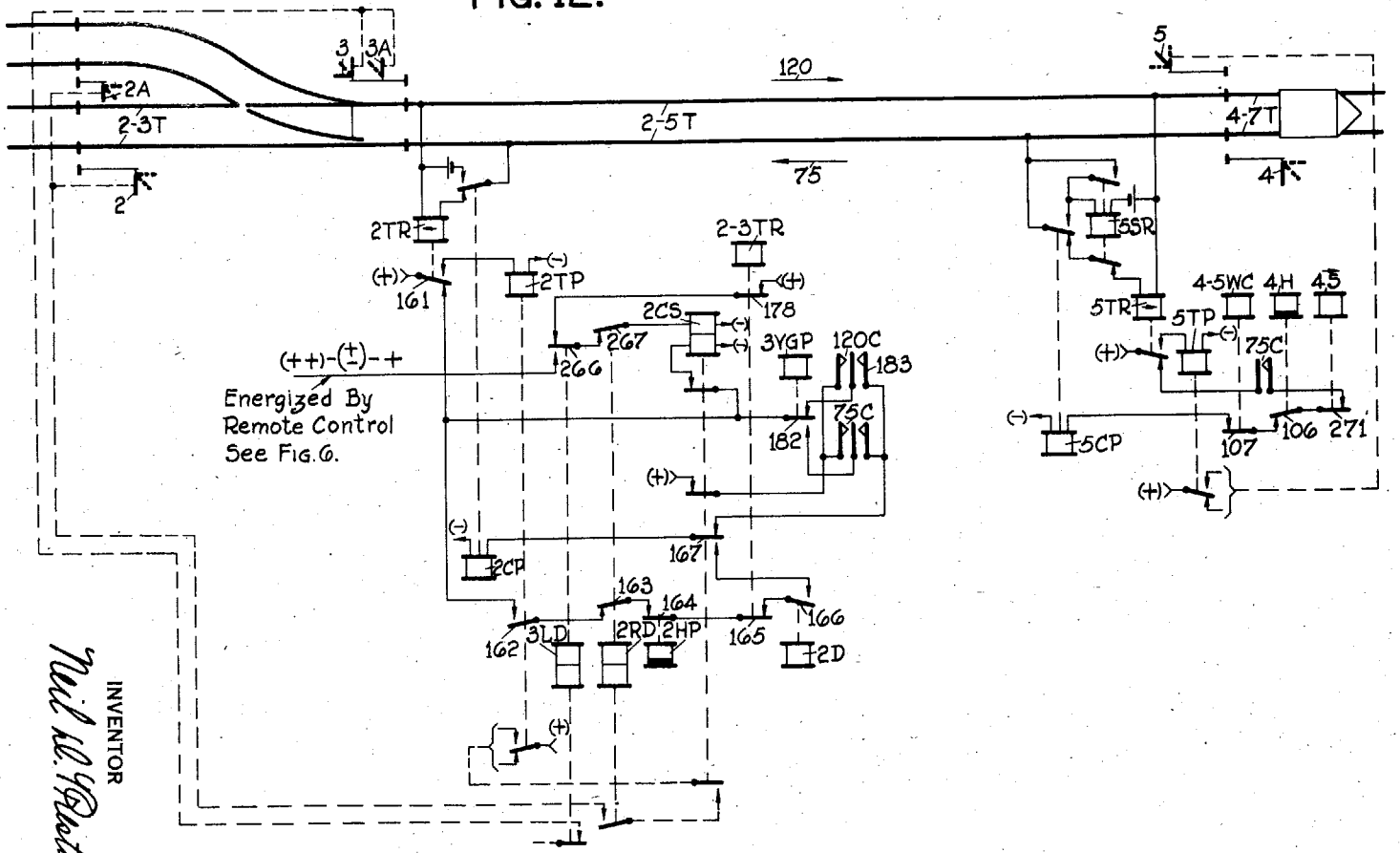

Figs. 7A to 7E inclusive, when placed side by side in that order, illustrate in detail the track circuit code communication means for the control of the signals for a particular typical portion of single track chosen for this embodiment of the present invention; and also Fig. 7A may be placed to the right of Fig. 7E for disclosing the circuit organization applying the invention to a siding track section;

Fig. 8 illustrates, as typical of the switch and signal control circuits associated with each end of each of the passing sidings, the switch and signal control circuits for a particular end of a certain one of the passing sidings;

Fig. 9 illustrates how the system provided by the present invention can be adapted to a condition in which highway crossing signals are involved;

Fig. 10 illustrates a means for checking the operation of a series track circuit relay;

Fig. 11 illustrates a means for governing the energization of an indicator lamp for a siding track section in accordance with the indications communicated to the control office from the field stations at the ends of such siding track section;

Fig. 12 illustrates a modified form of the invention in which manual control of an entering signal for a siding can impress driven code in the rear of such signal for "back-up" train movements as well as other conditions shown in Figs. 7A to 7C.

Figure 13:
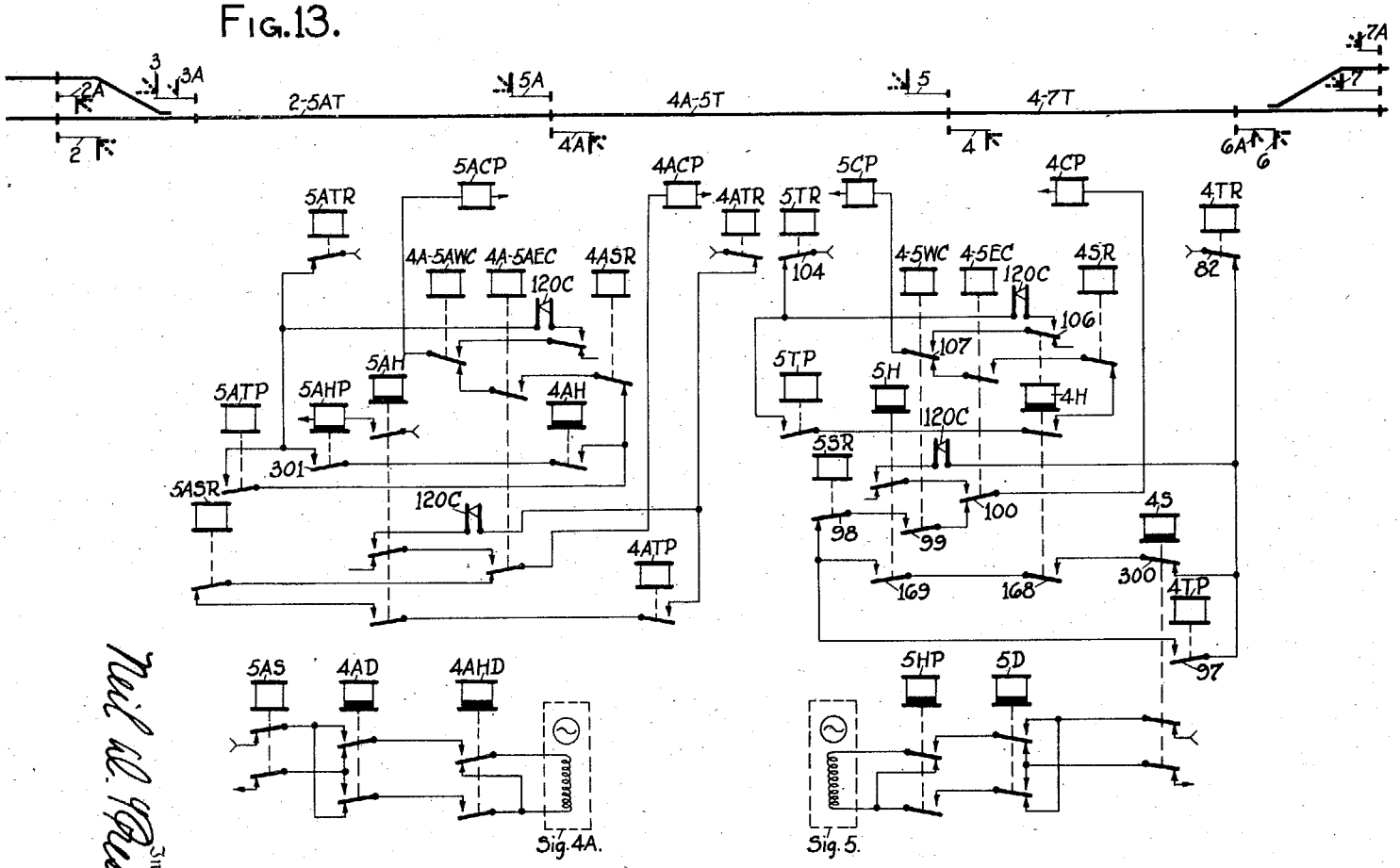

Fig. 13 illustrates a modified arrangement suitable for two pairs of intermediate signals.

For the purpose of simplifying the illustration of this embodiment of the present invention and facilitating in the explanation thereof, various parts and circuits have been shown diagrammatically rather than showing the specific construction and arrangement of parts that would be employed in practice. The various relays and their contacts are illustrated in a conventional manner and symbols are used to indicate connections to the terminals of batteries or other sources of electric current instead of showing all of the wiring connections to the terminals. For convenience in simplifying the drawings, certain of the relay contacts have been shown in a conventional written circuit manner, such contacts being identified as associated with particular relays because of the reference characters of such relays respectively appearing above those contacts.

The symbols (+) and (—) are employed to indicate the positive and negative terminals respectively of suitable batteries or other sources of direct current, and the circuits with which those symbols are used always have current flowing in the same direction. If alternating current is to be used, the symbols (+) and (—) are to be considered as instantaneous relative polarities.

In describing the present invention, reference is made from time to time to functions common to all parts of a similar character by use of the letter reference characters common to such parts without the preceding numerals characteristic of the locations or devices with which the respective parts are associated.

*Track layout.*—With reference to Fig. 1, the typical stretch of track chosen for this embodiment of the present invention is illustrated as a main stretch of single track having passing sidings A and B associated therewith. The siding A is connected to the main stretch of track by the track switch 2W at the right-hand or east end of the passing siding, and the passing siding B is connected to the main stretch of track by the track switches 3W and 4W for the respective west and east ends of the siding. It will be readily apparent, as the description of the present invention progresses, that the control apparatus and circuits provided for the particular track layout illustrated in Fig. 1 are of such a nature that they can be readily modified by those skilled in the art to render them applicable to various other track layouts requiring a different location of the signals, a different spacing of the passing sidings, or a greater number of track sections in the stretches of single track between sidings.

The track switch at each end of the sidings is power operated in this embodiment of the present invention, but it will be readily apparent to those skilled in the art how the system can be modified to be adapted to systems in which the track switches are hand operated. The track switch 3W, for example, is power operated by a switch machine 3SM (see Fig. 8) which can be, for example, of the character disclosed in the patent to W. K Howe, Patent No. 1,466,903, dated September 4, 1923. Suitable remote switch control apparatus such as shown, for example, in the patent to Hoppe et al., Patent No. 1,877,-876, dated September 20, 1932, is preferably employed to provide features such as overload protection and the like. For a proper protection of the track switch 3W against unsafe operation, a short detector track section 6—7T is provided for the track switch, such detector track section having the usual type of steadily energized track circuit with the track switch properly bonded to provide fouling protection.

In this disclosure the signals at the ends of the sidings governing traffic away from the siding are called "leaving signals" or "head block signals," while the signals governing entrance to the siding or to the main track associated therewith are called "entering signals." For example, signals 2 and 2A are head block signals at siding A for governing eastbound traffic; while signals 7 and 7A are at siding B for governing westbound traffic. Signals 3 and 3A are entering signals for governing westbound traffic entering the siding section or the siding A respectively; while signals 6 and 6A are for governing eastbound traffic over the siding section or on to the siding B respectively. Similar signals are entering signals usually provided for governing the traffic at the ends of the various sidings of any single track railroad.

Between the sidings A and B, only a double intermediate signal location, having signals 4 and 5 for governing eastbound and westbound traffic respectively, has been shown, but it should be understood that any number of double intermediate signal locations may be provided in practice, or single intermediate locations may be placed at so-called staggered locations.

The signal symbols employed in the track diagrams of this embodiment of the present invention are to be considered as indicative of the signal aspects under various conditions of traffic, rather than being indicative of a particular type of signal employed, as it will be readily understood by those familiar with the art that any suitable type of a signal can be employed with the system provided by the present invention. Thus, although semaphore signals, position light signals or light signals having individual color lamp units can be employed, the signals used in this embodiment of the present invention are of the searchlight type such as disclosed, for example, in the patent to O. S. Field, Patent No. 1,835,150, dated December 8, 1931. Each of the searchlight signals when deenergized, displays a red indication for danger or stop, and when energized with a particular polarity provides a yellow indication for caution, and when energized with the opposite polarity provides a green indication for clear. The display of the indications of certain of the signals becomes effective only upon the approach of a train.

A neutral polar relay WP (see Fig. 8) is associated with each of the track switches in the usual manner for repeating the correspondence condition of the switch points with the switch machine mechanism. Each of the WP relays is normally energized with a polarity selected in accordance with the normal or reverse position of the track switch with which it is associated. When the switch machine mechanism and/or the switch points becomes unlocked from either the normal position or the reverse position, the relay WP associated therewith is dropped away.

The trackway is divided into track sections in the usual manner, the siding section 3T being associated with the siding A, the track sections 2—5T and 4—7T being included in the stretch of single track between the sidings A and B, and the siding section 6—9T being associated with the passing siding B. Each of such track sections have coded track circuits including code transmitters and receivers at their opposite ends, while the detector track sections 2—3T, 6—7T and 8—9T are steadily energized.

For convenience in considering certain attributes of the present invention, the embodiment of the present invention indicates how the main stretch of single track can have associated therewith an outlying switch (see Fig. 7D). This outlying switch 5W is assumed to be hand operated by a trainman in accordance with instructions from the dispatcher.

With reference to Fig. 9, it is illustrated how highway crossing signals can be governed if there is a highway crossing to be protected in the stretch of single track between two passing sidings. It is believed that it will be readily apparent as the description progresses how the principles of control for the highway crossing signals can readily be applied to provide highway crossing protection where a highway crosses at a siding.

*Communication system devices.*—To simplify the disclosure of the present invention, reference is to be made to the patent to Judge et al., Patent No. 2,082,544, dated June 1, 1937, for a detailed description of the line circuit communication system employed for the communication of switch and signal controls from the control office to the respective field stations. In order that the description of such Judge et al. patent can be readily applied to the communication system of this embodiment of the present invention, the letter reference characters for the various devices of the communication system in the drawings of this disclosure are similar to the reference characters for corresponding parts disclosed in the Judge et al. patent.

The control office communication apparatus comprises change relays CH (see Fig. 3) used for initiating the system into operation responsive to the manual actuation of their respective start buttons SB for causing the transmission of the desired controls as selected by the actuation of switch and signal control levers SML and SGL respectively. The relays CD, CDS, CHP and C are provided to maintain a particular order in the transmission of controls during successive control cycles of operation when controls for more than one field station are ready to be transmitted at the same time. The selective energization of the relays NC and PC at the control office in accordance with the code selected by the code determining relays CD, applies impulses of selected polarities to the line circuit for transmission to the field stations. The relays E and EP (see Fig. 4) provide the pulsing of the line circuit while the line relay F follows the pulsing, and its repeater relays FP and 2FP operate the control office stepper consisting of stepping relays 1V, 2V, 3V, 4V, 5V, LV and the half-step relay VP. The slow release relays SA and 2SA (see Fig. 4) are used as cycle marking relays, and the relays MF, MB, DV and FC are used in connection with the reception of indications communicated from the respective field stations.

Figure 5:
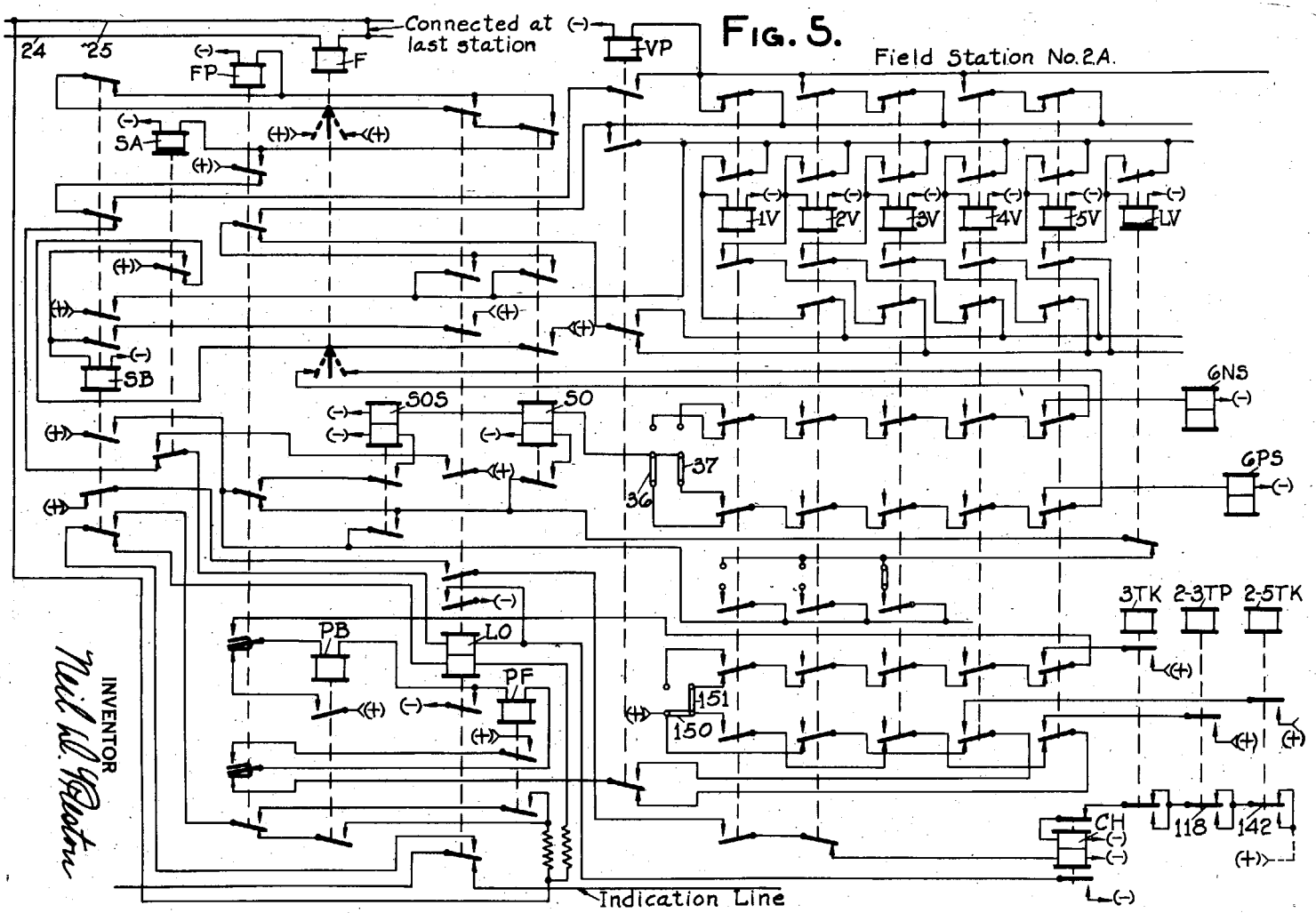
Fig. 5 illustrates, as typical of each of the field stations, the stepping relays and other control apparatus at a particular field station for the reception of controls from the control office and for the transmission of indications to the control office by line circuit code.

The field station communication apparatus for each of the field stations is similar to that illustrated in Fig. 5 for a particular one of the field stations. Such apparatus comprises a line relay F, a line repeater relay FP, cycle marking relays SA and SB, station selecting relays SO and SOS, decoding relays PS and NS, a field station stepper consisting of stepping relays 1V, 2V, 3V, 4V, 5V and LV, a half step relay VP, and relays PF, PB, LO and CH which are associated with the transmission of indications.

Each of the field locations is provided with relays which are manually controlled from the control office for governing the switch and signals and initiating the coded track circuit apparatus into operation. For example, the field station number 2A is provided with switch control relays 2WN and 2WR, as well as signal control relays 2LD and 2RD which are employed for controlling the clearing of the signals for the left or right-hand direction at that station. The relay 2B is remotely controlled for restoring the signals at that locatiton to stop conditions. When a code is received which should cause the initiation of the coded track circuit apparatus, the relay 2CS is picked up as will be described in detail hereinafter. Similar apparatus is, of course, provided for the field station number 2B.

*Track circuit and signal control devices.*—Each of the coded track circuits has a code transmitter relay CP (see Figs. 7A to 7E inclusive), and a code receiving track relay TR associated with each end thereof. It is preferable that each of the track relays TR have a polar structure arranged in such a manner as to cause the picking up of the armature of the relay only if that relay is energized with a particular polarity although such characteristics are not essential for practising the invention. Such a type of polar track relay is desirable for providing broken down joint protection.

A neutral code following repeater relay TP is provided for each of the relays TR, and such TP relay provides for the energization of a decoding transformer TF, the secondary winding of which provides for the energization of a relay H that is picked up when a seventy-five code or a code of any higher rate is being received. A secondary winding of certain of the transformers TF provides for the energization of a tuned circuit for the control of a relay D which is responsive only to the reception of a particular code such as a code of 120 rate.

The code transmitter relay CP for the end of each of the track sections at each of the field stations has associated therewith a code sending relay CS which is effective when energized to cause the transmission of a driven code by the relay CP for that end of the track section. Under certain conditions when the track circuit code communication system is active, the relay CS is effective when deenergized to render the relay CP for that end of the track section active for the transmission of an inverse code.

The coders or oscillators 120C and 75C are impulse forming devices, and the relay CP for each end of each of the coded track circuits repeats the impulses produced by one or the other of such coders at that location when it transmits driven code pulses over the track rails. The coders 120C and 75C are preferably of the oscillatory type having a magnetically rotated balance wheel acting in opposition to a clock spring to provide an oscillating operation. By using balance wheels of different weights, the different desired codes are produced. It is to be understood, however, that various types of impulse producing devices can be used in place of the oscillators 120C and 75C of this embodiment of the present invention and different rates of impulse transmission can be employed. Although similar oscillators for the various locations have been illustrated as having the same reference characters, it is to be understood that one pair of oscillators is provided for each field station and for each intermediate signal location. Inasmuch as the track circuit code communication system is normally inactive the oscillators 75C and 120C are rendered active only at times when the track circuit code communication system is to be set into operation.

The proceed and danger indications of the various searchlight signals are repeated by respective YGP and RGP relays as typically illustrated in Fig. 8. The relays YGP are used in selecting the codes to be applied to the track circuits, and the relays RGP are used in connection with the locking relays AS at each of the field stations. The lock relays AS prevent the power operation of the track switches under certain traffic conditions.

A relay TK is associated with each of the track sections adjacent a detector track section at each end of each of the passing sidings, and such relay is associated with the communication of approach indications to the control office. A series relay SR is provided at the intermediate signal location in the track circuit extending in each direction from such location for use in connection with the provision of proper approach indications and approach control.

At the control office suitable relays and circuits are provided for decoding indication codes received and causing the selective energization of indicator lamps on the control panel of the control machine such as the lamps TE illustrated in Fig. 3. Although such decoding relays and circuits are not shown in detail, the control of the indicator lamps is diagrammatically illustrated by dotted lines indicative of decoding means corresponding to that shown in the above mentioned Judge et al. patent to which reference is to be made for a more complete disclosure. However, the control of the lamps such as lamp 6—9TE of of Fig. 3 is quite different in view of the organization which provides for the control of this single lamp from either of two field stations at the opposite ends of the siding B. This control has been shown in Fig. 11. A station relay ST is responsive to the call of its respective field station, andtwo magnetic stick relays TKP having polar structures are provided for governing the energization of each of such indicator lamps.

Correspondence relays NCR and RCR are associated with each of the track switches for selecting the clearing of signals at that field station.

Directional stick relays S, and various repeater relays are employed at certain of the signal locations for purposes which will be better understood as the description of the invention progresses.

The adapting of the system to conditions involving the control of highway crossing signals as illustrated in Fig. 9 involves the use of steadily energized track circuits for the respective track sections 4—7T1 and 4—7T2. Mechanically interlocked relays 4—7TP1 and 4—7TP2 are employed in a manner well known to those skilled in the art for the control of the flashing signals FS1 and FS2, the flashing of the lamps of the signals being effected by a suitable flashing relay FL. It is to be understood that other types of highway crossing control apparatus commonly employed in practice can be substituted for the apparatus disclosed in this embodiment of the present invention.

Having considered the general organization of the apparatus of this embodiment of the present invention together with the general function of the various devices, it is believed that further description of the present invention can best be set forth upon considering various conditions of operation under typical traffic conditions.

Inasmuch as the system is symmetrical for both directions of traffic, the description of the mode of operation will be set forth principally for conditions associated with the passage of eastbound trains. The mode of operation described is therefore to be considered as typical of that provided under similar traffic and operating conditions for the opposite direction of traffic.

*Operation*

*General.*—In clearing a signal at any selected field station there are two general conditions that have to be fulfilled. In the first place, the clearing of the signal must be manually designated at the control office so as to communicate a signal clearing code for a selected direction of traffic from the control office to the particular field station involved. Secondly, a driven track circuit code must be received through the track rails from the next signal in advance indicating the absence of traffic in the stretch before the particular signal designated to be cleared by an operator at the control office can actually indicate proceed.

The fulfillment of the first of the above conditions is effected in a manner well known in present practice in that during a control cycle a composite code is transmitted, the first portion of the code selecting a field station to receive the controls, and the second portion calling for a selected position for the track switch and a selected direction for clearing a signal at that field station.

The fulfillment of the second of the above conditions for the clearing of a signal, however, involves many conditions. Broadly speaking, the coded track circuit apparatus for the stretch of track in advance of the signal to be cleared must be set into operation as it is normally inactive, and the proper direction of driven code transmission must be established. It will be seen that when a control is received at a field station for the clearing of a head block signal at one siding, the track circuit code transmitter for the head block location at the next siding must be initiated for the transmission of a driven code toward the head block signal desired to be cleared. This is done by picking up a code sending relay CS at the next field station in advance of the signal to be cleared by energizing such relay in response to the same signal clearing code transmitted to the signal desired to be cleared. Such condition is illustrated in Fig. 2A where it is assumed that the signal 2A is desired to be cleared. A code is transmitted from the control office for the clearing of the signal having the characters (+) (+) (+) (−) (+) (−).

According to the assignment of the station codes, each pair of field stations such as the stations 2A and 2B is assigned a single station selecting code. Thus, the stations 2A and 2B will both be selected to complete a control cycle of operation by the station relays SO and SOS for their respective stations, only if the first two characters of the composite code are (+) (+). In the code type of the line circuit communciation system employed, all field stations except a particular pair of stations, are eliminated after the transmission of the station selecting impulses assigned for the selection of that pair of field stations.

After a pair of field stations is selected, the character of the following impulse selects which station of the pair is to receive switch and signal controls, and which station of the pair is to initiate the transmission of track circuit code. If such impulse is (+), the field station 2A is selected for the reception of switch and signal controls, and if that impulse is (−) the station 2B is selected for the reception of switch and signal controls. When the signal clearing code transmitted to the selected one of a pair of stations is for clearing a signal governing traffic toward the other station of the pair, then such code is also effective to energize the code sending relay CS at that other station. If the signal to be cleared is for a direction away from the other station, then such relay CS is not energized and other operations occur which will be described later.

Thus, with reference to Fig. 2A, the relay 2RD is picked up by the code (+) (+) (+) (−) (+) (−) for the clearing of signal 2A for governing traffic to the right, and at the same time the relay 7CS at field station 2B is picked up responsive to the same code for initiating the transmission of a driven code through each of the track sections of the stretch of single track between the two passing sidings. The 75 rate is transmitted in the track section 4—7T because the signal 6 has not been cleared, and thus the signal 4 is conditioned for the display of a caution indication. In accordance with the caution condition of signal 4, a 120 driven code is transmitted in the track section 2—5T for the clearing of the signal 2A.

The conditions with respect to the control of signals governing passage of trains through the siding sections is somewhat different from that described for the governing of trains through the stretch of single track between sidings in that the initiation of the coded track circuit apparatus for the siding track section in advance of an entering signal is dependent upon the transmission of a start pulse through the rails of the siding section in advance of the signal to be cleared following the reception of the signal clearing code for such entering signal. This condition is illustrated in Fig. 2B where an operator has caused the transmission of a signal clearing code for the signal 6 having the characters (+) (+) (−) (+) (+) (−). It will be noted from the description as it has been set forth that the first two characters (+) (+) select the pair of field stations including stations 2A and 2B, and the following impulse which is (−) selects the station 2B for the reception of switch and signal controls. The fact that the fourth impulse is (+) provides that the track switch 3W will be in its normal position, and the fact that the last two impulses of the code are (+) (−) provides for the energization of the relay 6RD for clearing the signal 6, which cannot occur, however, until a track circuit code is received through the track rails of track section 6—9T from the opposite end. The reception of the signal clearing code for signal 6 causes the transmission of a starting pulse from left to right in the track section 6—9T to render the code transmitter at the right-hand end of the track section active for the transmission of a driven code from right to left by the picking up of code sending relay 9CS. This is shown in Fig. 2C where it is illustrated that the relay 9CS has been picked up responsive to the start pulse, and the energization of such relay has been effective to transmit a 75 driven code through the track section 6—9T toward the signal 6. The reception of the 75 code at the left-hand end of track section 6—9T, under such conditions, causes the relay 6H to be picked up, so that the signal 6 is caused to display a caution indication by reason of the energized condition of the relay 6RD.

Having thus considered the general mode of operation of the system for the clearing of signals in advance of a train, the specific details of operation will now be described.

*Normal conditions.*—Inasmuch as the line circuit code type communication system employed is normally at rest, and inasmuch as the coded track circuit apparatus is normally inactive, most of the relays of the system are normally deenergized. The signals are therefore normally at danger with their mechanisms deenergized.

The track relays for the detector track sections are, of course, normally energized. Also, the indication relays TK for the approach indications are maintained picked up by stick circuits which are energized under normal conditions of the system. Thus, the relay 3TK (see Fig. 7A) associated with the track section 3T is normally held up by an obvious stick circuit closed at front contact 20 of relay 3LDPP. The front contact 21 of the relay 3LDP is closed because such relay is energized through back contact 22 of the relay 3LD, which front contact 21 completes an obvious stick circuit for the relay 3LDPP.

In a similar manner, the relay 2—5TK (see Fig. 7B) for the track section 2—5T is normally maintained picked up by a stick circuit closed at front contact 220 of relay 2CSP and back contact 221 of relay 2S. The relay 2CSP is normally energized as a back contact repeater of the relay 2CS.

The circuits which have been described for the relays 3TK and 2—5TK are typical of the circuits by which the relays 6—9TK and 4—7TK respectively are normally energized by their respective stick circuits.

Figure 4:
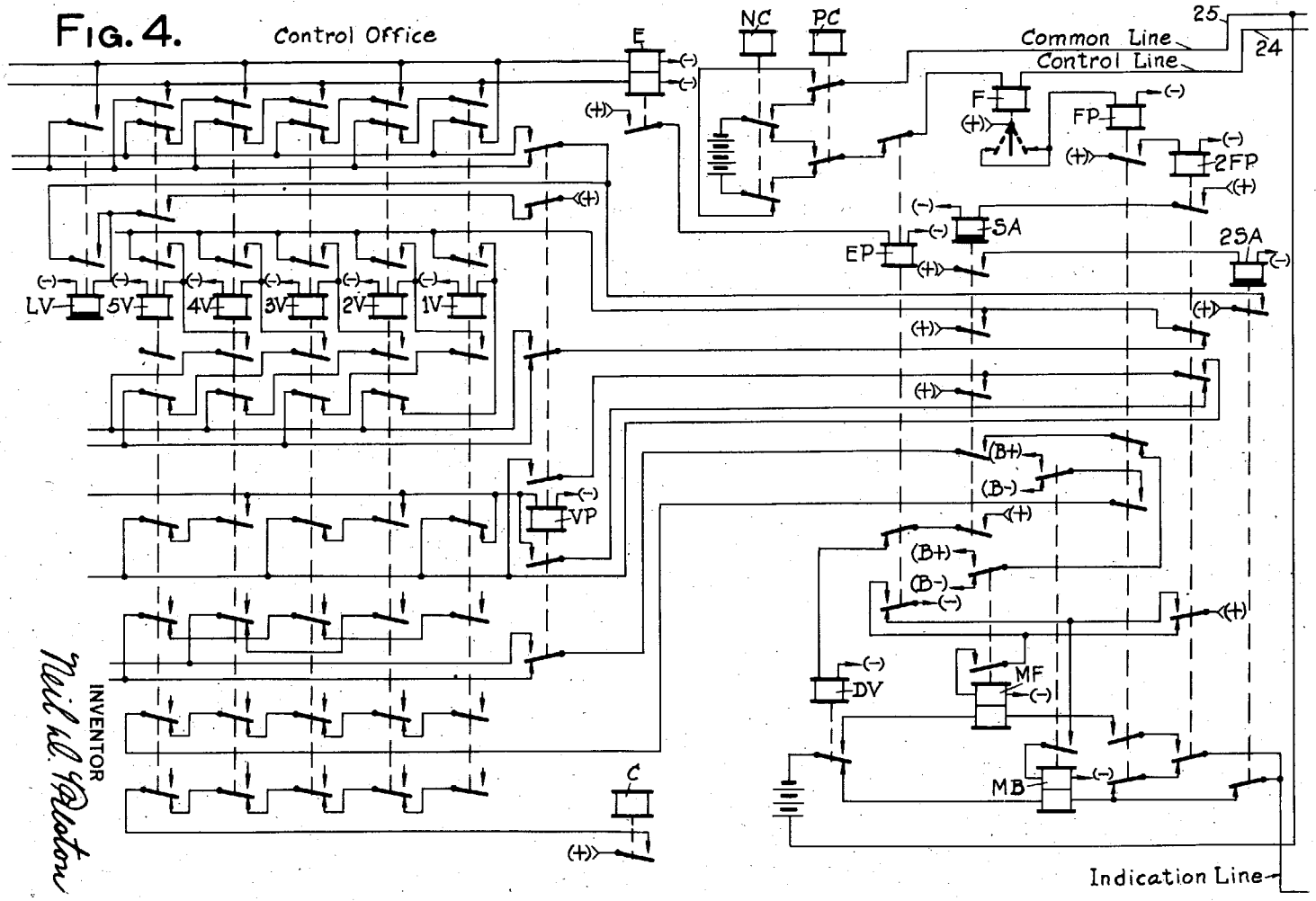
Fig. 4 illustrates the circuits for the stepping relays at the control office, together with the means for transmitting impulses over the line circuit to the field stations, and the control apparatus for receiving indications communicated from the field stations to the control office.

*Control office transmitter.*—With reference to Fig. 4, it will be noted that the polarity of the impulses transmitted during a control cycle is selected as positive or negative by the respective energization of the relays PC and NC, and the pulsing of the line circuit is effected by the relay EP. It will be assumed that the energization of the relay PC selects the positive energization of the line circuit by the application of positive battery to the control line wire 24, and that the energization of the relay NC selects the negative energization of the line circuit by the application of negative battery to the line wire 24. The control line wire 24 is connected at the most remote field station to the common line wire 25.

With reference to Fig. 3, it will be noted that the relays 1CD and 2CD select the codes for transmission to the field stations 2A and 2B respectively. The first two characters of the code for a control cycle form a station selecting code which selects a particular pair of field stations, and therefore such first two impulses will correspond for the stations 2A and 2B. The first two impulses are predetermined to be (+) (+) when the relay 1CD is energized in accordance with the positioning of the jumpers 26 and 27. The jumpers 28 and 29 associated with the relay 2CD are correspondingly positioned to determine that the first two impulses of a control code will be of positive polarity if relay 2CD is energized.

If the switch and signal controls to be transmitted are for the station No. 2A of the pair of field stations, the impulse following the station code characteristic of the pair of stations will be of positive polarity (+) because the closure of front contact 30 of relay 1CD connects energy to the circuit for the positive impulse transmitter relay PC for the third impulse. If the relay 2CD is picked up for determining the code of the station No. 2B of the pair of field stations, the impulse following the station code is of negative polarity, because the energization of the relay 2CD closes front contact 31 and establishes a circuit by which the relay NC can be picked up for the transmission of a negative impulse for the third impulse of the cycle of operation.

After the station selecting impulses have been transmitted, the following impulse is for the communication of a switch control for the field station selected, and the character of the impulse is selected as (+) or (—) by the respective left or right-hand position of the switch control lever SML belonging to the track switch under consideration. The contact 32 of lever 2SML, for example, selects the character of the switch control impulse to be transmitted to the field station No. 2A.

The last two impulses of a control cycle are used for the transmission of signal controls in the usual manner. If a signal control lever SGL associated with a field station being called is operated to its right-hand position, the last two impulses of the cycle are respectively (+) and (—), but if such lever is actuated to its left-hand position, the last two impulses of the control cycle are respectively (—) and (+). If a code is to be transmitted for the restoration of a signal to stop, the lever SGL for such signal is maintained in its center position throughout the cycle, and such position of the lever selects the last two characters of the control cycle to be respectively (—) (—). The selection of the signal control characters of a control cycle for the transmission to the field station No. 2A, for example, is effected by the contacts 33 and 34 of the signal control lever 2—3SGL.

From the make-up of the code for transmission during a control cycle as has just been described, it is believed to be readily obvious to those familiar with the art that the number of impulses of the code will vary in accordance with the requirements of practice because the number of impulses required for station selection will vary with the number of stations. That is, the number of impulses required for the selection of different pairs of field stations is dependent upon the number of field stations in the system, the number of different pairs of stations which can be included in a system for a given number of station impulses of the station selecting code for the pairs of field stations being equal to two raised to the power of the number of impulses in that portion of the code. In some duplex systems, such as the one employed in this embodiment of the present invention, a phantom code having all negative characters is used in the communication of indications, and such arrangement obviously takes one of the codes available for station selection. Although the various codes are distinctive in the system of this embodiment of the present invention because of the relative polarities of the impulses, it is to be understood that systems employing impulses of a different nature such as long and short impulses could as well be employed.

In accordance with the usual mode of manipulation of a centralized traffic control machine, each time an operator wishes to establish a route and clear its signal, he positions the proper switch and signal levers SML and SGL, for such signal location and then he depresses the start button SB for the transmission of the controls thus selected to the field station involved. A control cycle of operation is thus initiated during which the selected impulses are transmitted as described in the above mentioned Judge et al. patent and briefly outlined above.

*Field station selection for control reception.*—Inasmuch as the field station code receiving means corresponds to that which is shown and described in the above mentioned Judge et al. Patent No. 2,082,544, reference is to be made to that patent for the description of the mode of operation for the field station code receiving apparatus shown in Fig. 5. The field station apparatus shown in that figure is provided for each of the field stations, but the jumpers 36 and 37 are positioned in accordance with the station code (+) (+), belonging to the pair of field stations of which the stations Nos. 2A and 2B are members. Therefore, the same positioning of these jumpers at both field stations 2A and 2B causes both stations to step throughout a control cycle in which switch and signal controls are communicated to either of the two stations. The relays SO and SOS, therefore, allow the field stations 2A and 2B to be active throughout a control cycle only when the first two characters of the code are (+) (+). The pairing up of the field stations for the reception of controls obviously does not disturb the assignment of indication codes, such codes being assigned according to the description as set forth in the above mentioned Judge et al. patent.

Figure 6:
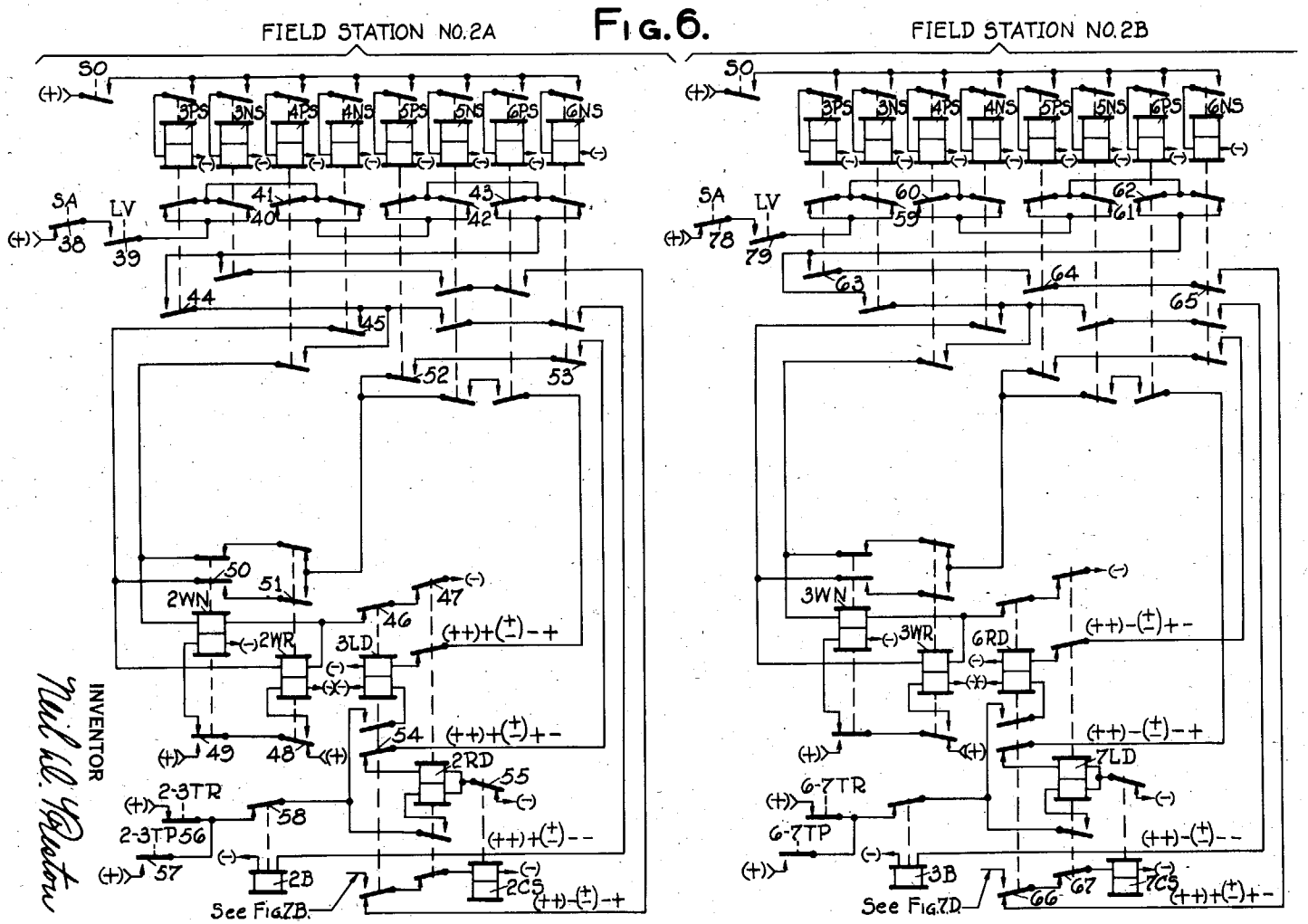
Fig. 6 illustrates as typical of the respective field stations, the decoding means provided for a pair of field stations for selectively controlling the switch, signal and coded track circuit code sending relays in response to the application of distinctive codes at the control office to the centralized traffic control line circuit extending to the field stations.

*Reception of controls by decoding apparatus.*—With reference to Fig. 6, it will be seen that the decoding apparatus has been shown for two field stations, namely, field station No. 2A at the siding end of Fig. 7A and field station No. 2B at the siding end of Fig. 7E. The decoding apparatus for each field station is, of course, controlled by its respective field station selecting and stopping apparatus as shown in Fig. 5.

After the first two impulses of a control cycle have been received at a field station and effected its selection as above described, a decoding relay PS or NS is picked up for each successive positive or negative impulse which follows. The circuits for the energization of the relays 6PS and 6NS (see Fig. 5) are typical of those provided for the other relays PS and NS associated with the respective channels or steps. The relays PS and NS of Fig. 6 can be readily associated with the various impulses of the control code to which they belong by the numeral prefixes of the letter reference characters which correspond with the impulse numbers of the control cycle. It is provided that the controls for the application relays WN, WR, LD, RD, B and CS are executed at the end of a control cycle after all of the impulses of that cycle have been received, the relays PS and NS for the various channels being maintained energized by obvious stick circuits until the end of the execution period.

To consider as a specific example how the application relays can be energized upon the reception of a control cycle, it will be assumed that a control cycle is transmitted from the control office for the operation of the track switch 2W to its reverse position and for the clearing of the signal 2A (see Fig. 2A) for governing traffic to the right. Such code consists of the characters (+) (+) (+) (—) (+) (—).

The first two impulses of any code effects the selection of a pair of stations, and this code having (+) (+) selects the field stations Nos. 2A and 2B having decoding apparatus in Fig. 6. The remaining impulses of the code energizes the decoding relays 3PS, 4NS, 5PS and 6NS of both stations.

At the field station No. 2A, the dropping away of the relay SA at that field station, subsequent to the picking up of the last step relay LV, closes an execution circuit for the upper winding of the relay 2WR extending from (+), including back contact 38 of relay SA, front contact 39 of relay LV, back contact 40 of relay 3NS, back contact 41 of relay 4PS, back contact 42 of relay 5NS, back contact 43 of relay 6PS, front contact 44 of relay 3PS, front contact 45 of relay 4NS, upper winding of relay 2WR, back contact 46 of relay 3LD, and back contact 47 of relay 2RD, to (—).

The picking up of relay 2WR opens the stick circuit by which the relay 2WN has been energized at back contact 48. When relay 2WN is dropped away an obvious stick circuit is closed at back contact 49 for the energization of the lower winding of the relay 2WR. The dropping away of the relay 2WN closes a circuit by which the upper winding of the relay 2RD is energized, extending from (+), including the contacts of the relays PS and NS which have been described in the circuit for relay 2WR, and in addition back contact 50 of relay 2WN, front contact 51 of relay 2WR, front contact 52 of relay 5PS, front contact 53 of relay 6NS, back contact 54 of relay 3LD, upper winding of relay 2RD, and back contact 55 of relay 2CS, to (—).

The inclusion of back contact 55 of relay 2CS in the circuit provides that the relay 2RD cannot be picked up for clearing a signal to the right (such as signal 2 or 2A) if the opposite direction of traffic is established through the stretch of single track extending between the sidings, requiring the energized condition of the relay 2CS which is associated with the transmission of driven track circuit codes in the direction of the field station No. 2B.

The relay 2RD is maintained picked up by a stick circuit in the usual manner dependent upon the use of contacts 56 and 57 of track relay 2—3TR and track repeater relay 2—3TP for providing a momentary break in such stick circuit when a train accepts the signal associated with such relay. The inclusion of back contact 58 of relay 2B in the stick circuits for relays 3LD and 2RD also provides that either relay can be dropped away upon the reception of a stop code in which the last two characters are (—) (—), to which the relay 2B is responsive.

It is believed to be readily apparent from the circuits which have been described by which the relays 2WR and 2RD can be picked up and maintained energized during a control cycle, how the relay 2WN can be energized when the normal position of the track switch is called for, and how the relay 3LD can be picked up if a code is communicated for the clearing of a signal at that field station governing traffic to the left.

At the field station No. 2B with the PS and NS relays picked up as above described, the dropping away of the relay SA following the picking up of the last stepping relay LV at the end of the cycle of operation, closes an execution circuit for the code sending relay 7CS at that station extending from (+), through a circuit including back contact 78 of relay SA, front contact 79 of relay LV, back contact 59 of relay 3NS, back contact 60 of relay 4PS, back contact 61 of relay 5NS, back contact 62 of relay 6PS, front contact 63 of relay 3PS, front contact 64 of relay 5PS, front contact 65 of relay 6NS, back contact 66 of relay 6RD, back contact 67 of relay 7LD, upper winding of relay 7CS, to (—).

The picking up of the relay 7CS completes a stick circuit for this relay including its lower winding as shown in detail in Fig. 7D, which stick circuit and its supplemental stick circuit including oscillator contacts will be described in detail with respect to their functions and cooperation while considering the clearing of a head block signal, it being sufficient for the time being to understand that the code sending relay 7CS is maintained energized.

It will be noted that a back contact 67 of the relay 7LD is included in the pick-up circuit just described for the code sending relay 7CS. This is to prevent the picking up of the relay 7CS and causing the release of the relay 7LD and the consequent restoration of a signal for westbound traffic to stop, should the operator inadvertently attempt to clear the opposing signals governing the entrance to the stretch of track for eastbound train movements. Thus, it is seen that the code sending relays CS are interlocked with the signal clearing relays LD and RD in such a way that a signal once cleared cannot be interrupted by an inadvertent operation of a lever other than its own control lever either by the sending of a code that might drop an LD or RD relay or by the sending of a code that might drop the code sending relay CS then effective.

Having considered the manner in which the transmission of a signal clearing control code can be received at one field station of a pair to act on a signal clearing relay and can be received at another field station of the pair to act on a code sending relay, it is believed expedient to now consider the manner in which these remotely controlled relays act on the coded track circuit signaling apparatus to cause the clearing of a signal, which in the present instance is assumed to be the signal 2A (see Fig. 2A).

*Clearing of a head-block signal.*—To consider the mode of operation of the system under a typical traffic condition, it will be assumed that an eastbound train occupies the siding A in approach to the leaving or head-block signal 2A. When an operator at the control office desires to cause the clearing of the signal 2A for governing the passage of the train in the direction of the siding B, he causes the transmission during a control cycle of a code having the characters (+) (+) (+) (—) (+) (—) for the picking up of the signal control relay 2RD in a manner which has been described. It has also been described when considering the control of the application relays how the relay 7CS at the next field station is picked up upon the reception of that same code.

Thus, the relays 2RD and 7CS are both picked up upon the reception of the signal clearing code transmitted during a single control cycle (see Fig. 6). The relay 7CS, however, is responsive only to a code transmitted for the clearing of signal 2A or signal 2 at field station No. 2A. More specifically, the relay 7CS can be picked up only upon the reception at the field station No. 2B of the code (+) (+) (+) (—) (+) (—) for the clearing of signal 2A or the code (+) (+) (+) (+) (+) (—) for the clearing of signal 2.

When the relay 7CS has been picked up, a stick circuit is established for such relay (see Fig. 7D) extending from (+), including back contact 68 of track relay 7TR, front contact 69 of relay 7CS, lower winding of relay 7CS, to (—).

The picking up of the relay 7CS, with the signals 6 and 6A at stop as indicated in Fig. 2A, causes the transmission of a 75 driven code from right to left in the track section 4—7T. The code transmitter relay 7CP is picked up for each operation of the oscillator 75C by the energization of a circuit extending from (+), including back contact 68 of track relay 7TR, back contact 73 of relay 6YGP, contact 74 of oscillator 75C, front contact 75 of relay 7CS, and winding of relay 7CP, to (—).

The closure of front contact 76 of relay 7CP for each impulse of the relay 7CP applies a driven code pulse to the track circuit 4—7T for the energization of the relay 4TR at the opposite end of such track circuit. This track circuit for track relay 4TR extends from the positive terminal of track battery 77 including front contact 76 of relay 7CP, lower rail of track section 4—7T, back contact 80 of relay 4CP (see Fig. 7(C), back contact 81 of relay 4SR, winding of relay 4TR, and upper rail of track section 4—7T, to the negative terminal of track battery 77.

The pulsing of the contact 82 of relay 4TR causes the repeater relay 4TP to follow the code, and the pulsing of contact 83 of relay 4TP alternately energizes and deenergizes the upper portion of the primary winding of transformer 4TF so as to induce an alternating current voltage in the secondary winding of the transformer. The energization of the secondary winding 84 of transformer 4TF by alternating current causes the direct current energization of the relay 4H through the medium of the rectifying contact 85 of relay 4TP. Relay 4H is therefore picked up whenever a code is received. The relay 4H (as well as the other H relays) has slow acting characteristics so that it remains picked up so long as code pulses are received and does not follow the "on" and "off" periods of the code. It will be noted that the front contact 86 of relay 4H is included in the circuit for the lower portion of the primary winding of transformer 4TF as an energy saving contact to prevent the energization of the lower portion of the primary winding of the transformer 4TF when the relay 4TP is inactive. But the first picking up of the relay 4H closes front contact 86 so that the relay 4H receives the full benefit of opposite energization of the primary of transformer 4TF.

The repeater relay 4HP is picked up upon the closure of front contact 87 of relay 4H, and the picking up of such relay establishes an obvious circuit closed at front contacts 88 and 89 for the energization of the mechanism of signal 4 to cause such signal to indicate caution. The polarity of the circuit for providing the caution indication is selected by back contacts 90 and 91 of relay 4D.

The picking up of the relay 4H closes a circuit by which the traffic direction relay 4—5WC is picked up, extending from (+), including front contact 92 of relay 4H, back contact 93 of relay 5HP, winding of relay 4—5WC, and back contact 94 of relay 4—5EC, to (—). An obvious stick circuit is closed for the relay 4—5WC at front contact 95 of the repeater relay 4HP to shunt contacts 92 and 93 out of the circuit just described. The picking up of relay 4—5WC closes an obvious circuit at front contact 96 for the energization of the signal lamps of signals 4 and 5.

In accordance with the picking up of the relay 4—5WC, a circuit is closed by which the relay 4CP becomes active for the transmission of an inverse code from left to right in the track section 4—7T. At the end of each impulse of the driven code received by relay 4TR, the relay 4CP is picked up by the momentary closure of a circuit extending from (+), including back contact 82 of relay 4TR, front contact 97 of relay 4TP, back contact 98 of relay 5SR, front contact 99 of relay 4—5WC, back contact 100 of relay 4—5EC, and winding of relay 4CP, to (—). This circuit for relay 4CP is closed only during the drop away time of relay 4TP, which is sufficiently short to allow the relay 4CP to again assume its dropped away condition before the next pulse of the driven code arrives for relay 4TR.

At the right-hand end of the track section 4—7T, the reception of the inverse code causes the pulsing of contact 101 of track repeater relay 7TP (see Fig. 7D), and the pulsing of such contact causes the energization of the relays 7H and 7HP in a manner similar to that which has been described in detail for the energization of the relays 4H and 4HP.

It will be noted that the reception of an inverse code at the right-hand end of the track circuit 4—7T causes the track relay 7TR (see Fig. 7D) to be picked up for each pulse of such code which, of course, causes the intermittent opening of back contact 68 included in the stick circuit for the relay 7CS. However, the relay 7CS is maintained energized during the time that the back contact 68 of the relay 7TR is opening for such inverse code pulses by reason of a supplemental stick circuit extending from (+), and including front contact 70 of relay 7CS, contact 71 of oscillator 120C if relay 6YGP is picked up, or contact 72 of oscillator of 75C if relay 6YGP is dropped away, as selected by contact 73 of relay 6YGP, front contact 69 of relay 7CS, lower winding of the relay 7CS, to (—).

The movable contacts of the oscillators 120C and 75C operate to the right and to the left in accordance with their respective code rates, and when in left-hand positions close contacts, such as contact 74, for energizing the transmitter relay 7CP to apply a driven code pulse, but when in right-hand positions close contacts, such as contact 72, for completing a stick circuit for the relay 7CS.

In other words, the contacts 71 and 72 of the oscillators 120C and 75C respectively are closed during the "off periods" of a driven code, during which "off periods" an inverse code pulse may be received by the track relay 7TR. Thus, by providing a stick circuit for the relay 7CS which is closed during these "off periods," the track relay 7TR may be operated by the pulses of an inverse code without dropping the relay 7CS. It should, of course, be understood that this same mode of operation applies to the relay 2CS of Fig. 7B.

Although the features of operation involved in shutting down the coded track circuit apparatus by dropping out the relay 7CS under proper conditions will be described in detail hereinafter, it may be appropriate to mention at this time some of the conditions of operation in connection with the reception of inverse code pulses by the track relay 7TR and the maintenance of the relay 7CS.

If for some reason the relay 7TR remains energized longer than the usual "off period" of a driven code, the contacts of the oscillators 120C and 75C will be moved to the left opening the auxiliary stick circuit of the relay 7CS allowing it to drop away. Under such circumstances, the movement of the contacts of the oscillators 120C and 75C to the left cannot energize the relay 7CP because back contact 68 of track relay 7TR is open so that the relay 7TR can remain energized so long as energy is applied across the rails of the track circuit 4—7T. A code sending relay provided with similar stick circuits for maintaining it energized when the associated track relay is operated by inverse code pulses, but automatically releasing this code sending relay when the associated track relay is energized by driven code pulses, is disclosed and claimed in my prior application Ser. No. 413,021, filed September 30, 1941; and it is not intended to make any claims in this case to subject matter disclosed in that prior application. This characteristic is used in accordance with the present invention for the shutting down of the system under proper conditions as will be described later, and also provides for checking against improper operation due to stray currents in the track circuit as has been fully described in my prior application, Ser. No. 365,065, filed November 9, 1940, and no claim is made to subject matter in this application which is found in such earlier filed application.

The reception at the intermediate signal location of a 75 driven code transmitted from right to left in the track section 4—7T causes the relay 5CP (see Fig. 7C) to be active for the transmission of a 120 driven code from right to left in the track section 2—5T. The relay 5CP is picked up for each operation of the oscillator 120C by the energization of a circuit extending from (+), including back contact 104 of track relay 5TR, contact 105 of oscillator 120C, front contact 106 of relay 4H, front contact 107 of relay 4—5WC, and winding of relay 5CP, to (—). Each closure of front contact 108 of relay 5CP causes the transmission of a 120 driven code pulse in the track section 2—5T by applying the pulse to the track circuit in a similar manner to that which has been described for the track section 4—7T, except that this circuit includes the series relay 5SR which has characteristics such as to be responsive only to the higher current flow from its associated track battery which exists when the track rails are shunted by a train.

The reception of the 120 driven code at the left-hand end of track section 2—5T causes the pulsing of relay 2TR which is repeated by relay 2TP, and the pulsing of contact 109 of relay 2TP causes the relays 2H and 2D to be picked up. The relay 2H is picked up by the energization of a circuit similar to that which has been described for the energization of the relay 4H, and the relay 2D is picked up by the energization of its tuned circuit in accordance with the 120 driven code being received. Sufficient energy flows in the tuned circuit for the relay 2D to cause such relay to be picked up only when a 120 code is received, such circuit including the secondary winding 110 of transformer 2TF, condenser 111, and the secondary winding 112 of transformer 2TF1. The relay 2D is energized by direct current from the secondary winding of the transformer 2TF1 through the medium of a full-wave rectifier 113 in the usual manner.

In accordance with the control code transmitted from the control office, the track switch 2W is operated to its reverse position upon the picking up of the relay 2WR in a manner well known to those familiar with the art and typically illustrated in Fig. 8 for the power operation of the track switch 3W. Referring to Fig. 8, it will be noted that the switch machine 3SM for the track switch 3W is operated to its reverse position upon the closure of front contact 114 of relay 3WR, if the locking relays 6AS and 7AS are picked up, and if the detector track section 6—7T is unoccupied by a train. When the control relay 3WN is picked up and the switch 3W is in correspondence therewith and locked as indicated by switch position relay 3WP, then the normal correspondence relay is energized through an obvious circuit. On the other hand, if the relay 3WR is picked up, then the relay 3RCR is energized when correspondence exists.

After the track switch 2W at the right-hand end of siding A has been locked in its reverse position, a circuit is established for the picking up of the reverse correspondence relay 2RCR to properly select the signal control circuits. The correspondence relay 2RCR is energized under such conditions in a manner similar to that which has been illustrated as typical for the relay 3RCR (see Fig. 8) associated with the track switch 3W.

With reference to Fig. 7B, it will be seen that the remotely controlled relay 2RD is picked up so that upon the picking up of the relay 2H and its repeater relay 2HP in response to the reception of a driven code over the track rails of the stretch of single track, the signal 2A will be cleared because the track switch 2W (see Fig. 7A) is in a reverse position as indicated by the energized condition of the reversed correspondence relay 2RCR and the deenergized condition of the normal correspondence relay 2NCR. The polarity applied for the energization of the signal 2A is dependent, of course, upon the rate of the driven code received at this head-block signal location. In brief, if the code rate is 75, then the relay 2D is deenergized and a polarity is applied which causes it to indicate caution, but if the code rate is 120 then the relay 2D is energized and the opposite polarity is applied to the signal 2A which causes it to give a proceed indication.

More specifically, with the relay 2D picked up, the signal 2A is energized by a circuit closed from (+) and including front contact 223 of relay 2D, front contact 224 of relay 2—3TR, back contact 225 of relay 2NCR, front contact 226 of relay 2RCR, back contact 227 of relay 2CS, front contact 228 of relay 2HP, front contact 229 of relay 2RD, windings of signal mechanism of signal 2A, front contact 230 of relay 2RD, front contact 231 of relay 2HP, front contact 232 of relay 2D, to (—).

When the eastbound train accepts the signal 2A after it has been cleared, it proceeds onto the detector track section 2—3T causing the dropping away of the track relay 2—3TR for the detector track section which in turn is repeated by relay 2—3TP (see Fig. 7A). With reference to Fig. 5, the shifting of contact 118 of relay 2—3TP causes the dropping away of the relay CH for the initiation of an indication cycle to transmit an OS indication to the control office in the usual manner. The dropping away of the track relay 2—3TR prior to the dropping away of this repeater relay 2—3TP also causes an interruption in the stick circuit for the relay 2RD (see Fig. 6) and causes that relay to be dropped away and thereby to restore the signal 2A to stop.

The transmission of track circuit codes, however, through the track sections 4—7T and 2—5T have not been disturbed by the passage of the train through the OS track section, as codes are still transmitted through such track sections, the 75 driven code in the track section 4—7T being effective to cause the caution indication of the intermediate signal 4. These conditions are diagrammatically illustrated in Fig. 2B.

*Clearing of an entering signal.*—According to the conditions of Fig. 2B, it is assumed that an operator at the control office causes the transmission of a control for the clearing of signal 6. In response to the code (+) (+) (—) (+) (+) (—) transmitted during a control cycle for the clearing of signal 6, the relay 6RD is picked up at field station No. 2B by the energization of circuits similar to those shown and described as being associated with the field station No. 2A (see Fig. 6).

Upon the picking up of the relay 6RD, a circuit is closed whereby the relay 6CP (see Fig. 7E) is picked up for the transmission of a start pulse in the siding track section 6—9T. The relay 6CP is picked up for the transmission of such pulse by the energization of a circuit extending from (+), including front contact 119 of relay 3WN, front contact 120 of relay 6RDP, front contact 121 of relay 6RD, back contact 122 of relay 6CS, and winding of relay 6CP, to (—). It will be noted that the energization of relay 6CP is effective only for a short time, because the picking up of relay 6RD opens an obvious circuit at back contact 123 for causing the dropping away of the repeater relay 6RDP. When such relay is dropped away, the circuit which has been described for the relay 6CP is opened at front contact 120.

The reception at the right-hand end of track section 6—9T of the start pulse causes the response of control apparatus corresponding to that illustrated in Fig. 7A, thus, to consider the conditions through the siding section 6—9T, Fig. 7A will be considered as being placed to the right of Fig. 7E.

With reference to Fig. 7A, the reception of the start pulse at the right-hand end of the siding section causes the energization of relays 3TR and 3TP, and, after the back point repeater relay 3TBP is dropped away, a circuit is closed by which the relay 3CS is picked up for causing the transmission of a driven code in the siding section toward signal 6. Such pick-up circuit for relay 3CS extends from (+), including front contact 124 of relay 3TP, back contact 125 of relay 3TBP, and winding of relay 3CS, to (—). The relay 3CS is maintained picked up by an obvious stick circuit closed at back contact 126 of relay 3HP. Front contact 127 of relay 3H connected in multiple with that contact provides that the stick circuit is maintained closed while the relay 3H responds to a shut-down code transmitted from left to right in the siding section.

In accordance with the picking up of the relay 3CS, the relay 3CP becomes active for the transmission of a 75 driven code from right to left in the siding track section. The circuit by which the relay 3CP is picked up for each impulse of the oscillator 75C extends from (+), including back contact 128 of relay 3TR, contact 129 of oscillator 75C, back contact 130 of relay 2YGP, back contact 131 of relay 3HP, front contact 132 of relay 3CS, and winding of relay 3CP, to (—).

The reception at the left-hand end of the siding section of the 75 code causes the relay 6H (see Fig. 7E) to be picked up in accordance with the pulsing of contact 133 of relay 6TP. The picking up of the relay 6H closes a circuit at front contact 134 to energize the relay 6HP, and the picking up of that relay causes the mechanism of signal 6 to be energized upon the closure of front contacts 135 and 136 with a polarity selected in accordance with the condition of the relay 6D. Inasmuch as it is assumed the next signal in advance is at stop, and therefore the 75 driven code has been applied to the siding section 6—9T, the relay 6D is not energized, and therefore a polarity is applied to the mechanism of signal 6 to cause that signal to indicate caution. Such polarity is applied by the back contacts 137 and 138 of relay 6D, and the signal 6 is selected in preference to signal 6A in accordance with the energized condition of the correspondence relay 3NCR for the normal position of the track switch 3W.

The energization of the mechanism of signal 6 causes the yellow-green signal repeater relay 6YGP (see Fig. 8) to be picked up by the closure of contact 139 of the mechanism of signal 6, and the picking up of such relay changes the code transmitted in the track section 4—7T from a 75 to a 120 code to provide a clear indication for the intermediate signal 4. The change in the code in the track section 4—7T is provided by the shifting of contact 73 (see Fig. 7D) of the relay 6YGP in the circuit for the relay 7CP.

At the left-hand end of track section 4—7T, the change in the code from a 75 to a 120 code causes the energization of the tuned circuit for the relay 4D to become effective so as to cause that relay to be picked up. The shifting of contacts 90 and 91 of relay 4D pole changes the polarity applied to the mechanism of signal 4 in an obvious manner to cause such signal to display a green indication (see Fig. 2C).

As noted above, the start impulse applied to the rails of the siding section 6—9T is of a duration measured by the drop-away time of the slow release relay 6RDP. This period of energization as repeated by the relays 3TR and 3TP (considering Fig. 7A to take the place of an additional drawing for the east end of siding B), is of sufficient duration to allow the relay 3TBP to drop away and close its back contact 125 as above described. However, it should be noted that the reception of the usual code rates, such as 75 and 120 code rates, do not have sufficient periods of energization for the release of the relay 3TBP and other similar relays in the system such as relay 6TBP of Fig. 7E.

For example, the reception of a driven code at the left-hand end of the siding section 6—9T is, of course, repeated by the track relays 6TR and 6TP but such operation should not pick up the code sending relay 6CS. To prevent such picking up of relay 6CS, relay 6TBP is used to absorb, so to speak, the pulsing of the regular code rates. Thus, means is provided at each end of the siding section for distinguishing between a driven code and the reception of a start pulse; and also means is provided at each end of a siding for transmitting a start pulse of sufficient duration to be effective at the opposite end of the siding track section.

*Further progress of eastbound train.*—The train, of course, proceeds through the track section 2—5T as shown in Fig. 2D, and when the train approaches signal 4 within a predetermined distance, a sufficient current flow is obtained in the track circuit to cause the series relay 5SR to pick up (see Fig. 7C). As soon as it picks up, front contact 140 closes a stick circuit for this relay 5SR and keeps it steadily energized until the train entirely leaves the track section 2—5T. The picked up condition of the series relay 5SR also opens its back contact 222 to prevent track relay 5TR from receiving false code energy from its associated track battery due to the pulsing operation of contact 108 while the stick contact 140 is closed.

When the eastbound train accepts the signal 4 and enters track section 4—7T, the relay 4H drops away so that with the series track relay 5SR picked up, the directional stick relay 4S (see Fig. 7C) for such signal is picked up by the energization of a circuit extending from (+), including back contact 155 of relay 4H, front contact 156 of relay 5SR, back contact 157 of relay 5S, front contact 158 of relay 4—5WC, and winding of relay 4S, to (—). After the relay 4S is picked up, an obvious stick circuit is closed at front contact 159 of relay 4S to make such relay dependent for its energization entirely upon the back contact 155 of relay 4H.

In accordance with the dropping away of the relay 4H and the picking up of the relay 4S, a circuit is closed to render the code transmitter relay 5CP active for the transmission of a 75 driven code from right to left in the track section 2—5T for a following train movement if desired by the operator. The relay 5CP is energized for each impulse of the oscillator 75C under such conditions by a circuit extending from (+), including back contact 104 of relay 5TR, contact 160 of oscillator 75C, front contact 271 of relay 4S, back contact 106 of relay 4H, front contact 107 of relay 4—5WC, and winding of relay 5CP, to (—). The application of the 75 driven code to the track section in the rear of the train is to provide a code to allow the clearing of signal 2 or signal 2A, if the operator desires to cause either of such signals to be cleared for a following train. At the left-hand end of track section 2—5T, the reception of the 75 code after the track section has become unoccupied in the rear of the eastbound train causes the picking up of the relay 2H (seee Fig. 7B), but the relay 2D remains dropped away because that relay can be picked up only upon the reception of a 120 code.

To consider further progress of the eastbound train, it will be assumed that the operator at the control office desires to keep the train travelling on proceed indication and thus actuates his control levers so as to cause the transmission of a control cycle for the clearing of the eastbound signal 8 at the right-hand end of the siding B (see Fig. 2B). In order to cause the clearing of this signal the code transmitted during the control cycle has the characters (+) (—) (+) (+) (+) (—). It will be noted that the first two characters of the code call for a different pair of field stations than the first two characters of codes which have been considered as belonging to the field stations Nos. 2A and 2B. From the description of the clearing of the east-bound signal 2A at the right-hand end of the siding A, it is believed to be readily apparent to those skilled in the art how a very similar mode of operation is effective for causing the clearing of the leaving or head-block signal 8 associated with the right-hand end of the passing siding B.

When the signal 8 is cleared, the picking up of the yellow-green repeater relay YGP for such signal changes the driven code transmitted from right to left in the track section 6—7T to a 120 driven code in a manner similar to that illustrated in detail by which the driven code can be changed from a 75 to a 120 code in the siding track section 3T (see Fig. 7A) which is associated with the passing siding A. It will be noted in the circuit for the relay 3CP, that the shifting of contact 130 of relay 2YGP upon the clearing of signal 2 which is comparable to signal 8, causes the relay 3CP to repeat the impulses of the oscillator 120C rather than those of the oscillator 75C.

The reception at the left-hand end of the track section 6—9T of a 120 driven code causes the relay 6D (see Fig. 7E) to be picked up by the energization of its tuned circuit, and the energization of such relay shifts the polarity applied to the mechanism of signal 6 at contacts 137 and 138 to cause that signal to change its indication from caution to clear.

It should, of course, be understood that the train can proceed from the track section 4—7T into the track section 6—7T with the signal 6 at caution without the operator causing the signal 8 to be cleared as above described to change the signal 6 to indicate clear. This would be the usual condition if the operator desired to hold the eastbound train at the signal 8. But the description above points out in connection with Fig. 2E that the signal 8 is cleared so that it will be definitely understood that the signals may be controlled to indicate clear in advance of a train as it proceeds over the various successive track sections. Insofar as the operation of the system to effect the automatic shutting down of the system behind a train when it passes into the detector track section 6—7T as shown in Fig. 2F is concerned, it is exactly the same regardless of whether the signal 6 is at clear or caution; and this shutting down operation will now be considered in detail.

*Automatic shut-down.*—Having described how a signal can be cleared for governing passage of a train into the stretch of single track between sidings, and how a signal can be cleared for allowing that train to enter a siding section associated with a siding, consideration will now be given to the means provided for rendering the coded track circuit apparatus inactive after the passage of a train out of a single track stretch or a siding section. Inasmuch as the operation of shutting down the coding is somewhat different for the stretch of single track than it is for a siding section associated with a siding, these operations will be considered separately.

To consider first the shutting down of the coded track circuit apparatus for a stretch of track between sidings, a traffic condition will be assumed corresponding to that illustrated in Fig. 2F in which the stretch of track extending between the sidings A and B has just become unoccupied in the rear of an eastbound train. In accordance with the occupancy of the eastbound train of the block in advance of the entering signal 6, a 75 driven code is transmitted from right to left in the track section 4—7T for the caution indication of signal 4. The relay 7CP (see Fig. 7D) for the right-hand end of track section 4—7T is active for the transmission of this 75 code under these conditions because of the energization for each operation of the oscillator 75C of a circuit closed from (+), including back contact 68 of relay 7TR, back contact 73 of relay 6YGP, contact 74 of oscillator 75C, front contact 75 of relay 7CS, and winding of relay 7CP, to (—).

At the left-hand end of the track section 4—7T, the reception of the 75 code causes the picking up of relays 4H and 4HP, and thus causes the signal 4 to display a caution indication as would be required if there were a following train. The polarity for providing the caution indication is selected by the back contacts 90 and 91 of relay 4D.

When the relay 4H is picked up upon the reception of a 75 code at signal 4, the stick relay 4S is dropped away, and the circuit by which the relay 5CP has been active for the transmission of a 75 code from right to left in the track section 2—5T is opened at back contact 106 of relay 4H, while the closure of front contact 106 establishes an obvious circuit by which the relay 5CP becomes active for the transmission of a 120 code.

At the left-hand end of the track section 2—5T, the reception of a 120 code causes the relay 2D (see Fig. 7B) to be picked up, and the picking up of such relay renders the relay 2CP, which has been inactive, active for the transmission of an inverse code from left to right in the track section 2—5T providing that signal 2 or 2A is not cleared for a following train. The relay 2CP is momentarily picked up at the end of each impulse of the driven code by the energization of a circuit extending from (+), including back contact 161 of relay 2TR, front contact 162 of relay 2TP, back contact 163 of relay 2RD, front contact 164 of relay 2HP, front contact 165 of relay 2—3TR, front contact 166 of relay 2D, back contact 167 of relay 2CS, and winding of relay 2CP, to (—). Thus, an inverse code pulse is inserted between the successive driven code pulses, and each such inverse code pulse is measured by the drop away period of the relay 2TP. It will be noted from the circuit just described, that the inverse code is applied only if the back contact 163 of relay 2RD is closed, thus providing that the act of an operator to clear a signal for eastbound traffic for a following train by causing the energization of the relay 2RD, would prevent the application of the inverse code to track section 2—5T and forestall the automatic shutting down of the coded track circuit apparatus associated with the track sections of the stretch of single track between the sidings A and B.

Assuming the inverse code to be applied to the track section 2—5T, the reception of such inverse code at the intermediate signal location causes the picking up of relay 5H (see Fig. 7C), and with relays 4H and 5H both picked up, during the next "off" period of the driven code in track section 4—7T, the transmitter relay 4CP is picked up for the transmission of a shut-down pulse in the track section 4—7T by reason of a circuit extending from (+), including back contact 82 of relay 4TR, front contact 168 of relay 4H, front contact 169 of relay 5H, back contact 98 of relay 5SR, front contact 99 of relay 4—5WC, back contact 100 of relay 4—5EC, and winding of relay 4CP, to (—).

The application of this shut-down pulse by the relay 4CP prevents the response of the track relay 4TR to the driven code in the track section 4—7T so that the relays 4H and 4HP drop away at the ends of their respective release periods. Thus, the shut-down pulse is measured by the release time of the relay 4H because of its contact 168 which is included in the shut-down control circuit for the relay 4CP.

The release of the relay 4H also opens front contact 106 and stops the application of the driven code to the track section 2—5T at the rear of signal 4. The inverse code in such track section 2—5T obviously ceases as soon as the driven code ceases.

The reception of the shut-down pulse at the right-hand end of the track section 4—7T causes the picking up of the track relay 7TR and maintains it picked up for a period substantially longer than the usual inverse code impulse period. This is because the shut-down pulse persists during the drop away of the relay 4H, as above pointed out, which drop away period is longer than the usual impulse period of an inverse code pulse. While the track relay 7TR is thus maintained energized, the oscillator contacts of the oscillator 75C continue to operate at their usual rate. Ordinarily the track relay 7TR is released at the end of an inverse code pulse before the oscillator contact 72 is opened, but under the present circumstances the track relay 7TR is maintained energized for a longer period so that upon the opening of the oscillator contact 72, both of the stick circuits for the relay 7CS are open.

The dropping away of the relay 7CS due to the shut-down pulse, renders the relay 7CP ineffective to further transmit driven codes until such relay is again picked up. At the intermediate signal location (see Fig. 7C), the dropping away of the relay 4H stops the driven code in the track section 2—5T, as above mentioned, while the release of its repeater relay 4HP opens front contact 95 included in the stick circuit of the coding direction relay 4—5WC so that it also drops away. In this manner, the coded track circuit apparatus for the stretch of single track between sidings is completely shut down.

It will be noted that during this shut-down process, the initial reception of the 75 code at the intermediate signal location may cause a temporary inverse code to be applied to the section 4—7T because the series relay 5SR drops away and closes its back contact 98 as soon as the eastbound train passes the intermediate signal 4. Such inverse code is only temporary, however, if the system is to be shut down, because as soon as the driven code can build up in the section 2—5T and an inverse code be returned, the shut-down pulse is applied to the section 4—7T thereby obviating the presence of any such inverse code in the section 4—7T. On the other hand, if the system is to be continued in operation for the same direction of traffic due to the operator's desire to allow a following train movement, then the inverse code does not build up in the section 2—5T so that the inverse code in the section 4—7T continues until, as above described, the eastbound train approaches within a given distance of the signal 4 and is cut off by the picking up of series relay 5SR. In any event, either the temporary transmission of the inverse code in the section 4—7T under shut-down conditions, or the continued transmission of an inverse code in the section 4—7T under the conditions for a following train is sufficient to cause the picking up of the relay 7H and its repeater relay 7HP. This is mentioned at this time because such operation of the relays 7H and 7HP will be discussed in detail in connection with the control of the track occupancy and approach relay 4—7TK of Fig. 7D.

It will further be noted that the eastbound train must entirely leave the track section 4—7T as shown in Fig. 2F before the shut-down operation can take place. This is because the circuit at the head-block signal 2 is not closed for transmitting the inverse code to effect the shut-down operation until there is a 120 code rate in the track section 2—5T. With reference to Fig. 7B, it will be seen that the circuit for transmitting the inverse code includes front contact 166 of the relay 2D, which relay 2D requires the 120 code rate in the section 2—5T in order to be picked up. One reason for doing this is so that while there is a train in the track section 4—7T as shown in Fig. 2E, it will be impossible for an inverse code to be automatically applied behind the train and cause the signal 5 to clear. Such an automatic clearing of the signal 5 would permit a back-up train movement without manual authorization which under certain circumstances is considered undesirable. Although this feature has been included in the embodiment of the present invention, it should be understood that it is not essential in order to render the shutting down of the system operative. Insofar as the shutting down of the system is concerned, the inverse code transmitting circuit of Fig. 7B could be made up as soon as the train leaves the track section 2—3T so as to be immediately effective to transmit an inverse code as soon as a driven code is received when a train passes the signal 4 and entirely leaves the section 2—5T. This is true regardless of the number of intermediate signal locations which might be employed in practice.

From the operation of the circuits which have just been described, it will be noted that the shutting down of the coded track circuit apparatus for the stretch of single track between passing sidings is rendered effective only if the entire stretch of track is unoccupied by a train. This is true because the cessation of the transmission of driven codes is dependent upon the momentary communication of a shut-down control from one end of the stretch of track to the other. Inasmuch as there are some conditions under which the shut-down is not to be effective when the stretch of track is unoccupied by a train, the circuits provide that the shut-down of the coded track circuit apparatus is effective only if there is no office controlled relay, such as the relay 2RD, for example, energized for a signal governing entrance of traffic into such stretch of track. It has been pointed out, for example, that the transmission of the inverse shut-down code in the track section 2—5T can be effective only if the back contact 163 of relay 2RD is closed.

Such arrangement of the circuits provides that the shut-down is initiated automatically where stick signals are employed as in this embodiment of the present invention, and it is believed to be readily apparent to those skilled in the art, that if non-stick signals were employed, the shutting-down of the coded track circuit apparatus would be rendered effective only after the office controlled relay LD or RD governing entrance to the stretch has been restored in accordance with the communication of a stop control from the control office. If an operator desires to cause a signal which has been cleared to be put to stop, he causes the transmission of a stop code for that field station in the usual manner, and the reception of such code at that particular field station causes the picking up of a stop relay B which opens the stick circuit for the LD or RD relay which has been picked up for the signal then cleared, and causes the restoration of the signal to stop. The dropping away of such LD or RD relay then initiates the restoration of the coded track circuit in the stretch of track in advance of that signal.

To consider the means for automatically rendering the track circuit code communication means inactive for a track section associated with a siding when such section becomes unoccupied in the rear of a train, traffic conditions will be assumed to exist as illustrated in Fig. 2H where an eastbound train is assumed to have passed the leaving signal 8. To consider the circuits associated with the siding section 6—9T under such conditions, Fig. 7A will be considered as placed to the right of Fig. 7E, inasmuch as the circuits and control apparatus illustrated in Fig. 7A are similar to that which is assumed to be provided for the righthand end of the passing siding B, but not illustrated in detail.

When the siding section 6—9T becomes unoccupied in the rear of the eastbound train, the transmission of a 75 driven code from right to left in such track section is effective to cause the transmission of a momentary shut-down inverse code if the conditions at the left-hand end of the siding B are such as to warrant the shutting down of the coded track circuit apparatus for that siding section.

The transmission of the 75 driven code is effected by a code transmitter relay corresponding to relay 3CP (see Fig. 7A), the 75 code being selected in accordance with the stop condition of the head-block or leaving signal at that field station. The reception at the left-hand end of the siding section 6—9T of the 75 driven code causes the picking up of the relays 6H and 6HP (see Fig. 7E), and the picking up of those relays closes a circuit by which the relay 6CP is active for the transmission of an inverse code. More specifically, the relay 6CP is energized at the end of each impulse of the driven code for applying the inverse code by a circuit extending from (+), including back contact 171 of relay 6TR, front contact 172 of relay 6TP, front contact 173 of relay 6HP, front contact 174 of relay 6—7TR, back contact 121 of relay 6RD, back contact 122 of relay 6CS, and winding of relay 6CP, to (—). Such circuit requires the relay 6RD to be deenergized for reasons corresponding to those which have been given with respect to the shutting down of the coded track circuit signaling apparatus for the stretch of track between sidings A and B, and the front contact 174 of relay 6—7TR is included in the circuit so as to cause the transmission of the shut-down code to be effective upon the passage of an eastbound train, only after the track section 6—9T has become entirely unoccupied in the rear of a train. In other words, the contact 174 of relay 6—7TR prevents the transmission of the inverse shut-down code prematurely when the train accepts the entering signal but has not yet entered the siding section.

At the right-hand end of the siding track section 6—9T, the reception of the inverse code causes the picking up of the relays corresponding to relays 3H and 3HP (see Fig. 7A), and the picking up of the HP relay opens the circuit for the code transmitter relay CP to render it inactive the same as the picking up of relay 3HP would open the circuit for relay 3CP at back contact 131. The cessation of the code transmitter relay CP causes the removal of both the driven and inverse codes in the siding track section 6—9T, and the dropping away of the H relay at the right-hand end of the section (corresponding to the relay 3H) before the dropping away of the slow-acting repeater relay HP associated therewith (corresponding to the relay 3HP) causes an opening in the stick circuit for the relay CS (corresponding to the relay 3CS) in an obvious manner to cause such relay to be dropped away, thus completing the shutting down of the coded track circuit signaling apparatus associated with the siding section 6—9T.

*Approach and occupancy indications.*—It is generally understood by those familiar with the art how the communication of indications from the respective field stations to the control office is effected upon the assignment of respective channels for the various indications. Such communication is disclosed in detail in the above mentioned Judge et al. Patent No. 2,082,544, to which reference is to be made for a more specific disclosure of the manner in which indications are communicated to the control office, and more particularly to the manner of decoding the indications as they are received at the control office so as to provide for the selective energization of indicator lamps on the control panel.

In accordance with the present invention, the various occupancy and approach indications are assigned corresponding channels for the respective field stations, the channels being illustrated, for example, for field station No. 2A in Fig. 5. In this figure the relays 2—3TP, 2—5TK and 3TK are illustrated as being associated with respective channels for the communication of indications and it is to be understood that a similar assignment of channels is provided for each of the other field stations, the relays 6—7TP, 4—7TK and 6TK for field station No. 2B having channels corresponding respectively with the above mentioned relays of field station 2A.

In the transmission of an indication cycle, the particular field station transmitting is identified at the control office by the reception of a station indication code characteristic of such field station by the assignment of station codes upon the positioning of jumpers at the various field stations corresponding to the jumpers 150 and 151 shown, for example, in Fig. 5 for the field station No. 2A. At the control office, a station relay corresponding to the relay ST of Fig. 6 of the above-mentioned Judge et al. Patent No. 2,082,544, is provided for each of the indication stations, and the response of such relay upon the reception of an indication cycle selects the control of the magnetic-stick relays associated with the indicator lamps for that particular field station.

Although the means has not been specifically disclosed in this embodiment of the present invention for indicating the condition of the various track switches and signals, it is to be understood that such indications are provided in the usual manner as disclosed, for example, in the above mentioned Judge et al. patent.

With reference to Fig. 3, it will be seen that indicator lamps 3TE, 2—3TE, 2—5TE, 4—7TE, 6—7TE and 6—9TE are provided to indicate the presence and progress of a train from the siding section of siding A to the siding section of siding B. The OS track occupancy indicators 2—3TE and 6—7TE, are controlled in the usual manner through the medium of the code type communication system in accordance with the codes of their respective track repeater relays 2—3TP and 6—7TP of Figs. 7A and 7E respectively. The occupancy indicator 3TE is controlled exactly the same as the occupancy indicator 6—9TE, but only the control for the indicator 6—9TE has been shown in detail. This indicator is controlled in accordance with the conditions of the track indicator relays 6TK of Fig. 7E and relay for the opposite end of the siding similar to the relay 3TK of Fig. 7A. Inasmuch as these relays are at opposite ends of a siding, they are, of course, associated with different field stations and transmit the indication of their conditions to the control office from their respective field stations on separate cycles of operation. The reception of such indications from the separate field stations is indicated in Fig. 11, where each indication is received by a magnetic stick type relay through separate station relays 2BST and 3AST for their respective stations Nos. 2B and 3A for the opposite ends of the siding B (see Fig. 1). Thus, the mag-stick relay 6TKP is controlled in accordance with the energized or deenergized condition of the relay 6TK of Fig. 7E while the mag-stick type relay 9TKP is controlled in accordance with the energized or deenergized condition of a relay TK at station No. 3A similar to the relay 3TK of Fig. 7A for station No. 2A.

With reference to Fig. 11, it will be readily apparent that the indicator lamp 6—9TE is controlled jointly by these relays 6TKP and 9TKP so that when either of these relays has its contacts actuated to right-hand positions, the indicator lamp 6—9TE is energized.

The approach and occupancy indicator lamps 2—5TE and 4—7TE are respectively controlled in accordance with the energized or deenergized condition of the relays 2—5TK and 4—7TK of Figs. 7B and 7D respectively.

From the above description, it is to be understood that the indicator lamps of Fig. 3 are controlled from the fields over the code type communication system in accordance with condition of indication relays characteristically controlled at the field location for obtaining the proper indication conditions in connection with a coded track circuit type signaling system which is normally shut down. Therefore, it is necessary to provide at the field locations a pair of these special indicator relays, such as relays 2—5TK and 4—7TK for the opposite ends of a stretch of single track, and another pair, such as relays 3TK and 6TK for the opposite ends of the siding section associated with a passing siding.

Let us first consider the operation of the indication relays associated with the opposite ends of a stretch of single track. With reference to Fig. 7D it will be seen that the relay 4—7TK is normally energized by a stick circuit closed from (+), through a circuit including back contact 240 of relay 7S, front contact 241 of relay 7CSP, front contact 242 of relay 4—7TK, windings of relay 4—7TK, to (—). Similarly, the indication relay 2—5TK of Fig. 7B is normally energized by a stick circuit closed from (+) through a circuit including back contact 221 of relay 2S, front contact 220 of relay 2CSP, front contact 243 of relay 2—5TK, windings of relay 2—5TK, to (—).

When the operator causes a signal clearing control code to be transmitted over the code type communication system to the field station No. 2A for clearing the signal 2A as above described, the signal clearing relay 2RD of Fig. 6 is picked up, and at the same time the code sending relay 7CS of Fig. 7D is also picked up. This picking up of the relay 7CS of Fig. 7D opens back contact 103 to release its repeater relay 7CSP which has its front contact 241 included in the stick circuit of the indication relay 4—7TK as above mentioned. But before the relay 7CSP can drop away, inasmuch as it is a very slow release relay, the code sending relay 7CS causes the transmission of a driven code toward the signals 2 and 2A, and as above described, at the signal 4, a circuit is completed for returning an inverse code toward the signals 7 and 7A. The reception of this inverse code is, of course, received by the relay 7H which closes its front contact 102 thereby directly applying energy to the windings of the relay 4—7TK so that it is maintained energized even though the relay 7CSP subsequently drops away and opens its front contact 241. The relay 7H has an associated repeater relay 7HP which when it picks up, closes front contact 141 to also apply energy to the windings of 4—7TK for reasons hereinafter mentioned.

In brief, the slow release period of the relay 7CSP is sufficient to mask out, so to speak, the initiating operation of the system. Of course, if a train should happen to be standing in the track section 4—7T or within the zone approaching signal 4 sufficiently closed to pick up the series relay 5SR, the inverse code would not be returned to pick up the relay 7H, which would thereby cause the relay 4—7TK to drop away after the release time of 7CSP had run out. This would cause a proper indication of occupancy to be transmitted to the control office resulting in the illumination of the indicator lamp 4—7TE.

The reception of a driven code at the west end of the stretch of single track causes the relay 2H and its repeater relay 2HP to be energized thereby respectively closing front contacts 244 and 245 to directly apply energy to the indicator relay 2—5TK. This is pointed out to show that this relay has similar circuits as the relay 4—7TK, but inasmuch as it is already energized through its stick circuit, its normal condition is maintained.

Let us now note the indications as the eastbound train leaves the siding A and passes over the detector track section 2—3T. As soon as the train enters the detector track section 2—3T, the track relay 2—3TR is deenergized and this is followed by the deenergization of its repeater relay 2—3TP which causes the usual OS indication to be transmitted to the control office to illuminate the indicator lamp 2—3TE.

With the driven code arriving at the west end of the single track stretch, the relays 2H and 2HP are energized, so that when the train enters the section 2—5T causing the release of the relay 2H while at the same time holding relay 2—3TR deenergized, a circuit is closed for energizing the relay 2S from (+), and including front contact 246 of relay 2HP, back contact 247 of relay 2CS, back contact 248 of relay 2H, back contact 249 of track relay 2—3TR, windings of relay 2S, to (—). As soon as this relay picks up a stick circuit closed from (+), and including back contact 250 of relay 2D, front contact 251 of relay 2S, windings of relay 2S, to (—).

It is noted that this pick-up circuit for the relay 2S is only momentarily closed during the release period of the relay 2HP. The picking up of this directional stick relay 2S opens its back contact 221 which releases the indication relay 2—5TK causing it to transmit an indication over the code type communication system to effect the illumination of the indicator lamp 2—5TE in the control office.

When the eastbound train passes through the track section 2—5T so as to approach within a predetermined distance of the signal 4, sufficient current flows in the track circuit of section 2—5T to cause the picking up of the series relay 5SR (see Fig. 7C). When such relay 5SR is picked up, its stick circuit is closed at front contact 140 to shunt front contact 108 of the code transmitter relay 5CP so that the relay 5SR is steadily energized. It opens back contact 222 to prevent the pulsing operation of the transmitter release 5CP from falsely energizing the track relay 5TR from the associated track battery.

The picking up of the relay 5SR opens its back contact 98 to render the code transmitting relay 4CP ineffective to transmit the inverse code in the section 4—7T towards the signals 7 and 7A. This removal of the inverse code from the track section 4—7T, of course, causes the dropping away of the relay 7H and 7HP (see Fig. 7D). The opening of front contacts 102 and 141 of relays 7H and 7HP opens the energizing circuits for the indication relay 4—7TK so that it drops away. Dropping away of the indication relay 4—7TK causes the release of a change relay CH for field station No. 2B by reason of momentary opening of a contact similar to contact 142 of Fig. 5 and causes the transmission of an indication to the control office to effect the illumination of the indicator lamp 4—7TE.

From the circuits which have just been described, it will be noted that a series relay is employed for controlling the inverse code in the end track section of a stretch of single track so as to provide an approach indication of an approaching train before it reaches the distant signal. This arrangement is desirable in order that the dispatcher in the control office can operate the control machine to the best advantage and is also particularly useful in controlling the approach locking control which will be described in detail hereinafter.

When the eastbound train has vacated the track section 2—5T, a 75 code is placed on the track section 2—5T in the rear of the train as shown in Fig. 2E. The reception of this driven code causes the energization of the relays 2H and 2HP so as to close front contacts 244 and 245 energizing the indicator relay 2—5TK. Its energization initiates the operation of the code type communication system and transmits a suitable indication to the control office to extinguish the indicator lamp 2—5TE.

When the eastbound train moves out of the section 4—7T, a driven code is applied behind the train in that track section which causes an inverse code to be temporarily reflected from the signal location 4 while the driven code rate in section 2—5T is changing to 120 and thereby causing the dropping away of the stick relay 2S by the opening of back contact 250 and the closure of front contact 166 to allow an inverse code to build up in the section of track 2—5T as shown in Fig. 2F. As described above, this temporary building up of the inverse code in the section 4—7T before the shut-down pulse (see Fig. 2F) arrives in the section 4—7T, causes the picking up of the relay 7H and its repeater relay 7HP closing front contacts 102 and 141 and this causes the indicator relay 4—7TK to be energized. Its energization, of course, causes the transmission of an indication to the control office thereby extinguishing the indicator lamp 4—7TE.

When the shut-down pulse arrives at the east end of the track section 4—7T, the relay 7H is, of course, released followed by the release of its repeating relay 7HP, but before the successive release periods of these two relays have run out, the relay 7CS has been released as above described which in turn causes the picking up of the relay 7CSP and the closure of front contact 241 so that the relay 4—7TK is maintained energized. This can be true inasmuch as the relay 7CSP can be much quicker to pick up than it is to release.

If it is desired that the indicator lamps 2—5TE and 4—7TE are to be employed for merely approach indications instead of both occupancy and approach, then the contact 221 of relay 2S can be omitted from the stick circuit of the indication relay 2—5TK, and similarly the back contact 240 of the relay 7S can be omitted from the indication relay 4—7TK. In other words, the omission of such contacts would mean that the eastbound train in the section 2—5T would not cause the illumination of the indicator lamp 2—5TE but such lamp would act as an approach indicator illuminated by a westbound train when it had approached within a predetermined distance of the signal 5.

It will be noted from the consideration of the circuits and the above description that the control for the relays 2—5TK and 4—7TK are exactly the same so that the operation with regard to westbound train movements will be understood by analogy to the description given above for the eastbound train.

We will now consider the operation of the indication relays associated with the opposite ends of the siding section associated with a passing siding. In order to do this, Fig. 7A is considered as placed to the right of Fig. 7E and its apparatus representing the apparatus that would be associated with the east end of the passing siding "B" as above mentioned in other connections.

With reference to Fig. 7E, relay 6TK is normally energized by a stick circuit from (+) and including front contact 152 of relay 6RDPP, front contact 153 of relay 6TK, windings of relay 6TK, to (—). A similar stick circuit is provided for the relay 3TK.

When the operator causes a signal clearing control code to be transmitted over the code type communication system to the field station No. 2B for causing signal 6 to clear, the signal clearing relay 6RD is picked up. This causes the opening of back contact 123 to release its repeater relay 6RDP, which relay in turn opens its front contact 145 to release its repeater relay 6RDPP. During the release time of the relay 6RDP, a start pulse is transmitted over the rails of the siding section as explained in connection with Fig. 2B so as to pick up the code sending relay CS at the east end of the siding similar to the code sending relay 3CS.

The picking up of the code sending relay CS at the east end of the siding B causes a driven code to be transmitted toward the signal 6 as indicated in Fig. 2C, and a reception of this code at the west end of the siding section 6—9T causes the relay 6H to be picked up to close its front contact 146 and apply energy to the pick-up circuit of relay 6TK. The closure of front contact 134 of relay 6H energizes its repeater relay 6HP which in turn closes its front contact 254 to also apply energy to the circuit for relay 6TK. The driven code thus received and thus closing the pick-up circuit of the relay 6TK arrives and picks up the relay 6H before the relay 6RDPP can release and open its front contact 152. In brief, the start pulse is transmitted over the rails of the track section 6—9T during the release period of the relay 6RDP, and the initiation occurs and causes the driven code to be transmitted and effect the picking up of the relay 6H during the release period of the relay 6RDPP. Thus, the relay 6TK is maintained energized during the initiation of the coded track circuit operation for the siding section.

At the other end of the stretch, the relay TK similar to relay 3TK of Fig. 7A, is ordinarily maintained energized by its stick circuit including front contact 20 of relay 3LDPP. But the relay corresponding to relay 3LDP may be picked up irrespective of the picked up condition of the code sending relay 3CS so that the contact 20 may, under certain circumstances, be opened. But the relay TK, similar to the relay 3TK, is maintained energized by reason of a stick circuit closed from (+), and including front contact 255 of relay 3CS, front contact 256 of relay 3TK windings 3TK, to (—).

The entrance of the eastbound train into the detector track section 6—7T, causes the release of the track relay 6—7TR which in turn automatically releases the signal clearing relay 6RD. Although the repeating relay 6RDP is picked up because of the closure of back contact 123, the relay 6RDPP cannot be picked up because of open front contact 147 of relay 6—7TR. Thus, the stick circuit for the relay 6TK cannot be reestablished until after the train leaves the detector track section 6—7T.

As soon as the train enters the section 6—9T, the rails, of course, are shunted causing the dropping of the relay 6H and its repeater relay 6HP opening front contacts 146 and 254 to release the indication relay 6TK the dropping of which causes the initiation of the code type communication system and the transmission of a suitable indication to the control office for causing the actuation of the contact 154 of relay 6TKP (see Fig. 11) to a right-hand position, thus, applying energy to the indicator lamp 6—9TE.

According to the manner of controlling the relay 6RD to provide stick signal control (similar to the manner for controlling relay 2RD as illustrated in Fig. 6), the relay 6RD is dropped away when a train accepts the entering signal 6 and enters the OS track section 6—7T. The dropping away of the relay 6RD causes the picking up of the repeater relay 6RDP, but the repeater relay 6RDPP cannot be picked up because of the inclusion of front contact 147 of relay 6—7TR in its pick-up circuit. The reason for delaying the picking up of the relay 6RDPP is to provide that an eastbound train will shunt the track section 6—9T to cause the dropping away of the approach indication relay 6TK prior to the establishment of a stick circuit for such indication relay by the closure of front contact 152 of relay 6RDPP. Thus, the relay 6RDPP can be picked up upon the passage of an eastbound train only after the OS track section 6—7T has become unoccupied in the rear of the train. At that time the relay 6RDPP is picked up by the energization of a circuit extending from (+), including front contact 147 of relay 6—7TR, winding of relay 6RDPP, and front contact 145 of relay 6RDP, to (—). The closure of front contact 148 of relay 6RDPP shunts the contact 147 of relay 6—7TR out of the circuit just described, and thus provides that the normal condition of the relay 6RDPP will not be disturbed upon the passage of a westbound train through the OS section 6—7T.

The passage of the train through the track section 6—9T and into the detector track section 8—9T (see Fig. 2H), causes a driven code to be transmitted toward signal 6 followed by a momentary shut-down code transmitted toward signal 9, as previously described. The reception of the driven code by the relay 6H closes front contact 146 to again pick up the relay 6TK at which time its stick circuit will be closed at front contact 152. Of course, if relay 6RD is picked up to clear signal 6 for a following train, and this occurs while the first eastbound train is in siding section 6—9T, then the front contact 120 of 6RDP is open causing relay 6RDPP to remain deenergized, but the open condition of back contact 121 of relay 6RD prevents the momentary shut-down code indicated in Fig. 2H so that the relay 6H is energized when the first eastbound train leaves the siding section 6—9T and remains energized until the second or following eastbound train enters the siding section to again cause an indication of its occupied condition.

On the other hand, if there is to be no further train movement, the shut-down code appears in the usual way and the code sending relay CS at the east end of the siding B is dropped away in a manner as previously described causing it to open the stick circuit for the relay TK at that end corresponding to the relay 3TK of Fig. 7A. It is thus understood that the passage of the eastbound train through the track section acts upon the indication relay 6TK to transmit the indication to the control office but such eastbound train does not in any way effect the deenergization of the TK relay at the east end of the siding B. On the other hand, a westbound train is indicated in the control office by the deenergization of the indicator relay TK the east end of the siding B similar to the relay 3TK of Fig. 7A, and for such train movement the relay 6TK at the west end of the siding B remains energized. It is for this reason that the circuit of Fig. 11 provides that either relay 6TKP or 9TKP actuated to a right-hand position causes the energization of the indicator lamp 6—9TE.

With reference to Fig. 7E, it will be noted that the relay 6RD may be picked up to cause train movement onto the side track B. Under such circumstances, a starting pulse should not be transmitted over the rails of the siding section 6—9T so that the starting pulse circuit including front contact 119 is open whenever the switch 3W is controlled to a reverse position. In other words, when the switch 3W is being controlled reverse by the relay 3WR, the relay 3WN is deenergized opening front contact 119. It will also be apparent that the relay 6TK should not be released under such circumstances and to prevent this, the relay 6RDP is maintained energized by reason of the closure of back contact 257 thus maintaining the relay 6RDPP energized closing front contact 152 in the stick circuit of relay 6TK.

It should be understood from the description as it has been set forth with regard to the track occupancy indicator for the track section 6—9T, for example, that the indicator lamp 6—9TE (see Fig. 3) at the control office is illuminated whenever the track section 6—9T is occupied by a train proceeding through the section in either direction. However, only two cycles of operation of the code type communication system are required to effect this operation, one cycle being transmitted when a train enters the siding section and the other cycle being transmitted when the train leaves the section. The reason that this can be done is because the relay TK is dropped and picked up in accordance with train occupancy at only one end or the other of that track section depending upon the direction of train movement through that section.

*Back-up moves.*—In the ordinary line circuit APB signaling systems employed in practice with CTC control, the intermediate signals have a tendency to clear automatically in the rear of a train and thus display indications for back-up moves without any supervisory control by an operator. Such automatic clearing can be prevented by interlocking the opposing directional stick relays and signals for the intermediate signal location involved, but such interlock prevents the possibility of manually clearing one of the intermediate signals for a back-up train movement. The signaling system provided by the present invention, however, makes use of the feature of shutting down the coded track circuit signaling system as a means for indirectly providing supervisory control for the intermediate signals so that either of such signals can indicate proceed for a back-up train movement without creating an unsafe condition.

With reference to Fig. 2E, it will be noted that, although the track section 2—5T has become unoccupied in the rear of an eastbound train, the signal 5 is at stop because there is no code transmitted toward such signal through the track section in advance thereof. If, however, it is desirable that the eastbound train reverse its direction of traffic and proceed toward the passing siding A, an operator at the control office can cause the signal 5 to display a proceed indication by transmitting a control for the clearing of either signal 3 or signal 3A. This condition is illustrated in Fig. 21 in which the picking up of the relay 3LD is illustrated as being effective to cause the application of an inverse code in the track section 2—5T for the control of signal 5.

More specifically, the 75 driven code applied at signal 4 behind the train is received at the west end of the track section 2—5T causing the relay 2H to be energized (see Fig. 7B). The closure of front contact 176 of relay 2H energizes its repeater relay 2HP. Thus, the picking up of the signal clearing relay 3LD closes a circuit which is effective to apply a momentary inverse code pulse at the end of each driven code pulse. This circuit is closed from (+), through back contact 161 of relay 2TR, front contact 162 of relay 2TP, back contact 163 of relay 2RD, front contact 164 of relay 2HP, front contact 165 of relay 2—3TR, front contact 258 of relay 3LD, back contact 167 of relay 2CS, windings of relay 2CP, to (—).

The inverse code is necessarily at a 75 rate, because of the 75 driven code being transmitted from right to left in the track section 2—5T under such conditions, and therefore the signal 5 can display only a caution indication by reason of the picking up of relay 5HP, although the entering signal 3 or 3A actually displays a proceed indication. Inasmuch as a back-up train movement involving an intermediate signal is not a train movement frequently used, it is believed that the caution indication of the intermediate signal is sufficient.

The picking up of the relay 3LD cannot pick up the relay 2CS for causing a driven code to be applied to the second 2—5T because the reception of the driven code energizes relay 2H as above mentioned and opens back contact 176. Also, the eastbound train having proceeded past the signal 2 completed the picking up of the directional stick relay 2S, as above described, thereby opening back contact 177 which further prevents the picking up of the relay 3LD from closing a pick-up circuit for the relay 2CS at front contact 266. This front contact 266 is employed for picking up the relay 2CS to provide for certain train movements from outlying track switches as will be presently described.

With reference to Fig. 7A, it will be seen that the picking up of the relay 3LD controls the clearing of the signal 3 or signal 3A as the case may be in accordance with the operations previously described by transmitting a start pulse over the rails of the section 3T and initiating the coded track circuit apparatus at the west end of the siding A.

After the train has reversed its direction of movement and accepted the signal 5 proceeding entirely into the track section 2—5T, a driven code is, of course, received by the relay 4H of Fig. 7C which opens back contact 155 and deenergizes the directional stick relay 4S.

Assuming that the train continues its reversed direction and accepts the signal 3, then the passage of the train over the detector track section 2—3T (see Fig. 7A) causes the release of the relay 3LD by the opening of its stick circuit at front contact 56 (see Fig. 6). Also, when the train leaves the section 2—5T the driven code of a 120 rate is received by the coded track circuit apparatus at the west end of this section 2—5T the same as if no train had entered the single track stretch. Thus, the relays 2H, 2HP and 2D are picked up. The picking up of the relay 2D opens back contact 250 and releases the directional stick relay 2S. The closure of front contact 166 of relay 2D completes the circuit for permitting an inverse code to be impressed on the track section 2—5T for causing the shut-down operation, as previously described in detail, and as indicated by the diagram of Fig. 2J. In this way, the system is restored to normal shut-down conditions even though the operator has exercised manual control for governing the back-up movement of a train that has entered the single track stretch.

*Modification for back-up train movements.*—With reference to Fig. 12 of the accompanying drawings the circuits and apparatus of Figs. 7A, 7B, and 7C have been shown in part, to indicate certain omissions of contacts and circuits of Fig. 7B which may be made and still accomplish the purposes of the present invention although the operation is slightly different than that just described. The train passing the signal 4 causes the stick relay 4S to be picked up which results in the application of the 75 code in the rear of the train the same as described for Figs. 7A, 7B and 7C. But this modified form of the invention provides that a driven code is impressed upon the track circuit 2—5T instead of the inverse code when a back-up train movement is desired.

More specifically, with reference to Fig. 12, it will be seen that the picking up of the relay 3LD closes a pick-up circuit for relay 2CS from (+) including a front contact 178 of relay 2—3TR, front contact 266 of relay 3LD, back contact 267 of relay 2RD, upper winding of relay 2CS, to (—). This circuit is exactly the same as shown in Fig. 7B except the contacts 177 of relay 2S, 176 of relay 2H and 181 of relay 2CS are omitted.

The picking up of the relay 2CS closes a circuit for transmitting relay 2CP from (+) and including back contact 161 of relay 2TR, front contact 182 of relay 3YGP, oscillator contact 183 of oscillator 120C, front contact 167 of relay 2CS, windings of 2CP, to (—). In other words, the picking up of the relay 3LD causes the clearing of signal 3 for example, which in turn energizes the relay 3YGP to effect the impressing of a 120 driven code across the rails of the track section 2—5T. It is true that the 120 code will conflict with the 75 code in such a way that a true 120 code is not received at the east end of the section 2—5TE nor is a true 75 code received at the west end of this section 2—5TE. However, there is a certain resulting code received at each end of the stretch which may be called a "beat code" which is sufficient to cause the relay 5H to pick up to effect the clearing of signal 5, as merely indicated by a dotted line in Fig. 12 but shown in detail in Fig. 7C.

In this connection, no claim is made herein broadly to "beat code control" for a coded track circuit system such as disclosed in the later application of T. J. Judge, Ser. No. 455,922, filed August 24, 1942.

When the train reverses its movement and passes completely past signal 5, the directional stick relay 4S is dropped away as previously pointed out because the relay 4H picks up at that location (see Fig. 7C) which also causes the 120 code to be applied to the section 2—5T.

When the train backs up past the signal 3 which has been cleared, then relay 3LD is, of course, dropped away. This causes the signal 3 to be returned to stop, dropping the relay 3YGP which causes a 75 code to be applied to the section 2—5T. But the 120 code coming from the east end of the track section 2—5T conflicts with the 75 code thus applied by the relay 2CP so that the track relay 2TR is maintained energized opening back contact 161 in the stick circuit of relay 2CS while the oscillator contacts of the oscillator 75C move to also open the stick circuit for the relay 2CS in a manner previously explained in connection with the shutting down of the system. This causes the relay 2CS to drop away and remove all driven code from this west end of the track section 2—5T. As soon as the relay 2CS releases, the circuit is completed for applying the inverse shut-down code because the 120 code then being received has caused the relay 2D to pick up closing front contact 166. The application of this inverse shut-down code causes the coded track circuit apparatus for the stretch of single track to shut down in a manner previously described in detail. It is noted that the contact 258 of relay 3LD (see Fig. 7B) has been omitted from this modified form of Fig. 12 as it is not required because relay 2CS is picked up to apply a driven code instead of the inverse code applied in the first form of the invention.

Thus, two forms of the present invention have been disclosed in which the operator may exercise manual control of reverse train movements. In the first form, the manual control causes an inverse code to be applied for clearing an intermediate signal; while in the second form a driven code is applied which will effect the clearing of the intermediate signal in spite of the conflict with the driven code which is applied in rear of the train.

*Outlying switches.*—It is often required in practice that a centralized traffic control system be adapted to a condition in which there is an outlying switch in the stretch of single track between two passing sidings, such track switch generally being hand operated, and movements in connection therewith being provided in accordance with telephone communication by the trainmen with the dispatcher at the control office. To illustrate how the system provided by the present invention can be readily adapted to the use of outlying switches, a track switch 5W has been illustrated by dotted lines in Fig. 7D as being associated with the track section 4—7T in the stretch of single track between sidings A and B. Where outlying switches are provided, it is generally desirable that a train may enter such switch after having proceeded through the stretch of single track between the sidings in either direction, and upon leaving the outlying track switch the train can proceed toward either siding in accordance with instructions received by telephone communication with the dispatcher.

The operator may allow a train to enter the single track stretch in either direction under signal indications, with instructions to leave the stretch over the outlying track switch 5W. When the train arrives at this outlying track switch 5W, a trainman operates it to a reversed position causing switch box contact 260 to be closed, thus, also shunting the track section 4—7T in addition to the presence of the train. The train then moves over the track switch 5W and a trainman reverses it in the rear of the train, thus, unshunting the track section 4—7T only when the switch 5W has been returned to its normal position. This unshunting of the track section 4—7T causes the coded track circuit apparatus for the stretch of single track to be restored to its normal-at-rest condition in a manner previously described in detail.

When a train comes over the diverging track and wishes to leave the outlying switch 5W so as to proceed towards either the siding A or the siding B, a trainman must first call the dispatcher at the control office and receive verbal instructions as to the direction and time to proceed. If it is safe for the train to proceed, the trainman is thus instructed, and he operates the outlying track switch 5W to its reversed position, immediately closing switch box contact 260 and shunting the rails of track section 4—7T.

If it is desired that the train be moved in the direction of the siding A, the dispatcher transmits a signal clearing control to clear either the signal 3 or the signal 3A so as to cause a driven code to be transmitted toward the signal 5 for clearing it to allow the train to proceed toward siding A. On the other hand, if the train is to proceed in the opposite direction toward siding B, the operator can similarly clear either the signal 6 or the signal 6A for allowing the train to proceed onto the siding section or onto the siding B respectively. It is noted that if the train is to proceed in the eastbound direction, there is no intermediate signal to be cleared, so that it is not strictly necessary for the track layout shown to clear the signal 6, for example. But if there is an intervening intermediate signal, as might well occur in practice, the same operation is necessary for allowing the train to proceed in an eastbound direction under signal indications as shown and described for westbound trains.

For the purpose of specifically considering the operation of the embodiment of the present invention, it is assumed that a train is to leave the outlying track switch and proceed in a westbound direction towards the siding A. The operator then actuates the switch and signal control levers in a proper manner to establish a route either onto the siding section 3T or onto the siding A and to clear the proper signal 3 or 3A. This is effected by picking up the signal clearing relay 3LD.

The picking up of relay 3LD causes the relay 2CS to be picked up by the energization of a circuit extending from (+), including back contact 176 of relay 2H, back contact 177 of relay 2S, front contact 178 of relay 2—3TR, front contact 266 of relay 3LD, back contact 267 of relay 2RD, and upper winding of relay 2CS, to (—). When the relay 2CS has been picked up, a stick circuit is established at front contact 181 to shunt back contact 176 of relay 2H out of the circuit just described. The establishment of such stick circuit provides that the relay 2CS is held up, even though a shut-down code may be transmitted from right to left in the track section 2—5T. Such condition will be hereinafter considered.

The inclusion of back contact 177 of relay 2S in the pick-up circuit just described for relay 2CS provides that the relay 2CS cannot be picked up by such circuit in case a back-up move is to be effected as above described in detail.

The picking up of relay 2CS renders the relay 2CP active for the transmission of a 120 driven code from left to right in the track section 2—5T. The relay 2CP is picked up for each impulse of the 120 driven code by a circuit extending from (+), including back contact 161 of relay 2TR, front contact 182 of relay 3YGP, contact 183 of oscillator 120C, front contact 167 of relay 2CS, and winding of relay 2CP, to (—). The reception at the right-hand end of the track section 2—5T of the 120 driven code causes the picking up of the relays 5H and 5D, and the picking up of such relays causes the clearing of signal 5. It will be noted that the closure of front contact 184 of relay 5H in the circuit for the relay 4—5EC, causes such relay to be picked up, and to be maintained picked up by its stick circuit. The picking up of such relay 4—5EC closes front contact 185 to provide energy for the lamps of signals 4 and 5.

It has been assumed above that the trainman operates the outlying track switch 5W to its reversed position closing contact 260 to shunt the rails of the track section 4—7T before the driven code arrives in the track section 4—7T. On the other hand, the trainman may be dilatory in operating the outlying track switch 5W, and the dispatcher in the control office immediately transmits the signal clearing code to pick up the relay 3LD. This results in accordance with the principles of the system, as they have been set forth, to cause the transmission of a 120 driven code from left to right in the section 2—5T to clear the signal 5 which in turn causes the transmission of a 120 driven code from left to right in the track section 4—7T. The track switch 5W not being reversed to shunt the rails of track section 4—7T, and the section being unoccupied by a train, the driven code is received at the east end of the section 4—7T and there being no signal cleared at that end, the inverse shut-down code appears in the section to cause a shut-down pulse in the track section 2—5T. Even under such circumstances the code sending relay 2CS (see Fig. 7B), is maintained picked up, because its energizing circuit is closed through front contact 181 independently of whether or not the relay 2H is picked up. In other words, this energizing circuit is independent of the usual stick circuit which maintains the relay 2CS energized and which can be momentarily opened by a shut-down pulse. Thus, a driven code is caused to be transmitted by the relay 2CS irrespective of the momentary arrival of a shut-down pulse. Under such circumstances, however, there may be what may be termed a pumping action of the coded track circuit apparatus which will take place until the trainman at the outlying track switch reverses such switch and shunts the track rails at which time the coded track circuit apparatus will assume a steady operation for clearing the signal 5.

However, under ordinary circumstances, it is assumed that the trainman will reverse the outlying track switch before the driven code arrives in the track section 4—7T.

As above mentioned, there is no intermediate signal between the outlying track switch 5W and the siding B, and for this reason, the pick-up circuit for the relay 7CS of Fig. 7D corresponding to the pick-up circuit just pointed out for the relay 2CS has been omitted, but it should be understood that such pick-up circuit may be continued from the reference character 261 the same as for the relay 2CS when an intermediate signal is provided between this outlying switch and the siding B.

It should also be noted that if the signal 3, for example, is cleared to allow a train to proceed from an outlying track switch but for some reason the operator returns the signal lever to a stop position thus restoring the signal to stop, the relay 2CS is maintained energized by its usual stick circuit including front contact 262 and back contact 161 of track relay 2TR in combination with the oscillator contact as previously described in detail for the relay 7CS of Fig. 7D. Under such circumstances, the intermediate signal which has been cleared is maintained in its clear condition so that the train can proceed towards the head-block location in spite of this restoration of the signal 3 to stop. In other words, the same protection against stopping a train at an intermediate signal is provided regardless of whether a train is moving from an outlying track switch or from another head-block location.

*Approach locking.*—It is generally required in practice that some form of route locking be provided for each of the power switches in a centralized traffic control system. Under some conditions regular stick locking with time release is sufficient, but under other conditions it may be preferable that approach locking be employed, particularly if approach indications can be provided as heretofore described.

In this embodiment of the present invention approach locking has been provided for the entering signals, such as signals 6 and 6A, while stick locking with time release has been provided for the head-block or leaving signals. Both forms of locking are provided in the control of the locking relays AS associated with the various track switches. Each of the track switches has included in its operating circuit contacts of the normally energized relays AS associated with that switch, one relay AS being provided for each direction of traffic over such track switch. In order to simplify the disclosure, only the relays 6AS and 7AS (see Fig. 8) for the left-hand end of passing siding B have been shown, but it is to be understood that these relays and their circuits are typical of relays and circuits provided at each of the other power switches.

To consider a typical operating condition, it will be noted that the relay 6AS is dropped away upon the clearing of signal 6 or signal 6A by the opening of front contact 191 of the red repeater relay 6RGP. The dropping away of the relay 6AS opens the control circuit for the switch machine 3SM, at front contacts 192 and 193 and therefore prevents the application of energy to the switch machine for its operation. Should an operator at the control office desire to change the route, he must cause the transmission of a stop code in order that the relay 6RGP may be picked up, and subsequent to the picking up of such relay, the relay 6AS would be picked up after the thermal relay 6TH has had time to operate and close contact 194, but if the approach and occupancy indication relay 4—7TK is picked up because of there being no train within the portions of the trackway affecting such relay, the relay 6AS can be picked up immediately upon the closure of front contact 191 of relay 6RGP by a circuit including front contact 189 of relay 4—7TK, and the picking up of the relay 6AS under such conditions would allow the power operation of the track switch 3W immediately if the operator were to cause the transmission of a control for changing the route.

Inasmuch as a normally deenergized series relay 5SR is employed in the control of the indication relay 4—7TK, it may be desirable for safety purposes to provide a means for checking the operation of such series relay. A means for checking the operation of the series relay 5SR associated with the control of the relay 4—7TK is illustrated, for example, in Fig. 10 where the signal 4 is restricted to a caution indication except when the series relay 5SR is picked up. That is, the polarity applied to the circuit for the control of signal 4 at back contacts 195 and 196 of relay 5SR is such as to cause the signal 4 to indicate caution when the relay 4D is picked up if the series relay 5SR fails to respond to the presence of a train in the approach of the eastbound intermediate signal 4.

Thus, if the series relay 5SR at the intermediate signal location fails to respond to the presence of a train, the signal 4 is caused to give the same caution indication as if the entering signal 6 were continuously at stop so that in no case could a train approach the signal 6 at stop having passed the distant signal at a clear or highspeed indication. Any train passing the signal 4 at caution would be able to stop short of the signal 6 indicating stop and the switch 3W could readily be allowed to be unlocked for operation under such circumstances. This feature of providing a check upon the operation of the series relays used for the approach control may or may not be used as may be most desirable under the circumstances of actual practice.

It is noted that the route locking stick relay 6AS is provided with a pick-up circuit including back contact 264 of the detector track repeating relay 6—7TP so that the passage of a train over the detector train section 6—7TP causes the immediate release of the locking relay 6AS to permit movement of the switch 3W in the event it is desired to have such switch in an opposite position for a closely following train.

The relay 7AS provides merely stick locking with time release for the head-block or leaving signals 7 or 7A in the usual well known manner. This relay 7AS is also provided with detector track relay release by reason of back contact 265 of the detector track repeating relay 6—7TP.

*Highway crossing protection.*—Inasmuch as the system provided by the present invention has been designed with the idea of making it readily adaptable to the usual conditions that would be encountered in practice, it is illustrated in Fig. 9 how the system can be adapted to a condition where signal protection for a highway crossing is provided. It has been assumed, for purpose of illustration, that the highway crossing would be located such as illustrated, for example, in Fig. 7C between an intermediate signal 4 and the entering signal for the left-hand end of a passing siding such as the entering signal 6 for the left-hand end of the passing siding B.

With reference to Fig. 9, the block involved is divided into three track sections, the sections 4—7T1 and 4—7T2 having the usual type of steadily energized track circuits, and being of a length most fitted for the control of the highway crossing signals FS1 and FS2. Under most conditions each of such track sections is about 2000 feet in length, and thus it is assumed that an additional track section such as the section 4—7T3 would be required in the usual length block, as the length of blocks employed where coded track circuits are involved is sometimes as much as 11,000 feet in length.

According to the circuit arrangement shown in Fig. 9, the circuits and control apparatus for the right-hand end of track section 4—7T3 can be controlled as illustrated in Fig. 7D, and the apparatus and circuits associated with the left-hand end of the track section 4—7T1 for the intermediate signal location can be provided as shown in Fig. 7C except that the relays 4TR and 4SR are controlled over a line circuit and have their circuits connected to line wires 197 and 198 instead of to the rails of the track section 4—7T1.

It is believed to be readily apparent upon comparing the conditions of the relays 4TR and 4SR of Fig. 9 with the conditions illustrated for those relays in Fig. 7C, that the circuit organization has not been changed, except for the substitution of the line wires for the track rails for the portion of the block including the steadily energized track sections 4—7T1 and 4—7T2 which are associated with the control of the flashing light signals FS1 and FS2. It will be noted that the relays 4—7TR1 and 4—7TR2 for the respective track sections 4—7T1 and 4—7T2 have their contacts included in the line circuit so as to open such circuit whenever a train is within either of the track sections. The relay 4—7TR2 would open the line circuit for the track section if the track section 4—7T2 were occupied, by the opening of front contacts 199 and 200, and the relay 4—7TR1 would open the line circuit if the track section 4—7T1 were occupied by the opening of front contacts 201 and 202.

To provide a mode of operation comparable to that which has been described in connection with the provision of approach indications, it is provided that the closure of back contacts 201 and 202 of the relay 4—7TR1 would close a shunt circuit to provide for the picking up of the relay 4SR when the track section 4—7T1 is occupied by a westbound train. Such circuit extends from the positive terminal of battery 203, including the winding of relay 4SR, front contact 204 of relay 4CP, back contact 202 of relay 4—7TR1, resistance 205, and back contact 201 of relay 4—7TR1, to the negative terminal of battery 203. The resistances 206 and 207 are included in the portion of the line circuit connected to the rails of the track section 4—7T3 in order that the shunting of the track section 4—7T3 by a westbound train will not cause sufficient current to flow in the circuit including the series relay 4SR to cause such relay to be picked up. In this manner, the mode of operation of the relay 4SR is provided so as to be comparable to the condition illustrated in Fig. 7C.

The flashing signals FS1 and FS2 are illuminated upon the passage of trains in a manner commonly employed and well known to those familiar with the art, the relays 4—7TP1 and 4—7TP2 being mechanically interlocked to provide directional control for the proper extinguishing of the signal lamps upon passage of trains over the highway crossing. The signal lamps are flashed when either back contact 208 of relay 4—7TP1 or back contact 209 of relay 4—7TP2 is closed through the medium of a flashing relay FL in the usual manner.

If the situation with respect to the location of a highway crossing is such as to require a coded track circuit cut section on each side of the crossing, it is to be understood that the cut sections would be connected to a line circuit as illustrated for the track section 4—7T3.

*Modifications.*—The nature of the requirements of practice for centralized traffic control systems is such that it is anticipated that the system provided by the present invention will necessarily be required to be modified from time to time to satisfy special railroad operating conditions. Inasmuch as these conditions are too numerous to warrant specific consideration, it is to be understood that the conditions illustrated and described herein are typical conditions which with slight modification can be applied to railroad requirements.

In some cases, for example, the stretch of single track between passing sidings may be so long that it is necessary to provide two or more pairs of intermediate signals, or staggered intermediate signals, to obtain the desired spacing for following trains. It is to be understood that the control apparatus illustrated in Fig. 7C for the intermediate signal location of this embodiment of the present invention can be duplicated for additional intermediate signal locations substantially as illustrated if it is considered sufficient to provide for clearing only the first intermediate signal out from a siding for a back-up move, the other intermediate signal or signals more remote from the siding having in their control an interlock with the opposing directional stick relay so that they cannot be cleared for a back-up move. Fig. 13 illustrates such a modified organization for two pairs of intermediate signals, in which the apparatus and circuits for the double intermediate signal location of Fig. 7C are duplicated, the intermediate signals for the additional signal location being designated 4A and 5A.

If there are two or more pairs of intermediate signals in a stretch of track between sidings, as shown in Fig. 13, the shut-down inverse code will appear in the two sections behind a train before it leaves the end section, and a shut-down pulse will be applied to this end section immediately when it becomes unoccupied in the rear of such train, thereby providing insufficient time to insure the picking up of the approach indication relay TK for that end of the stretch of single track. Under such conditions it may be desirable to delay the transmission of a shut-down pulse sufficiently to allow for the restoration of such indication relay. One means for providing such delay would be to include in the circuit for the relay CP at the last intermediate signal location for the transmission of a shut-down pulse, a back contact of a directional stick relay that would be picked up for the particular direction of traffic involved. In this manner it would be required that a driven code be transmitted momentarily through the particular end track section involved upon its becoming unoccupied in the rear of the train in order to cause the picking up of the H relay at the intermediate signal location and thereby effect the release of the directional stick relay to cause the transmission of a shut-down pulse.

For example, referring to Fig. 13, a back contact 300 of the directional stick relay 4S is included in the circuit for the relay 4CP including front contacts 16 and 169 of relays 4H and 5H respectively so as to render the transmission of a shut-down pulse in the track section 4—7T only after such track section has become unoccupied in the rear of a train for a predetermined length of time. If desired, the length of time may be increased by making the stick relay 4S slow to drop away, or by employing a slow release stick repeater relay.

A similar delay in the transmission of a shut-down pulse in the end track section can be obtained by placing the contact of the home relay for the associated intermediate signal, such as contact 168 of home relay 4H, on a slow pick-up repeater relay of that home relay. For example, as shown in connection with the signal 5A in Fig. 13, the home relay 5AH for this intermediate signal actuates a slow pick-up repeater relay 5AHP, which has its front contact 301 included in the energizing circuit for the transmitter relay 5ACP. When a westbound train leaves the end track section 2—5AT and passes out of the stretch, and the track relay 5ATR starts to respond to driven code pulses in the rear of such train, while at the same time the transmitter relay 5ACP is being energized intermittently to provide inverse code pulses in this track section 2—5AT, the home relay 2H at the siding end (Fig. 7B) will be picked up by the inverse code pulses at substantially the same time as the home relay 5AH; and the additional pick-up time of the repeater relay 5AHP will afford sufficient time margin to insure the energization of the indication relay 2—5TK in Fig. 7B.

It is entirely probable that various modifications will be required in practice in connection with the inclusion of an outlying switch in a stretch of track between sidings, and under some conditions it may be desirable to provide a traffic control button or lever on the control machine at the control office for use in causing the establishment of the direction of driven code transmission for the passage of a train out of an outlying switch instead of using the clearing of an entering signal at one of the passing sidings as a means for initiating the track circuit code communication means. If office controlled signals are to be provided for governing train movements at an outlying switch, it may be desirable to include the field station thus provided in the pairing up of the field stations for the purpose of controlling the track circuit code communication means. On the other hand, it may be desirable in some cases where outlying track switches are involved to employ the principle of transmission of a start pulse in a track circuit for the initiation of the track circuit code communication means substantially as disclosed for the track section associated with a passing siding such as the section 6—9T.

It has been assumed in this embodiment of the present invention that the passing sidings are not track circuited as is most generally the case encountered in practice, but under some conditions it is desirable that track circuits be provided for the sidings. Where such conditions exist it is believed to be readily apparent to those skilled in the art from the description of the present invention as it has been set forth how the code track circuit apparatus for a siding could be rendered active or inactive in a manner similar to that which has been described for the track section of the main track associated with a passing siding.

It is to be understood that track circuit code rates or codes of a different character can be employed other than the 120 and 75 rates which have been employed in this embodiment of the present invention. Although it is often provided that a 180 rate be employed for the clearing of signals, the 120 rate has been used in this embodiment of the present invention as the lower rate facilitates in the transmission of an inverse code which is herein employed, and which has been checked as more fully disclosed in my prior application, Ser. No. 365,065, dated November 9, 1940.

It is to be understood that the system can be used substantially as herein disclosed to provide for the control of cab signals with or without the use of intermediate wayside signals. Obviously, if there are no intermediate wayside signals, back-up moves under signal indications are not possible, and this feature of the system would be omitted.

If cab signals are employed with the coded track circuit signaling system disclosed herein, it is, of course, understood that suitable alternating currents will have to be imposed upon the track rails and coded in accordance with the apparatus herein disclosed so that the train carried cab signaling apparatus will be responsive to the coded currents in the track rails. It should also be noted that when cab signals are employed, it is desirable to have coded currents arriving in front of the train at all times because the absence of such coded currents gives the same cab signal indication as a stop code. Thus, when such cab signals are employed with the system of the present invention, it is necessary to change the series relay arrangement shown associated with the intermediate signals in Fig. 7C. In the arrangement shown, the picking up of the series relay closes front contact 140 and steadily applies energy across the track rails. To make this suitable for cab signaling, the contacts 140 and 222 should be omitted from the series relay SR and a slow-acting direct repeater relay be provided for this relay SR which would have contacts to take the place of the contacts on the present SR relay. This would be all the change necessary in this connection.

It may now be expedient to point out the advantage of the present organization where a start pulse is transmitted through a siding section to initiate the coded track circuit apparatus, while the transmission of a signal clearing code over the coded type communication system is used to reach out to start the coded track circuit apparatus at the distant end of a stretch of single track into which traffic is to be moved.

It has been pointed out above that the various field stations at the opposite ends of each single track stretch are considered to constitute a pair and the station selecting means at each of the stations for selecting that pair employs the well known expedient of a station selecting relay SO as shown in the above-mentioned Judge et al. Patent No. 2,082,544. It is then necessary to provide another step on which two decoding relays, such as relays 3PS and 3NS, are used to distinguish as to which station of the pair is to receive a control code and as to which station of the pair is to receive the code for energization of a code sending relay CS. In other words, the system is so organized with respect to a single track stretch that the transmission of a signal clearing control code to a particular field station also effects a starting control at the field station in advance of the signal to be cleared.

On the other hand, for the opposite ends of a siding section, the reception of a signal clearing control at one end causes a start pulse to be transmitted through the rails of the siding section to cause the energization of the code sending relay CS at the opposite end. This feature of the present invention wherein a start pulse is transmitted through the rails of the siding section, is used so as to permit the use of the above-mentioned usual station selecting means in the form of the SO relays. If an organization was provided to cause the reaching out over the code type communication system for initiating the coded track circuit apparatus for the opposite ends of a siding section as well as for the single track stretches, such as shown in the prior application of Judge, Ser. No. 365,669, filed November 14, 1940, it would be necessary to use PS and NS relays to decode all of the steps of the operating cycle which would result in a much larger number of relays.

For example, if a system embodying the present invention were applied to a thirty field station track layout, then a station selecting relay SO and its associated relay SOS would be required at each of the field stations together with a PS and an NS relay for each of the field stations in order to effect the station selection in accordance with the principles of the present invention. This results in a total of sixty relays for the thirty stations. Now consider the number of relays of a system wherein no start pulse is employed for initiation of the siding section, but some expedient such as in the above mentioned Judge application is employed. In such a system, two decoding relays PS and NS would be required for each of the station selecting steps which in a case of thirty stations would be five steps. For the thirty stations there would then be required three hundred relays to accomplish the station selecting function, which requires but sixty relays when the principles of the present invention are employed. Therefore, it is believed that the use of a starting pulse for effecting the initiation of the coded track circuit apparatus for siding sections to clear an entering signal is particularly advantageous.

Although it is preferable to provide an organization as disclosed herein so as to employ a signal clearing control code to act on the same operating cycle of the code type communication system to also initiate the coded track circuit apparatus at a field station distant from the field station at which the signal is to be cleared, it should be understood that the features of the coded track circuit signaling system itself may be associated in different ways with the code type communication system and still come within the scope of the present invention.

Having described a centralized traffic control system for a particular track layout as one specific embodiment of the present invention, it is desired to be understood that this form is selected to facilitate in the disclosure of the present invention rather than to limit the number of forms which the invention may assume; and, it is to be further understood that various adaptations, alterations and modifications may be applied to the specific form shown to meet the requirements of practice, without in any manner departing from the spirit or scope of the present invention except as limited by the appending claims.

What I claim is:

1. In a coded track circuit system of centralized traffic control for single track railroads, the combination with a stretch of track divided into track sections and having a head block signal at each end and intermediate signals for governing train movement into and through said stretch in either direction, a code following track relay for each end of each track section, decoding means associated with each signal and responsive to the intermittent coding operations of the associated track relay for governing the indications of that signal, code sending means for each end of the stretch initially energized by manual control from a distant control office and maintained energized until restored for establishing a direction of coding through said stretch to govern the indication of signals for one direction of train movement, means also manually controlled from the control office for keeping each head block signal at stop or exercising a clearing control to permit it to be cleared by operation of its decoding means, and means for each end of the stretch ineffective if a clearing control for the corresponding signal is in effect and acting over the track rails of the stretch only if it is not occupied for restoring the code sending means at the opposite end of the stretch.

2. In a coded track circuit centralized traffic control system for single track railroads, a stretch of single track divided into a plurality of track sections, a head block signal at each end of the stretch for governing train movement into the stretch, intermediate signals for governing train movement through the stretch in both directions, a code following track relay and associated decoding means for each end of the stretch operable to provide a clear indication for the associated head block signal subject to manual control, a signal clearing relay for each end of the stretch acting when deenergized to hold the associated head block signal at stop and when energized to render the associated decoding means effective to clear that signal, a manually operable lever in a remote control office for each head block signal for governing the energization of the associated signal clearing relay, code sending means for each end of said stretch manually controlled by the signal lever for the signal at the opposite end of the stretch, each of said code sending means having its operation initiated when a control to energize the signal clearing relay at the opposite end of the stretch is exercised by its signal lever and continuing in operation until released, and means for each end of the stretch ineffective if a manual control to clear a signal at that end is active for providing an energization of the track rails of the stretch for automatically releasing the code sending means for the opposite end only if the stretch is not occupied.

3. In a coded track circuit system for centralized traffic control for a single track railroad, the combination with a stretch of single track, a signal at each end of said stretch for governing train movement into the stretch, code transmitting means for each end of the stretch for applying driven code pulses to the track rails of the stretch at the corresponding end for governing the indications of the signal at the other end, a signal clearing relay for each signal, means manually controlled from a distant control office for governing the signal clearing relay for the signal at either selected end of the stretch and for initiating operation of the code transmitting means at the opposite end of the stretch, each code sending means after having its operation manually initiated continuing in operation until released, means responsive to driven code pulses received at each end of the stretch and effective only if the corresponding signal clearing relay is deenergized for supplying to the track rails of the stretch at the corresponding end inverse code pulses during the office intervals of the driven code being received, and means responsive to an inverse code transmitted from a given end of the stretch for releasing the code sending means at the other end of stretch.

4. In a coded track circuit centralized traffic control signal system for single track railroads, the combination with a stretch of track with a signal at each end for governing train movement into the stretch, code transmitting means associated with each end of the stretch and transmitting over the track rails toward the other end driven code pulses for governing the indication of that signal at that other end, a signal lever in a distant control office for each of said signals, a code communication system governed by said signal levers and operating over line wires connecting the control office with a field station at each end of the stretch for initiating operation of the code transmitting means at either selected end of the stretch and also during the same operating cycle governing the clearing of a signal at the other end of the stretch, and means acting over the track rails of the stretch and effective only if a manual control to clear a signal is not active and the stretch is not occupied for automatically discontinuing operation of the code transmitting means for the opposite end of the stretch until its operation is again initiated by manual control.

5. In a coded track circuit signalling system of centralized traffic control for single track railroads, the combination with a stretch of single track between the ends of passing sidings, a head block signal at each end of said stretch for governing train movement into said stretch, a signal clearing relay for each head block signal acting when energized to permit clearing of that signal in response to the reception of driven code pulses, means manually controlled from a remote control office for causing transmission of driven code pulses over the track rails of said stretch in either selected direction to govern the indications of the corresponding head block signal, means associated with each head block signal and effective only if the signal clearing relay for that signal is deenergized for applying inverse code pulses across the track rails at the corresponding end of said stretch during the off periods of a driven code being received at that end, and means responsive to said inverse code for governing traffic toward said head-block signal.

6. In a coded track circuit signaling system for a stretch of single track having a signal at each end for governing train movement into the stretch, code transmitting means for each end of said stretch operable to transmit over the track rails driven code pulses toward the other end for governing the indications of the opposing signal, a code sending stick relay for each end of the stretch acting when energized to cause operation of the corresponding code transmitting means, a manually operable signal lever for each signal in a distant control office, means governed by said signal levers and operating over line wires connecting the control office and field stations at each end of said stretch for governing the clearing of either selected one of said signals and energizing the code sending stick relay for the opposite end of the stretch, stick circuit means for maintaining each code sending stick relay energized after its initial energization by manual control, and means acting over the track rails of the stretch and effective to render said stick circuit means ineffective for a code sending relay then energized only if the stretch is not occupied by a train and a manual control to clear an opposing signal is not in effect.

7. In a coded track circuit centralized traffic control system for single track railroads, the combination with a stretch of single track between the ends of passing sidings each having a power operated switch, signals at each end of the stretch for governing train movement over the corresponding switch in either position into the stretch, code transmitting means for each end of the stretch operable to transmit a driven code toward the other end for governing the indication of the signals at that end, a code communication system including manually operable switch and signal levers in a remote control office for transmitting to a field station at either selected end of the stretch a switch position and a signal clearing control and also during the same operating cycle a control to initiate operation of the code transmitting means at the other end of the stretch, each of said code transmitting means when set into operation continuing in operation until released, and means for each end of the stretch effective only if a signal clearing control for the corresponding end is not in effect and the stretch is not occupied for communicating over the track rails of the stretch a control to release the code transmitting means at the opposite end of the stretch.

8. In a coded track circuit system for a stretch of single track divided into track sections, signals at intervals for governing train movement into and through said stretch in both directions, code transmitting means for each end of the stretch operable to transmit driven code pulses toward the other end for governing the indications of the signals for one direction of train movement, means manually controlled from a remote control office for initiating operation of either selected code transmitting means when the stretch is not occupied, each code transmitting means continuing in operation to maintain the established direction of driven code while the stretch is occupied and until released, means effective while the stretch is occupied and until released, means effective while the stretch is occupied by a train for creating in each track section behind the train a driven code to govern the indication of signals for following train movements, the code rate of said driven code being different in the successive track sections behind said train, and means for each end of the stretch effective only in response to the reception of a driven code of a predetermined rate transmitting over the track rails of the stretch when not occupied for governing the release the code transmitting means at the opposite end of the stretch.

9. In a coded track circuit signaling system for railroads, the combination with a stretch of single track having a signal at each end governing train movement into the stretch, a normally deenergized code following track relay and a normally inactive code transmitting means associated with each end of said stretch, means manually controlled from a remote control office for governing the clearing of either selected signal in response to the coding operation of the associated track relay and for also initiating operation of the code transmitting means for the other end of the stretch to transmit driven code pulses over the track rails to clear that signal, each of said code transmitting means when its operation has once been manually initiated remaining in operation until automatically restored, and means associated with each end of the stretch and acting over the track rails only if no manual clearing for the corresponding signal is in effect for automatically restoring to its normal inactive condition the code transmitting means for the opposite end of the stretch and thereby restore the coded track circuit to its normally deenergized condition.

10. In a coded track circuit signaling system for a stretch of single track divided into track sections, each of said track sections having a normally deenergized code following track relay and a normally inactive code transmitting means associated with each end of the track section, means responsive to the intermittent coding operation of each track relay except those at the ends of said stretch for causing operation of a code transmitting means to apply driven code pulses to the track rails of the adjacent end of the adjoining track section, relay means manually controlled from a remote control office for initiating operation of the code transmitting means at either selected end of said stretch and thereby establish a direction of coding through the stretch, and other means also manually controlled from the control office independently of said first relay means and acting automatically over the track rails of the stretch for discontinuing operation of the code transmitting means for the end of the stretch then in operation and thereby restore all of the track relays of the stretch to their normally deenergized condition.

11. In a coded track circuit centralized traffic control signal system for single track railroads, the combination with a stretch of single track divided into a plurality of track sections, a normally inactive code transmitting means and a normally deenergized code following track relay for each end of each track section, code responsive means associated with each track relay and energized by its coding operation, a code sending relay for each end of the stretch acting to energize and render effective the code transmitting means for the outer end of the corresponding end track section of the stretch, said code responsive means for each end of each track section except the outer ends of the end track sections acting when energized to render effective the code transmitting means for the adjoining end of the adjacent track section, whereby the energization of the code sending relay for a given end of said stretch causes transmission of a driven code over the track rails of the successive track sections toward the opposite end of the stretch, means manually controlled from a distant control office for governing the energization of said code sending relays, stick circuit means for maintaining energized each code sending relay when once energized by manual control, a head-block signal for each end of the stretch, a signal clearing relay for each signal manually controlled from the distant control office independently of said code sending relays and acting when energized to permit said signal to clear in response to the operation of the associated code responsive means, and means acting over the track rails of the stretch and effective when the stretch becomes unoccupied for automatically rendering said stick circuit means for the opposite end of the stretch ineffective to release the associated code sending relay provided no manual control to utilize the existing driven code is then being exercised by energization of a signal clearing relay.

12. In a coded track circuit centralized traffic control signaling system for single track railroads, the combination with a stretch of single track divided into a plurality of track sections and having a head-block signal at each end and intermediate signals at intervals for governing train movement into and through said stretch in either direction, a signal clearing relay for each head-block signal, a normally deenergized code following track relay for each end of each track section, decoding means for each signal responsive to the intermittent coding operation of the corresponding track relay at high and low code rates for governing the indications of that signal subject to the energization of the signal clearing relay for such signal, means responsive to the intermittent coding operation of each track relay except those at the ends of said stretch for applying driven code pulses to the track rails of the adjacent end of the adjoining track section, normally inactive code sending means for each end of the stretch operable to apply driven code pulses to the track rails at the corresponding end of the stretch and thereby establish a direction of coding through the stretch for governing the clearing of signals for one direction of train movement, means manually controlled from a distant control office for initiating operation of the code sending means at either selected end of the stretch and for also energizing the signal clearing relay for the head-block signal at the opposite end of the stretch to permit that signal to be cleared by its associated decoding means, and shutdown means acting over the track rails of the stretch and effective only if said stretch is not occupied for stopping operation of the code sending means then in operation to restore the track relays to their normally deenergized condition, said shutdown means being effective only if the signal clearing relay to clear a head-block signal by the existing code is not energized and also the associated decoding means is responsive to the operation of the corresponding track relay at a high code rate.

13. In a coded track circuit signaling system for railroads, a stretch of track having a signal at each end governing train movement into the stretch, a signal clearing relay for each signal, normally inactive code transmitting means for each end of the stretch operable to transmit a driven code over the track rails toward the opposite end for governing the indication of the signal at that opposite end, a manually controlled code communication system operating over line wires connecting a remote control office with a field station at each end of the stretch, said code communication system acting during the same operating cycle to energize the signal clearing relay at either selected end of the stretch and initiate operation of the code transmitting means at the other end, each code transmitting means after having its operation manually initiated continuing in operation until restored, and means for each end of the stretch acting automatically when the signal clearing relay for that end is deenergized for transmitting over the track rails of the stretch a control effective only if the stretch is not occupied for restoring the code transmitting means at the opposite end to its normally inactive condition.

14. In a coded track circuit signaling system, the combination with a track section, a code transmitting means and a code following track relay associated with one end of said track section, said code transmitting means being operable to apply driven code pulses to the track rails of said track section and to connect said relay to said track rails during the off interval between such code pulses, a code sending stick relay acting when energized to cause operation of said code transmitting means, means manually controlled from a distant control office for temporarily energizing said code sending relay, and a stick circuit means for said code sending relay controlled by a back contact of said track relay.

15. In a coded track circuit system of centralized traffic control for a stretch of track having a signal at each end for governing train movement into the stretch, a normally deenergized code following track relay and normally inactive code transmitting means for each end of said stretch, a signal clearing relay for each signal manually controlled from a remote control office and acting when energized to permit clearing of the corresponding signal in response to the intermittent coding operation of the corresponding track relay, said signal clearing relay when deenergized holding its associated signal at stop regardless of the coding operation of the associated track relay, a code sending stick relay at each end of the stretch initially energized during a prolonged energization of the corresponding track relay for a limited time only if such energization is prolonged for a time greater than the usual code pulse, stick circuit means for maintaining each code sending relay energized, means effective when a code sending relay is energized for causing operation of the associated code transmitting means to provide a driven code to govern the indications of the signal at the opposite end of the stretch subject to the energized condition of said signal clearing relay, means effective upon energization of either signal clearing relay by manual control for energizing the track relay at the opposite end of the stretch for said limited time and thereby energize the code sending relay at that end to provide a driven code for clearing the corresponding signal, means effective while a signal clearing relay at either end of the stretch is deenergized and a driven code is being received at that end for transmitting over the track rails of the stretch to the opposite end inverse code pulses during the off periods of the driven code, and means responsive to the operation of a track relay by said inverse code pulses for deenergizing the corresponding code sending relay, whereby each of said code sending relays may be energized by a prolonged starting energization of its associated track relay but is automatically released by energization of said track relay by a code pulse.

16. In a coded track circuit centralized traffic control system for a stretch of track having a signal at each end governing train movement into the stretch, a normally deenergized track relay for each end of said stretch, decoding means associated with each signal and energized by the intermittent coding operation of the corresponding track relay, a signal clearing relay for each signal energized from a remote control office for governing the clearing of the corresponding signal dependent upon the energization of its associated decoding means, code transmitting means for each end of said stretch including a code sending relay acting when energized to render said code transmitting means effective to transmit driven code pulses, means effective upon energization of either selected signal clearing relay by manual control and acting over the track rails of said stretch to cause energization of the code sending relay for the opposite end of the stretch and thereby provide a driven code for clearing the signal governed by said selected signal clearing relay, and restoring means effective when a signal clearing relay becomes deenergized and driven code pulses are being received to transmit inverse code pulses during the off periods of the driven code toward the opposite end of the stretch for restoring the code sending relay at that end, said restoring means including separate circuit elements associated with each code sending relay for respectively keeping its pick-up circuit open while its stick circuit is opened as a result of the reception of inverse code pulses, whereby inverse code pulses are effective to release but not energize the code sending relay.

17. In a coded track circuit system for railroads, a stretch of track including a power operated track switch, a home signal adjacent the switch for governing train movement from said stretch over the switch, a distant signal in the rear of said home signal for governing train movement toward the switch, code transmitting means operable to apply driven code pulses to the track rails at a rate determined by the indication of the home signal for governing the indications of the distant signal, a code sending relay acting when energized to cause operation of said code sending means, means effective only if the stretch of track between said home signal and distant signal and also a track section in the rear of the distant signal are not occupied for transmitting toward the switch inverse code pulses during the off intervals of the driven code, a code following track relay connected across the track rails of the stretch at the home signal during the off intervals of the driven code, stick circuit means for maintaining said code sending relay energized until said track relay is energized at a time other than during the off intervals of the driven code, approach locking means governed by intermittent coding operation of said track relay by said inverse code pulses for preventing power operation of the track switch, and means governed by the intermittent coding operation of said track relay while said code sending relay is energized for indicating in the control office the condition of occupancy of the track sections governing the approach locking of the switch.

18. In a coded track circuit system for railroads, the combination with a stretch of track including a power operated track switch and divided into track sections, a home signal adjacent the switch governing train movement from said stretch over the switch, a distant signal in the rear of said home signal governing train movement toward the switch, normally inactive code sending means manually controlled from a distant control office for transmitting a driven code toward the distant signal at a code rate determined by the indication of the home signal for governing the indications of said distant signal, a track relay connected across the track rails of the stretch adjacent the home signal during the off intervals of the driven code, means effective only if the stretch of track between the distant signal and the home signal and a track section in the rear of said distant signal are not occupied for transmitting over the track rails toward the home signal inverse code pulses during the off intervals of the driven code for intermittently operating said track relay, approach locking means governed by the intermittent operation of said track relay by said inverse code pulses for preventing power operation of said switch, and means for maintaining said code sending means in operation after manual initiation of its operation until said track relay is energized at a time other than during the off intervals of said driven code.

19. In a coded track circuit switch and signal system for railroads, the combination with a stretch of track including a power operated track switch, a home signal adjacent the switch for governing train movement from the stretch over the switch, a distant signal in the rear of said home signal at the entrance to an approach track section, code transmitting means for at times supplying driven code pulses to said approach section in a direction to govern the indications of said distant signal in accordance with the indication of the home signal, another coded track circuit section in the rear of said approach section including relay means governed by the energizing potential applied to the track rails of said another track section adjacent the distant signal and responsive to the presence of a train in that track section, means controlled by said relay means for applying inverse code pulses to the track rails of the approach track section during the off intervals of the driven code in that track section, and approach locking means governed by said inverse code for preventing power operation of said switch for a time after the home signal once cleared is put to stop while the inverse code pulses are cut off either by a train in said approach track section or by the operation of said relay means by a train in said another track section.

20. In a coded track circuit signaling system for railroads, the combination with a power operated track switch and an approach track section, a signal governing train movement over the switch into said approach track section, an intermediate signal governing train movement over the approach track section toward the switch, means manually controlled from a distant point for causing transmission of driven code pulses over the track rails of said approach track section in either selected direction for governing the indications of said signals, means associated with said intermediate signal and responsive to the reception of driven code pulses from the opposite end of said approach track section for transmitting inverse code pulses toward the switch during the off intervals of the driven code, a code following track relay at the end of said approach section adjacent the switch operable by either driven or inverse code pulses transmitted toward the switch, and a clearing circuit for the signal at the switch responsive to the coding operation of said track relay but opened if a driven code is being applied to the corresponding end of said approach track section.

21. In a coded track circuit system of centralized traffic control for single track railroads, a stretch of track between the ends of passing sidings each having a power operated track switch, starting signals governing train movement over each switch in either of its positions into said stretch, intermediate signals governing train movement over an approach track section toward each switch, a code following track relay for each end of the stretch, code transmitting means for each end of the stretch manually controlled from a distant control office for transmitting driven code over the track rails of said stretch in either selected direction for governing the indications of the intermediate and starting signals for a selected direction of train movement, means at each intermediate signal responsive to the reception of a driven code and effective only if a track section in the rear of that signal is not occupied for transmitting inverse code pulses during the off intervals of the driven code to operate the track relay at the corresponding end of the stretch, approach locking means for each switch governed by the coding operation of the associated track relay by said inverse code pulses, and de-coding means at each end of the stretch responsive to the coding operation of the associated track relay and effective to govern the clearing of the corresponding starting signal only if the associated code transmitting means is inactive.

22. In a coded track circuit signaling system for a stretch of track divided into a plurality of track sections and having signals governing train movement in both directions, code transmitting means for each end of each track section operable to transmit driven code pulses toward the opposite end, means manually controlled from a remote control office for initiating operation of the code transmitting means for either selected end of the stretch and thereby cause transmission of driven code pulses over the successive track sections in one direction for governing the indication of the signals for train movement in one direction, each code transmitting means at the end of the stretch after having its operation manually initiated continuing in operation until restored, inverse coding means for transmitting over the track rails of an end track section of the stretch toward the corresponding end of the stretch inverse code pulses during the off intervals of the driven code pulses in that end track section, means for rendering said inverse code transmitting means ineffective if a track section in the rear of the corresponding end track section is occupied, and means at each end of the stretch operable to provide an energization of the track rails distinctive from said inverse code pulses in the opposite end section to restore said code transmitting means at that opposite end only provided the stretch is not occupied.

23. In a coded track circuit centralized traffic control system for single track railroads, the combination with a stretch of single track between the ends of passing sidings divided into track sections and having a power operated switch at each end, signals at each end of the stretch governing train movement over the corresponding switch in either position into the stretch, code transmitting means for each end of the stretch operable to transmit driven code pulses toward the opposite end for governing the indication of the signals at that end, a code communication system including manually operable switch and signal levers in a control office for transmitting controls dependent upon the position of said levers for selectively governing the power operation of the track switches and the clearing of said signals, said code communication system acting during the same operating cycle when a signal clearing control is communicated to one end of the stretch to initiate operation of the code transmitting means for the opposite end of the stretch, each code transmitting means when set into operation continuing in operation until released, means for transmitting over an end track section of the stretch inverse code pulses toward the corresponding end of the stretch during the off intervals of the driven code transmitted from that end, approach locking means for each switch governed by said inverse code pulses received at the corresponding end of the stretch, and means for each end of the stretch operable only if a signal clearing control for the signals at that end is not in effect and the stretch is not occupied for creating in the track rails of the opposite end track section an energization distinctive from said inverse code pulses and thereby release the code transmitting means at that opposite end.

24. In a coded track circuit signaling system for railroads, the combination with a stretch of track having a code following track relay at each end, means manually controlled from a remote control office for causing transmission of a driven code in either selected direction over said stretch, an indication control relay for each end of the stretch having an energizing circuit closed in response to the coding operation of the corresponding track relay by a driven code, means governed by said manually controlled means for maintaining each indication relay energized independently of the coding operation of its associated track relay for a time after the direction of coding in the stretch has been manually selected and until coding operation of the associated track relay can begin provided the stretch is not occupied, and means for indicating in the control office when either of said indication control relays is deenergized and thereby indicate whether or not said stretch is occupied by a train.

25. In a system for indicating in a remote control office the occupied condition of a track section having a normally deenergized code following track relay, code sending means manually controlled from the control office for initiating coding operation of said track relay only if said track section is not occupied, indication control means independently energized either while said code sending means is inactive or by coding operation of said track relay, whereby whenever the code sending means is set into operation by manual control the energization of said indication control means is dependent upon the coding operation of said track relay, and means for indicating in the control office the energized and deenergized condition of said indication control means.

26. In a system for indicating in a remote control office the condition of occupancy of a track section having a normally deenergized code following track relay, code sending means manually controlled from the control office for initiating intermittent coding operation of said track relay only if said track section is not occupied, an indication control relay maintained energized while said code sending means is inactive and for a limited time after said code sending means is rendered active by manual control, decoding means responsive to the intermittent coding operation of said track relay for independently energizing said indication control relay, means effective only if said track section is not occupied for discontinuing operation of said code sending means until its operation is again manually initiated, thereby restoring said track relay and its associated decoding means to the normally deenergized condition, and means for indicating in the control office the energized and deenergized condition of said indication control relay.

27. In a coded track circuit system, the combination with a stretch of track including a plurality of track sections, normally inactive code sending means associated with one end of said stretch and manually controlled from a distant control office for transmitting driven code pulses over the track rails of said stretch from that end, means effective only if the stretch is not occupied for transmitting over the track rails of said stretch toward said one end inverse code pulses during the off intervals between said driven code pulses, an indication control relay maintained energized while said code sending means is inactive and for a limited time after it is rendered active by manual control, means responsive to said inverse code pulses for independently energizing said indication control relay, means for indicating in the control office the energized and deenergized condition of said indication control relay, and means operable only if said stretch is not occupied for restoring said code sending means to its normally inactive condition.

28. In a coded track circuit signaling system for railroads, a track section having a signal at each end for governing train movement into said track section, a signal clearing relay for each signal energized by manual control from a remote control office, code transmitting means for each end of said track section operable to send driven code pulses over the track rails of said track section toward the opposite end for governing the indications of the signal at that opposite end, means responsive to the energization of a signal clearing relay at either end of said track section and acting over the track rails of said track section for initiating operation of said code transmitting means for the opposite end of the track section, an indication control relay for each end of said track section, means for energizing each indication control relay when the corresponding signal clearing relay is deenergized and also for a limited time after energization of said signal clearing relay, means for also energizing each indication control relay when a driven code is being received at the corresponding end of said track section, and means governed jointly by said indication control relays for indicating in the control office the condition of occupancy of said track section.

29. In a coded track circuit signaling system for railroads, the combination with a stretch of track having a signal at each end governing train movement into said stretch, a code following track relay for each end of said stretch, code transmitting means for each end of the stretch operable to transmit a driven code over the track rails of the stretch toward the other end for governing the indications of the signal at that other end, a signal clearing relay for each signal manually controlled from a remote control office, means responsive to the energization of a signal clearing relay for either end of said stretch and acting over the track rails of the stretch for causing operation of the code transmitting means for the opposite end, an indication control stick relay for each end of the stretch, a pick-up circuit for each indication control relay closed when a driven code is being received at the corresponding end of the stretch, a stick circuit for each indication control relay closed when the corresponding signal clearing relay is deenergized and also for a limited time after energization of such signal clearing relay, and means rendered active when either of said indication control relays is deenergized for indicating in the control office the occupancy of said stretch.

30. In a coded track circuit signaling system for a stretch of single track divided into track sections, a starting signal at each end of the stretch governing train movement into the stretch, intermediate signals governing train movement toward each end of the stretch, code transmitting means for each end of the stretch operable to transmit a driven code toward the opposite end for governing the indications of the signals for one direction of train movement, means manually controlled from a distant control office for initiating operation of the code transmitting means at either selected end of the stretch and for maintaining such established direction of driven code while the stretch is occupied by a train entering at the code receiving end of the stretch, and means manually controlled from the control office and effective while the stretch is occupied by such train for transmitting from the end at which that train entered code pulses for clearing the intermediate signal for such train to make a back-up movement.

31. In a coded track circuit system for single track railroads, a stretch of single track between the ends of passing sidings, a starting and an entering signal at each end of the stretch for governing train movement into and out of said stretch respectively, intermediate signals in the stretch for governing train movement toward each end, means manually controlled from a remote control office for causing transmission of a driven code over the track rails of said stretch from either selected end for governing the indication of the signals for one direction of train movement, a signal clearing relay for each entering signal energized by manual control from the control office, and means effective when the stretch is occupied by a train entering from a given end and responsive to the energization of the signal clearing relay for the entering signal at that end for providing code pulses to clear the intermediate signal for said train to make a back-up move.

32. In a coded track circuit system for a stretch of single track having a starting signal at each end governing train movement into the stretch, intermediate signals in the stretch governing train movement toward each end, means manually controlled from a remote control office for causing transmission of a driven code over the track rails of the stretch from either selected end for governing the indications of the signals for one direction of train movement, means associated with each intermediate signal and responsive to the direction of train movement for producing behind a train in the stretch a driven code to clear a starting signal for a following train movement in the same direction, and means for each end of the stretch manually controlled from the control office for transmitting code pulses from that end to clear the opposing intermediate signal to allow a train in the stretch to make a back-up movement, said means being effective to transmit such code pulses for a back-up train movement only if the associated starting signal is at stop.

33. In a coded track circuit signaling system for single track railroads, the combination with a stretch of single track between the ends of passing sidings, a head block signal and an entering signal at each end of the stretch governing train movement into and out of said stretch respectively, intermediate signals in the stretch governing train movement in both directions, a signal clearing relay for each of said head block and entering signals manually controlled from a remote control office, code transmitting means for each end of the stretch operable to transmit driven codes toward the opposite end for governing the indications of the signals for one direction of train movement, and means responsive to the energization of a signal clearing relay for an entering signal at either given end of the stretch for initiating operation of the code transmitting means at said given end, and manually controlled means for governing the energization of the signal clearing relay for the head-block signal at either given end of the stretch and also for initiating operation of the code transmitting means for the opposite end of the stretch, whereby the transmission of driven code pulses in either selected direction may be manually set into operation for the purpose of clearing the head block signal to allow a train to enter the stretch, or for clearing intermediate and entering signals to allow a train in the stretch to move out of the stretch.

34. In a coded track circuit centralized traffic control system for single track railroads having the usual stretches of single track between the ends of adjacent passing sidings and siding sections between the ends of the same passing sidings, a head block signal and an entering signal at each siding end for governing train movement into the adjacent single track stretch and siding section respectively, code transmitting means for each end of each single track stretch and each siding section operable to transmit driven code pulses over the track rails toward the opposite end for governing indications of the signal at that opposite end, a centralized control code communication system including manually operable signal levers in a remote control office for transmitting to any selected siding end a control for governing the clearing of either the head block signal or the entering signal for that siding end, means governed by said code communication system for initiating operation of the code transmitting means for either selected end of a given selected single track stretch when a clearing control for the head block signal at the opposite end of that stretch is transmitted, and means for each end of each siding section responsive to the transmission of a signal clearing control for the corresponding entering signal for communicating over the track rails of that siding section a control to initiate operation of the code transmitting means at the opposite end of that siding section.

35. In a coded track circuit centralized traffic control system for single track railroads having the usual stretches of single track between the ends of adjacent passing sidings and siding sections between the ends of the same passing sidings, a head block signal and an entering signal at each siding end for governing train movement into the adjoining single track stretch and siding section respectively, code transmitting means for each end of each single track stretch and each siding section operable to transmit driven code pulses over the track rails toward the opposite end for governing the indication of the signal at that opposite end, a code communication system including manually operable signal levers in a remote control office and a field station at each siding end for transmitting signal clearing controls selectively to said field stations only one at a time, said code communication system acting in response to transmission of a control to clear a head block signal at a selected end of a single track stretch to transmit on the same operating cycle a control to the field station at the opposite end of that stretch to initiate operation of the corresponding code transmitting means, thereby creating a driven code for clearing said head block signal, and means for each end of each siding section responsive to the reception of a control for clearing the corresponding entering signal and acting over the track rails of that siding section to initiate operation of the code transmitting means for the opposite end of that siding section.

36. In a coded track circuit system of centralized traffic control for single track railroads having the usual stretches of single track between the ends of adjacent passing sidings and siding sections between the ends of the same passing sidings, a head block signal and an entering signal at each siding end for governing train movement into the corresponding single track stretch and siding section respectively, switch and signal levers in a remote control office, a code communication system including a field station at each siding end and acting during an operating cycle to transmit switch position and signal control codes to one selected field station in accordance with the position of the corresponding switch and signal levers, means at each end of a single track stretch for transmitting driven code pulses over the track rails to the opposite end of that single track stretch, said means for either given end being rendered effective when a control to clear the head block signal for the opposite end of that stretch is transmitted by said code communication system, and means responsive to the transmission of a control code over said communication system to clear an entering signal at either selected end of a siding section and acting over the track rails of that siding section for causing transmission of driven code pulses from the opposite end of said siding section to govern the indications of said entering signal.

37. In a coded track circuit system of centralized traffic control for single track railroads having the usual stretches of single track between the ends of adjacent passing sidings, a signal at each end of each stretch for governing train movement into that stretch, code transmitting means for each end of each stretch operable to transmit driven code pulses over the track rails of that stretch toward the opposite end for governing the indication of the signal at that opposite end, manually operable signal levers in a remote control office, and a code type communication system including a field station at each siding end and acting during different operating cycles to govern the clearing of the head block signal at one selected field station only in accordance with the position of its signal lever, said code communication system acting during each operating cycle to select out of all of the field stations one pair of field stations only belonging to the opposite ends of a given selected single track stretch as those to receive code control elements during that operating cycle, said code communication system acting to select the particular field station of the pair to receive a signal clearing control and to transmit on the same operating cycle to the other field station of the pair a control for initiating operation of the corresponding code transmitting means.

38. In a coded track circuit system of centralized traffic control for single track railroads having the usual stretches of single track between the ends of adjacent passing sidings and siding sections between the ends of the same passing siding; a head block signal and an entering signal at each siding end for governing train movement into the adjacent single track stretch and siding section respectively, manually operable switch and signal levers in the control office for each siding end, a code communication system including a field station at each siding end and acting during a given operating cycle to transmit switch position and signal clearing controls to any one selected field station in accordance with the position of the corresponding switch and signal levers, said code communication system acting during each operating cycle to select out of all the field stations only one pair of field stations belonging to the opposite end of the same single track stretch as those field stations responsive to control code elements transmitted during that operating cycle, code transmitting means for each end of each single track stretch and each siding section operable to transmit over the track rails driven code pulses toward the opposite end for governing the indication of the signal at that opposite end, means associated with each field station and effective only when a control to clear a head block signal is transmitted to the other field station of the same pair for initiating operation of the code transmitting means at the corresponding end of the stretch to send driven code pulses for clearing such head block signal, and means associated with each field station and responsive to the transmission of a control to clear the corresponding entering signal for governing the energization of the track rails of the corresponding siding section to initiate operation of the code transmitting means for the opposite end of that siding section, and thereby provide driven code pulses in the track rails of said siding section for governing the indications of such entering signal.

39. In a coded track circuit system of centralized traffic control for single track railroads having stretches of single track between the ends of passing sidings, a signal at each end of each single track stretch for governing train movement into that stretch, manually operable signal levers in a remote control office, a code communication system including a field station at each siding end and acting during an operating cycle to transmit a series of code elements for station selection and signal clearing control, station selecting means for each field station effective only if its station code call matches the station selecting code elements being transmitted during an operating cycle, only those two field stations at the opposite ends of the same single track stretch having the same station code call, track circuit code transmitting means for each end of each single track stretch operable to transmit driven code pulses over the track rails toward the opposite end of that stretch, and means associated with each field station and effective only if its station selecting means is effective and a control code to clear a signal is transmitted to the field station at the opposite end of the same single track stretch for initiating operation of the code transmitting means to provide driven code pulses for governing the indications of such signal.

40. In a centralized traffic control coded track circuit system for single track railroads, the combination with a plurality of stretches of single track between the ends of adjacent passing sidings and a plurality of siding track sections between the ends of the same passing siding, code transmitting means for each end of each single track stretch and each siding section operable to transmit driven code pulses over the track rails toward the opposite end, signals associated with each end of each single track stretch and each siding section for governing train movement into these respective portions of track, means manually controlled from a distant control office for governing the clearing of a signal at either selected end of a selected single track stretch and also initiating operation of the code transmitting means at the opposite end of that stretch and means acting over the track rails of each siding section for initiating operation of the code transmitting means at either selected end of that siding section when a control to clear the signal at the opposite end of that siding section is effective.

41. In a coded track circuit system for railroads, the combination with a track section, a source of current, a code following track relay, a series relay, code transmitting means for alternately connecting said track relay or said source of current in series with the series relay across the track rails of the track section and circuit means responsive to the energization of said series relay by a train in said track section for connecting said source of current and the series relay across the track rails independently of the operation of said code transmitting means, whereby said series relay when once initially energized is maintained energized so long as the track section is occupied.

42. In a coded track circuit signaling system for a stretch of single track having a highway crossing between its ends with highway crossing signals, signals governing train movement in both directions over said stretch, approach track sections one on each side of said highway crossing and each having a steadily energized track relay for causing operation of the highway crossing signals when a train approaches the crossing in either direction, a pair of line wires including front contacts of both of said track relays, said stretch being divided into other coded track circuit sections in accordance with the location of the signals, means including normally deenergized code following track relays and normally inactive code transmitting means and rendered active by manual control from a distant control office for transmitting driven code pulses from either selected end of said stretch over the track rails of said other track sections and over said pair of line wires for governing the indications of the signals for a selected direction of train movement; and means acting over the track rails of said other track sections of the stretch and said pair of line wires for restoring said code transmitting means to the normal inactive condition when a manual control to clear the signals is not active and the stretch is not occupied.

43. In a coded track circuit system for a railroad having a switch connecting a passing siding with one end of a stretch of single track extending to another passing siding, a detector track section including said switch, a signal governing train movement over said detector track section and into said stretch, code transmitting means associated with the end of said stretch adjacent said detector track section for applying code pulses to the track rails of said single track stretch, means manually controlled from a distant control office for clearing said signal and for rendering said code transmitting means ineffective, and means responsive to the presence of a train in said detector track section for governing said manually controlled means to put said signal to stop and also maintaining said code transmitting means ineffective while said detector track section is occupied.

44. In a coded track circuit signaling system for a single track railroad, the combination with a switch connecting a passing siding with one end of a stretch of single track extending to another passing siding, a detector track section including said switch and having a detector track relay, a signal governing train movement into said detector track section and over said stretch, code transmitting means for the end of said stretch adjacent said switch including a transmitter relay for sending code pulses away from that end of the stretch, signal control means manually governed from a distant control office for governing the clearing of said signal, means for restoring said signal control means to its inactive condition by release of said detector track relay, and an operating circuit for said transmitter relay governed by said signal control means and opened when said detector track relay is released by the presence of a train in said detector track section.

45. In a coded track circuit system for a stretch of single track between the ends of passing sidings divided into a plurality of track sections, code transmitting means for the respective track sections manually governed from a distant control office and cooperating at times to provide driven code pulses in a selected direction in each track section dependent upon coding in the same direction in an adjoining track section, decoding means including a code following track relay for each end of the stretch responsive to the reception of code pulses at that end, indicating means in said control office, and indication control means for rendering said indication means effective when one of said decoding means ceases to receive code pulses due to the entrance of a train into said stretch at the corresponding end until code pulses are again received by said one decoding means.

46. In a coded track circuit system for a stretch of single track between the ends of passing sidings divided into a plurality of track sections, code transmitting and receiving means for each end of each track section, each code transmitting means being governed by the code receiving means for the adjoining end of the next adjacent track section means manually controlled from a distant control office for governing said code transmitting means, said code transmitting means cooperating to provide at times code pulses in the same direction to the track rails of the respective track sections, occupancy indicating means in said control office, and means for each end of the stretch governed by said code responsive means and including a directional stick relay energized by the entrance of a train into a stretch at the corresponding end for rendering said indicating means effective while a predetermined portion of said stretch is occupied.

47. In a coded track circuit system for a stretch of single track between the ends of passing sidings divided into a plurality of track sections, code transmitting means controlled from a distant control office for at times transmitting driven code pulses over the track rails of the respective track sections, code responsive means associated with each end of said stretch, indicating means in said control office including a separate changeable indicator for each of two predetermined portions of said stretch, and means including said code responsive means for rendering effective each of said indicators when the corresponding predetermined portion of the stretch is occupied by a train.

48. In a coded track circuit system for a stretch of single track between the ends of passing sidings divided into a plurality of track sections, a signal at each end of said stretch governing train movement into the stretch, code transmitting means for the respective track sections manually controlled from the distant control office for a times transmitting code pulses over the track rails of said track sections for governing the indication of said signal at the end of said stretch receiving such code pulses, separate changeable indicators in the control office associated with different end portions of said stretch, and means for each end of said stretch responsive to the entrance of a train in the corresponding end for rendering the associated indicator in the control office effective until a predetermined portion of said stretch becomes unoccupied.

49. In a coded track circuit system for a stretch of single track between ends of passing sidings separated into two predetermined portions and provided with a plurality of track sections, one of said track sections being included in both of said predetermined portions, coding means for the respective track sections manually controlled from a distant control for at times transmitting code pulses in the same direction over the track rails of the several track sections, code responsive means for each end of the stretch governed by the code pulses being received at that end of the stretch, a code communication system for transmitting indication codes on different operating cycles from the field stations associated with the opposite ends of said stretch, separate occupancy indicating means in the control office for the respective portions of said stretch governed by the said indication code received from the associated field station, and means for each end of the stretch including said code responsive means of that end and responsive to the presence of a train in the associated predetermined portion of said stretch for governing said code communication system to transmit an indication code rendering the associated occupancy indicating means in the control office effective while that predetermined portion of the stretch is occupied.

50. In a coded track circuit system for a stretch of single track between the ends of passing sidings divided into two predetermined portions and provided with a plurality of track sections, code transmitting means manually controlled from a distant control office for at times transmitting driven code pulses over the track rails of each track section dependent upon coding in the same direction in an adjoining track section, indicating means in the control office including a separate changeable indicator for each of said predetermined portions of said stretch, code responsive means for each end of said stretch governed by the code pulses being received at that end, and means for each end of said stretch including said code responsive means and responding to the entrance of a train into the corresponding predetermined portion of the stretch at either of its ends for governing said indicating means to render effective a corresponding indicator.

51. In a coded track circuit signaling system for railroads, a track section, coding means operable to transmit code pulses over the track rails of said track section toward one end, code responsive means energized by said code pulses, means manually controlled from a distant control office for rendering said coding means effective at times for train movement in one direction and ineffective at other times for train movement in the opposite direction, indicating means in said control office for indicating occupancy of said track section, and means actuated only by the movement of a train into said track section and governed by said code responsive means for rendering said indicating means active while said code responsive means is deenergized due to the presence of a train in said track section.

52. In a coded track circuit signaling system for a stretch of single track having a track section at each end, a signal at each end of the stretch governing train movement into said stretch, coding means for each track section for transmitting code pulses over the track rails of that track section toward the associated signal for governing its indications, means manually controlled from a distant control office for governing the operation of said coding means to provide code pulses toward only one of said signals in accordance with the direction of traffic manually established and for governing the clearing of that signal, occupancy indicating means in said control office, and means for each end of said stretch actuated only by movement of a train into the stretch and maintained actuated until code pulses are again received at that end of the stretch for rendering said indicating means active to show occupancy of the corresponding end track section of the stretch.

53. In a coded track circuit signaling system for single track railroads, the combination with a track section and a signal at one end thereof governing train movement into said track section, coding means for transmitting code pulses over the track rails of said track section toward said signal, code responsive means energized by said code pulses for governing the indications of said signal, means manually controlled from a distant control office for rendering said coding means effective or ineffective to permit clearing of said signal or to hold it at stop in accordance with the direction of traffic manually established, indicating means in said control office for indicating occupancy of said track section, and means at said signal actuated only by the entrance of a train into said track section and maintained actuated so long as said code reponsive means is deenergized for rendering said indicating means active while said track section is occupied.

54. In a coded track circuit signaling system for a stretch of single track including a detector track section and an adjoining coded track circuit section adjacent the end of a passing siding, a signal governing train movement over said detector track section and into said coded track circuit section, coding means operable to transmit code pulses over the track rails of said coded circuit section toward said signal, code responsive means energized by said code pulses for governing the indications of said signal, means manually controlled from a distant control office for rendering said coding means effective or ineffective in accordance with the direction of traffic manually established, indicating means in the control office for indicating occupancy of said coded track circuit section, and means governed jointly by the entrance of a train into said detector track section and by said code responsive means for rendering said indicating means active while said code responsive means is deenergized due to the presence of a train in said coded track circuit section.

55. In a coded track circuit signaling system for a stretch of single track between the ends of passing sidings, a signal at each end of said stretch governing train movement into the stretch, coding means operable at times to send code pulses over the track rails of said stretch toward each end for governing the indications of the associated signal, occupancy indicating means in said control office, a code communication system including a field station at each siding end and effective during operating cycles when set into operation to send indications of different character from either field station to a control office for governing said indicating means, signal control means for each field station manually governed over said code communication system for controlling the operation of said coding means to condition the signal at the corresponding field station to clear or hold it at stop in accordance with the direction of traffic manually established and means at each field station actuated only by train movement and restored by the reception of code pulses at the corresponding end of said stretch for initiating operation of said code communication system in response to the actuation and restoration of said means and for determining the character of the indications transmitted by said code communication system for governing said indicating means.

56. In a coded track circuit signaling system for a stretch of track including a track section, coding means manually controlled from a distant control office for at times transmitting code pulses toward one end of said track section, code responsive means energized by said code pulses, occupancy indicating means in said control office, a stick relay at said one end of said track section for rendering said indicating means active while said stick relay is deenergized, a pick-up circuit for said stick relay closed while said code responsive means is energized by the reception of code pulses, a stick circuit for said stick relay, and means actuated only by the entrance of a train into said track section at said one end for governing said stick circuit to render the energization of said stick relay dependent upon the reception of code pulses, thereby governing said indicating means in accordance with the occupied condition of said track section independently of the deenergization of the code responsive means due to the cessation of code pulses at other times.

57. In a coded track circuit system for a stretch of single track divided into a plurality of track sections, signals for governing train movement into and over said stretch in opposite directions, coding means associated with each of said track sections for transmitting code pulses in either direction over the track rails of said track sections, means manually controlled from a distant control office for governing the operation of said coding means to provide signal clearing code pulses in said track sections in one direction to clear signals for a corresponding direction of traffic while holding the opposing signals at stop, means for governing said coding means of the track sections in the rear of a train to provide code pulses of a particular rate at the end of said stretch only when a predetermined portion of said stretch including more than one track section is not occupied, occupancy indicating means in said control office, means including a stick relay actuated only by the entrance of a train into said stretch for rendering said indicating means active, and a stick circuit for said stick relay opened in response to code pulses of said particular rate only, whereby said stick relay is maintained actuated until said predetermined portion of the stretch in the rear of a train in the stretch becomes unoccupied.

58. In a coded track circuit signaling system for a stretch of single track including a plurality of track sections, coding means for said track sections manually governed from a distant control office for at times transmitting code pulses of a particular code rate toward either selected end of the stretch only if a plurality of track sections adjacent that end are not occupied by a train, occupancy indicating means in said control office, means at each end of said stretch including a directional stick relay energized by the entrance of a train into the stretch at the corresponding end for governing said indicating means, a stick circuit for each directional stick relay, and code responsive means for each end of the stretch energized only by code pulses of said particular code rate for governing said stick circuit of the associated directional stick relay in accordance with the condition of occupancy of a plurality of said track sections.

59. In a coded track circuit signaling system for a stretch of single track between the ends of passing sidings divided into a number of track sections, coding means for the respective track sections manually controlled from a distant control office for at times transmitting signal clearing code pulses in one direction over the track rails of the respective track sections and inverse code pulses in the opposite direction over the track rails of a plurality of said track sections in accordance with the direction of traffic manually established, means responsive to the presence of a train in one of said plurality of track sections and moving in a given direction for then stopping transmission of said inverse code pulses then existing in the adjoining track section ahead of such train, occupancy indicating means in said control office for indicating the occupied or unoccupied condition of the end portions of said stretch, and code responsive means for each end of said stretch energized by the inverse code pulses received at that end for governing said occupancy indicating means for the corresponding end portion of the stretch.

60. In a coded track circuit signaling system for railroads, the combination between two adjacent track sections, code transmitting means for intermittently connecting a source of current across the track rails at corresponding ends of said track sections to provide driven code pulses in the same direction in said track sections, a series relay in series with the current source and one of said track sections and energized by the presence of a train in that track section, and means for transmitting inverse code pulses over the track rails of the other track section during the off interval between the driven code pulses therein only if said series relay is deenergized.

61. In a coded track circuit signaling system for a stretch of single track between the ends of passing sidings including an end track section and an adjoining rear track section, signals for governing train movement over each of said track sections toward the corresponding end of the stretch, coding means manually controlled from a distant control office for at times transmitting driven code pulses over the track rails of said track sections toward said signals, said coding means for said rear track section including relay means responsive to the presence of a train in said rear track section moving in the direction of traffic governed by said signals, means associated with said end track section and effective only if said relay means is inactive for transmitting inverse code pulses toward said end of the stretch during the off intervals of the driven code pulses in said end track section, and code responsive means at said end of the stretch energized by said inverse code pulses.

62. In a coded track circuit signaling system for a stretch of single track between the ends of passing sidings including a plurality of track sections, signals governing train movement into and through said stretch in both directions, coding means for said track sections manually controlled from a distant control office for transmitting code pulses in either selected direction over the track rails of the track sections for clearing said signals for a corresponding direction of train movement, indicators in said control office for indicating occupancy of different end portions of said stretch, control means for each end of said stretch for governing the corresponding indicator in the control office, means for actuating each of said control means by the entrance of a train into the stretch at the corresponding end when the direction of coding is toward that end, and means for actuating each of said control means in response to the presence of a train approaching the corresponding end of the stretch when the direction of coding is away from that end of the stretch.

63. In a coded track circuit signaling system for a stretch of track divided into a plurality of track sections, signals at intervals in said stretch governing train movement into and through said stretch in opposite directions, code transmitting means and code receiving means for the respective track sections manually controlled from a distant control office for transmitting signal clearing code pulses over the track rails of said track section in either selected direction to clear the signals for a corresponding direction of train movement, separate occupancy indicators in said control office for different end portions of said stretch, and control means for each end of the stretch governed by the associated code receiving means and responsive to train movement either toward or away from the corresponding end of the stretch for controlling the occupancy indicator for the corresponding end portion of the stretch.

64. In a coded track circuit system for a stretch of track including a plurality of track sections and having signals for governing train movement into and through said stretch in both directions, coding means for the respective track sections manually controlled from a distant control office for transmitting driven code pulses over the track rails of said track sections for governing the clearing of said signals for either manually selected direction of train movement, indicating means in said control office for indicating occupancy of different end portions of said stretch, one of said track sections being included in each of said end portions, a code communication system operable during different cycles of operation to transmit indication codes from the opposite ends of said stretch to said control office for governing the corresponding indicating means, control means for each end of said stretch for initiating operation of said code communication system and governing the character of the indication codes transmitted, and means for governing each of said control means in accordance with the occupied or unoccupied condition of the corresponding end portion of said stretch for trains moving either toward or away from the corresponding end of the stretch.

65. In a coded track circuit signaling system for a stretch of track including an end section at each end adjacent a track switch at that end, a home signal at each end governing traffic over the corresponding track switch, a distant signal for each end section governing traffic toward the associated home signal, a head-block signal at each end of the stretch for governing the entrance of traffic into the stretch at that end, driven code transmitting means at each home signal for transmitting code impulses over the rails of said stretch to govern the indications of the associated distant signal and the head-block signal at the opposite end, means manually controlled from a distant control office for rendering effective said driven code transmitting means for either selected end of the stretch, inverse code transmitting means at each distant signal responsive to the reception of driven code impulses from its associated home signal for transmitting inverse code impulses toward such home signal, code receiving means at each home signal responsive to the code impulses of either a driven code or an inverse code, and track occupancy indication means for each end section controlled by the corresponding code receiving means to indicate the presence of a train when said code receiving means is rendered inactive by the occupied condition of its associated end section.

66. In a coded track circuit signaling system for a stretch of single track between the ends of passing sidings including an end track section at one end, a head-block signal at one end of said stretch and an opposing intermediate signal for governing train movement in opposite directions into said end track section, code receiving means for governing the indications of said intermediate signal, code transmitting means operable to transmit code pulses over the track rails of said end track section in a direction to energize said code receiving means, an entering signal at said one end of the stretch governing train movement out of the stretch, and means manually controlled from a distant control office and effective only if said head-block signal is at stop for governing the clearing of said entering signal and also rendering said code transmitting means effective.

67. In a coded track circuit signaling system for a stretch of single track between the ends of passing sidings and including an end track section at one end, a head-block signal at one end of the stretch and an opposing intermediate signal governing train movement in opposite directions into said end track section, means effective when a train entering the stretch at said one end has advanced beyond said intermediate signal for transmitting code pulses toward said head-block signal for clearing it for following train movements, an entering signal at said one end of the stretch governing train movement out of the stretch, code responsive means for governing the clearing of said intermediate signal, and means manually controlled from a distant control office for selectively governing the clearing of said entering signal and said head-block signal, said means acting when said entering signal is conditioned to clear to transmit code pulses from said end of said stretch in a direction to energize said code responsive means and clear said intermediate signal in spite of the transmission of code pulses behind a train in the stretch, whereby said entering signal and said intermediate signal may be cleared by manual control to permit a train in the stretch to make a back-up move.

68. In a coded track circuit signaling system for a stretch of single track between the ends of passing sidings divided into a plurality of track sections, a head-block signal at one end of the stretch and an entering signal at the opposite end of the stretch governing train movement in the same direction into and out of said stretch respectively, code transmitting means at said opposite end of the stretch operable to send code pulses toward said head-block signal, and means including separate manually operable signal levers for said signals in a distant control office for selectively governing the clearing of said signals and for rendering said code transmitting means effective when either of said signals is conditioned to clear.

69. In a coded track circuit signaling system for a stretch of track including an end track section having a head-block signal at one end and an opposing intermediate signal at the other end governing train movements in opposite directions into said end track section, coding means for each end of said track section, means effective when a train entering said stretch at said one end has advanced beyond said intermediate signal for rendering the associated coding means effective to transmit code pulses toward said head-block signal for clearing that signal for following train movements, means manually controlled from a distant control office for conditioning said head-block signal to clear in response to the reception of such code pulses, means manually controlled from said control office and effective only if said head-block signal is at stop for rendering the associated coding means effective to transmit code pulses toward said intermediate signal during the off intervals of the code pulses being transmitted away from that signal, and code responsive means at said intermediate signal responsive to such code pulses transmitted toward that signal for governing its clearing.

70. In a coded track circuit signaling system for a stretch of single track divided into blocks, signals at the entrances to said blocks for governing train movement in opposite directions, coding means for said blocks governed by the movement of a train through the stretch in either direction for transmitting caution and clear signal control codes respectively over the track rails of the first and second blocks in the rear of such train, code transmitting means for each end of the stretch operable at times to transmit code pulses during the off intervals of the signal control code being received, control means for rendering each of said code transmitting means at an end of the stretch effective behind a train entering the stretch at that end only if a clear signal control code is being received at that end, and means manually controlled from a distant control office for rendering either of said code transmitting means for an end of the stretch effective independently of its control means, whereby coding may be initiated by manual control to clear an intermediate signal for a train in the stretch to make a back-up move.

71. In a coded track circuit signaling system for a stretch of single track divided into a plurality of track sections and having signals at intervals governing train movement into and through said stretch in opposite directions, code transmitting means for each end of the stretch rendered effective by closure of an operating circuit to send code pulses during intervals between code pulses being received at that end of the stretch, coding means for said track sections governed by the movement of a train through said stretch in either direction for sending signal control code pulses at a caution and a clear code rate respectively over the track rails of the first and second track sections in the rear of such train, decoding means for each end of the stretch energized only in response to the reception of code pulses at said clear code rate for closing the operating circuit for the associated code transmitting means, and means manually controlled from a distant control office for closing said operating circuit for either selected one of said code transmitting means at the ends of the stretch independently of the energization of the associated decoding means, whereby coding may be manually initiated behind a train in a stretch to clear an intermediate signal for such train to make a back-up move.

72. In a coded track circuit signaling system for a stretch of single track between the ends of passing sidings having an end track section at one end, a head-block signal and an entering signal respectively governing train movement into and out of said stretch at said one end, an opposing intermediate signal governing train movement over said end track section toward said one end, coding means at said intermediate signal effective when a train entering the stretch at said one end has advanced beyond said intermediate signal for transmitting code pulses at a caution code rate toward said head-block signal, coding means at said head-block signal including coding contacts intermittently operated at a code rate different from said caution code rate, means manually controlled from a distant control office for governing the clearing of said entering signal only if said head-block signal is at stop and also for rendering said coding means at said head-block signal effective to transmit current pulses at intervals toward said intermediate signal, and code responsive means energized by the intermittent current pulses received at said intermediate signal for causing that signal to indicate caution.

73. In a coded track circuit signaling system for a stretch of track extending in one direction from a track switch and including an end track section and an adjoining rear track section, a distant signal for governing train movement over said end track section toward said switch, means manually controlled from a distant control office for at times transmitting signal control codes over the track rails of said end track section to govern the indications of said signal, code transmitting means for said rear track section including a series relay energized by the presence of a train in that track section, impulse responsive means associated with the end of said stretch adjacent said switch for governing the power operation thereof, and means effective only if said series relay is deenergized for applying impulses at intervals to the track rails of said end track section adjacent said distant signal to govern said impulse responsive means.

74. In a coded track circuit signaling system for a stretch of track extending in one direction from a power operated track switch and including an end track section and an adjoining rear track section, a distant signal for governing train movement over said end track section toward said switch, means manually controlled from a distant control office for governing the power operation of said switch and the transmission of signal control codes over the track rails of said end track section to govern the indications of said signal, coding means for said rear track section including a series relay energized in response to a train in that track section, means effective only if said series relay is deenergized for transmitting pulses at intervals over the track rails of said end track section toward said switch, approach locking means governed by said pulses for controlling the power operation of said switch, and means for causing said distant signal to display a caution indication in spite of the reception of a clear code until said series relay is energized by an approaching train to stop transmission of pulses toward the switch and render said approach locking means effective.

75. In a coded track circuit signaling system for a single track stretch between the ends of passing sidings and having signals at intervals for governing train movement into and through said stretch in either direction, said signals including a head-block signal at each end of said stretch for governing train movement into said stretch and an entering signal at each end of the stretch governing train movement out of said stretch, a signal clearing relay for each of said head-block and entering signals energized by manual control from a distant control office, and code transmitting means for each end of said stretch normally inactive to transmit any signal clearing code and rendered effective to transmit code pulses toward the opposite end of said stretch by energization of the signal clearing relay for the associated entering signal, whereby the transmission of code pulses to clear an intermediate signal for a train to make a back-up move may be manually initiated by clearing the entering signal for such train to move out of the stretch.

76. In a coded track circuit system for a stretch of single track between the ends of passing sidings and including an outlying track switch, means actuated by said switch for preventing transmission of code pulses past said switch when it is in the reverse position, signals at intervals for governing train movement into and through said stretch in either direction, an entering signal at each end of the stretch governing train movement out of the stretch, signal control relays manually controlled from a distant control office for governing the clearing of the entering signal at either selected end of the stretch, and circuit means rendered effective by the energization of a signal control relay for one end of said stretch for at the same time initiating transmission of code pulses over the track rails of the stretch toward the opposite end, thereby clearing any intermediate signal as may be required for train movement off of said outlying switch toward said selected end of the stretch.

77. In a coded track circuit signaling system for a stretch of track having a signal at each end governing train movement into the stretch, a normally deenergized code following track relay and normally inactive code transmitting means associated with each end of said stretch, a signal control relay for each end of said stretch manually energized from a distant control office for governing the clearing of the signal at that end of the stretch in response to the coding operation of the associated track relay, manually controlled means for initiating operation of the code transmitting means at either selected end of the stretch, and means for maintaining in operation either of said code transmitting means thus manually set into operation until said stretch is not occupied and also the signal control relay for the signal at the opposite end of the stretch is not energized.

78. In a coded track circuit signaling system for a stretch of single track divided into track sections, normally inactive code transmitting means and a normally deenergized code following track relay associated with each end of each of said track sections, signals at the ends of said track sections governing train movement into and through said stretch in both directions, means responsive to the coding operation of each track relay except those for the extreme ends of said stretch for governing the operation of the code transmitting means for the adjacent end of an adjoining track section, circuit controlling means for each end of said stretch for rendering the associated code transmitting means active and thereby cause transmission of code pulses over the track rails of the successive track sections toward the opposite end of the stretch for clearing signals for one direction of train movement, means manually controlled from a distant control office for operating said circuit controlling means at either selected end of said stretch, each of said circuit controlling means when thus operated by manual control remaining in that condition until restored, means for restoring the circuit controlling means then in operation to the normal inactive condition to stop operation of the code transmitting means and the track relays, and means for rendering said restoring means effective only if said stretch is not occupied by a train, whereby coding once manually established for a given direction of traffic cannot be discontinued while the stretch is occupied and thus put to stop any intermediate signal in front of a train in the stretch.

79. In a coded track circuit signaling system for a stretch of single track, a normally deenergized code following track relay and normally inactive code transmitting means associated with each end of said stretch, coding control means including manually operable devices in a distant control office for governing the starting and stopping of the operation of said code transmitting means, code responsive means associated with each end of said stretch and energized by the reception of a code existing at that end only if said stretch is not occupied, a miniature track diagram in said control office having a track occupancy indicator for said stretch of track, and means governed jointly by said code responsive means and by said coding control means for rendering said occupancy indicator effective while said stretch is occupied by a train.

NEIL D. PRESTON.